United States Patent
Lynn et al.

(10) Patent No.: US 11,822,816 B2
(45) Date of Patent: Nov. 21, 2023

(54) NETWORKING DEVICE/STORAGE DEVICE DIRECT READ/WRITE SYSTEM

(71) Applicant: Dell Products L.P., Round Rock, TX (US)

(72) Inventors: William Emmett Lynn, Round Rock, TX (US); Amnon Izhar, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/449,308

(22) Filed: Sep. 29, 2021

(65) Prior Publication Data

US 2023/0095794 A1    Mar. 30, 2023

(51) Int. Cl.
  *G06F 3/06*    (2006.01)
(52) U.S. Cl.
  CPC .......... *G06F 3/0656* (2013.01); *G06F 3/0604* (2013.01); *G06F 3/0653* (2013.01); *G06F 3/0659* (2013.01); *G06F 3/0679* (2013.01)
(58) Field of Classification Search
  CPC .... G06F 3/0656; G06F 3/0604; G06F 3/0653; G06F 3/0659; G06F 3/0697; G06F 3/06
  See application file for complete search history.

(56) References Cited

U.S. PATENT DOCUMENTS

| | | | | |
|---|---|---|---|---|
| 6,067,408 | A * | 5/2000 | Runaldue | G06F 13/385 710/307 |
| 10,776,164 | B2 | 9/2020 | Zhao et al. | |
| 10,936,516 | B2 * | 3/2021 | Danilov | G06F 13/20 |
| 10,990,447 | B1 * | 4/2021 | Shpiner | H04L 63/10 |
| 2019/0050341 | A1 * | 2/2019 | Veal | G06F 12/0246 |
| 2019/0171392 | A1 * | 6/2019 | Kim | G06F 13/1673 |
| 2019/0187894 | A1 * | 6/2019 | Benisty | G06F 3/0679 |
| 2019/0310964 | A1 * | 10/2019 | Zhang | G06F 15/17331 |

OTHER PUBLICATIONS

S. Bates, Eideticom, "Important new NVMe features for optimzing the data pipeline", Flash memory submit 2018, Santa Clara, CA, USA. (Year: 2018).*

* cited by examiner

*Primary Examiner* — Khoa D Doan
(74) *Attorney, Agent, or Firm* — Joseph Mencher

(57) ABSTRACT

A networking device/storage device direct write system includes a chassis that houses a Solid State Drive (SSD) storage device coupled to a Smart Network Interface Controller (SmartNIC) networking device. The SmartNIC networking device receives data via a network, stores the data in a SmartNIC buffer memory subsystem that is included in the SmartNIC networking device, and then perform a Direct Memory Access (DMA) operation to transfer the data stored in the SmartNIC buffer memory subsystem to an addressable memory subsystem that is included in the SSD storage device. If the addressable memory subsystem in the SSD storage device is a volatile memory subsystem, the SmartNIC networking device then transmits a persistent storage instruction to the SSD storage device that causes the SSD storage device to transfer the data stored in the addressable memory subsystem to a persistent memory subsystem in the SSD storage device.

20 Claims, 62 Drawing Sheets

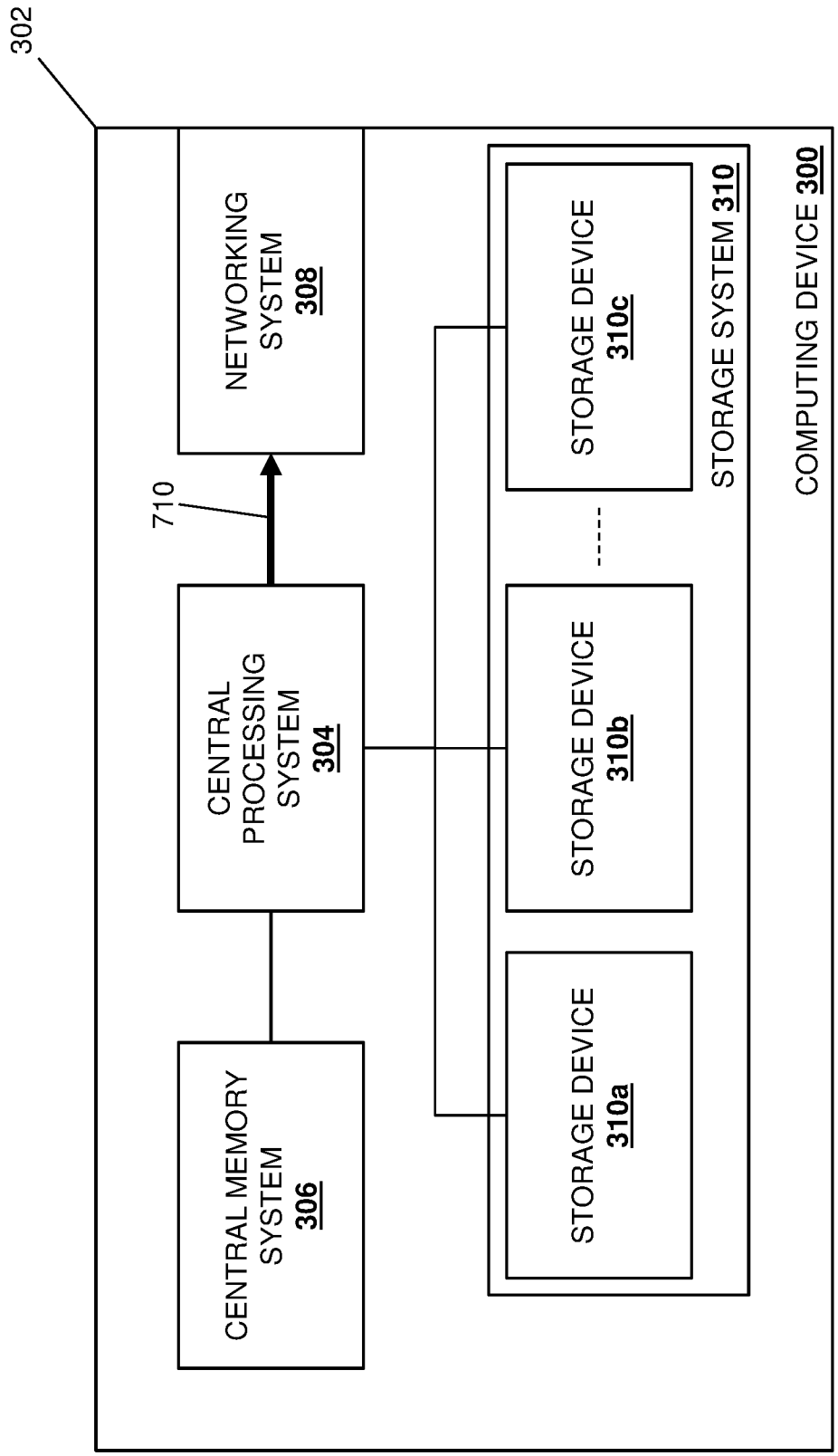

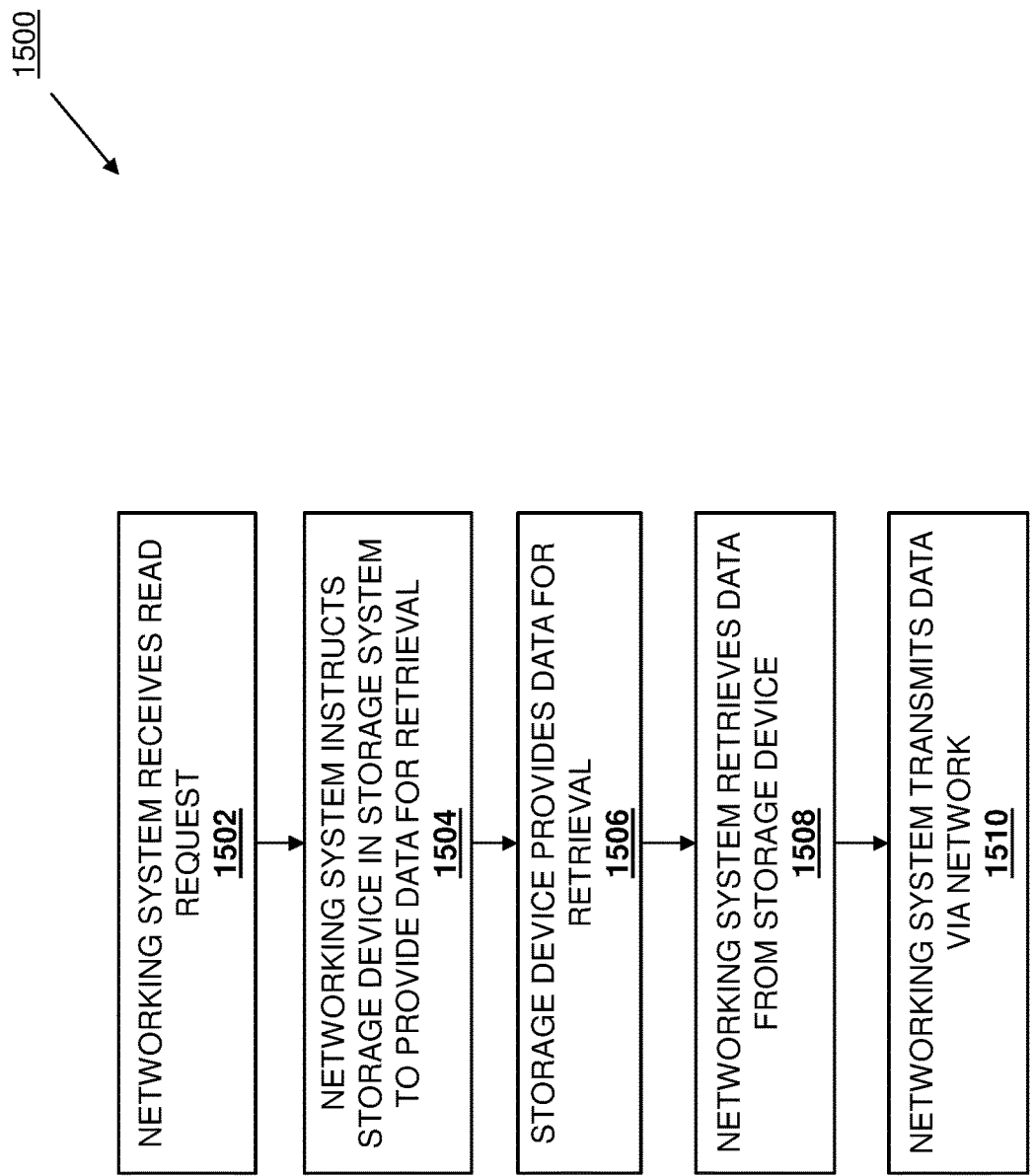

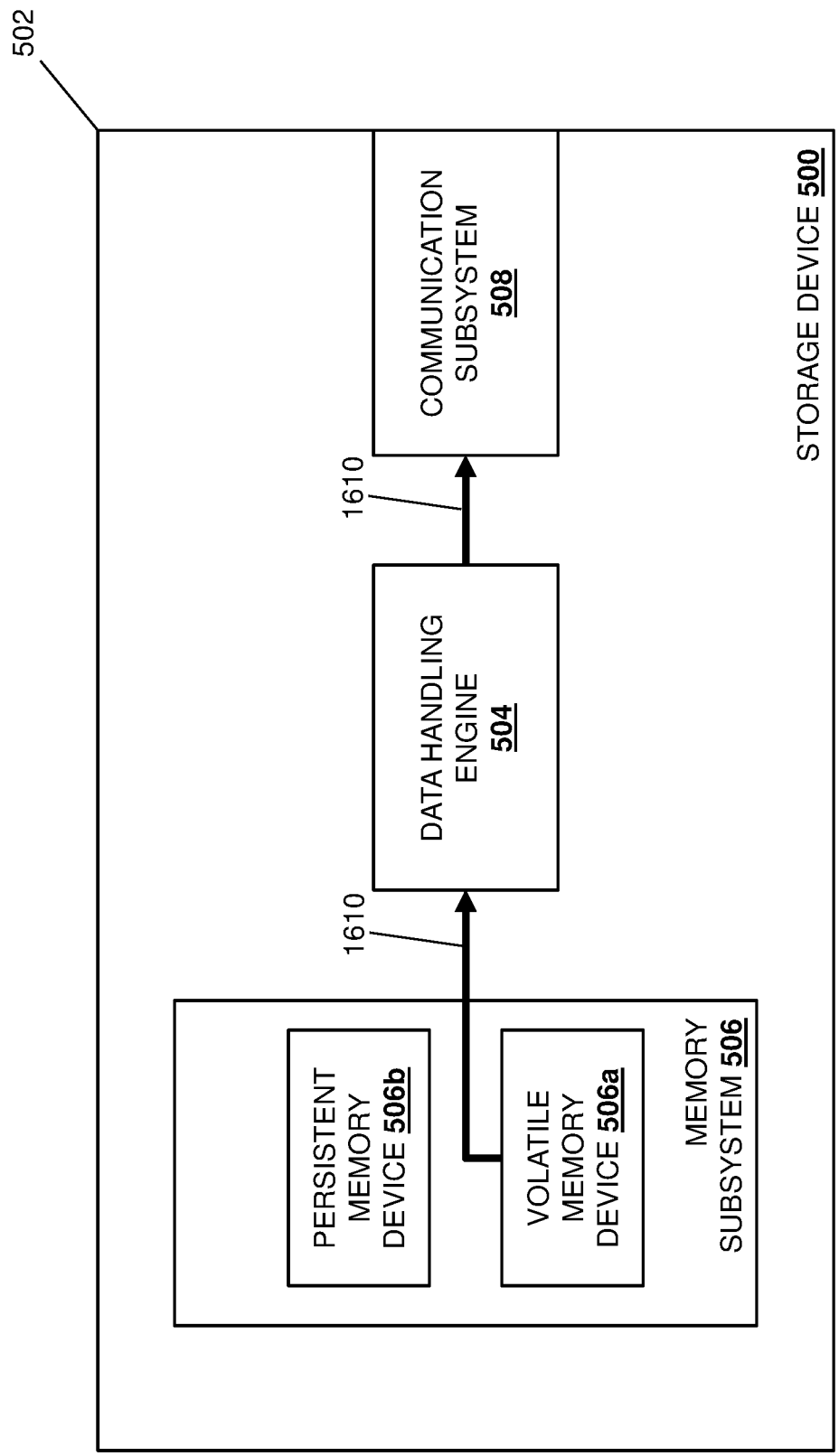

NETWORKING DEVICE/STORAGE DEVICE DIRECT READ/WRITE SYSTEM

BACKGROUND

The present disclosure relates generally to information handling systems, and more particularly to performing direct read and write operations between a networking device and storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, often include storage devices for storing data that may be received and retrieved through a network via a networking device in that server. However, the inventors of the present disclosure have discovered that conventional storage operations to receive data at a networking device in a server and store that data in storage devices in that server, as well as to retrieve data stored in those storage device and transmit it via the network, are inefficient. For example, and as discussed in further detail below, the conventional data storage operations discussed above may include the networking device (e.g., Network Interface Controller (NIC)) in the server receiving data for storage and writing that data to a central memory system in the server (e.g., via a Direct Memory Access (DMA) write operation), followed by a central processing system in the server issuing a data storage command to the storage device in the server that causes that storage device to retrieve that data from the central memory system (e.g., via a DMA read operation), write that data to its persistent storage subsystem, and transmitting a completion message to the central processing system. As will be appreciated by one of skill in the art in possession of the present disclosure, such conventional data storage operations require the two DMA operations discussed above, utilize the central memory system as a "bounce" memory, and occupy processing cycles of the central processing system to provide a data storage "middleman". Furthermore, such conventional data storage operations also introduce storage delays, as the storage device cannot perform the DMA read operation to retrieve the data from the central memory system until the networking device has completed the DMA write operation and written all of that data to the central memory system.

As will be appreciated by one of skill in the art in possession of the present disclosure, conventional data retrieval operations to retrieve the data from the storage device and transmit it via the network suffer from similar inefficiencies, as the networking device must receive a read request and transmit it the central processing system, followed by the central processing system issuing a data provisioning command to the storage device that causes the storage device to transfer the data from its persistent storage subsystem to the central memory system (e.g., via a DMA write operation), as well as the central processing system then issuing a data provisioning command to the networking device that causes the networking device to retrieve the data from the central memory system (e.g., via a DMA read operation) and transmit it via the network.

Accordingly, it would be desirable to provide a networking device/storage device read/write system that addresses the issues discussed above.

SUMMARY

According to one embodiment, an Information Handling System (IHS) includes a Smart Network Interface Controller (SmartNIC) processing system; and a SmartNIC memory system that is coupled to the SmartNIC processing system and that includes instructions that, when executed by the SmartNIC processing system, cause the SmartNIC processing system to provide a SmartNIC data handling engine that is configured to: receive data via a network; store the data in a SmartNIC buffer memory subsystem that is coupled to the SmartNIC processing system; and perform a Direct Memory Access (DMA) operation to transfer the data stored in the SmartNIC buffer memory subsystem to an addressable memory subsystem that is included in an SSD storage device that is coupled to the SmartNIC processing system.

BRIEF DESCRIPTION OF THE DRAWINGS

FIG. 7F is a schematic view illustrating an embodiment of the computing device of FIG. 3 performing conventional data retrieval operations.

FIG. 15 is a flow chart illustrating an embodiment of a method for direct networking device/storage device read operations.

FIG. 16G is a schematic view illustrating an embodiment of the storage device of FIG. 5 operating during the method of FIG. 15.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
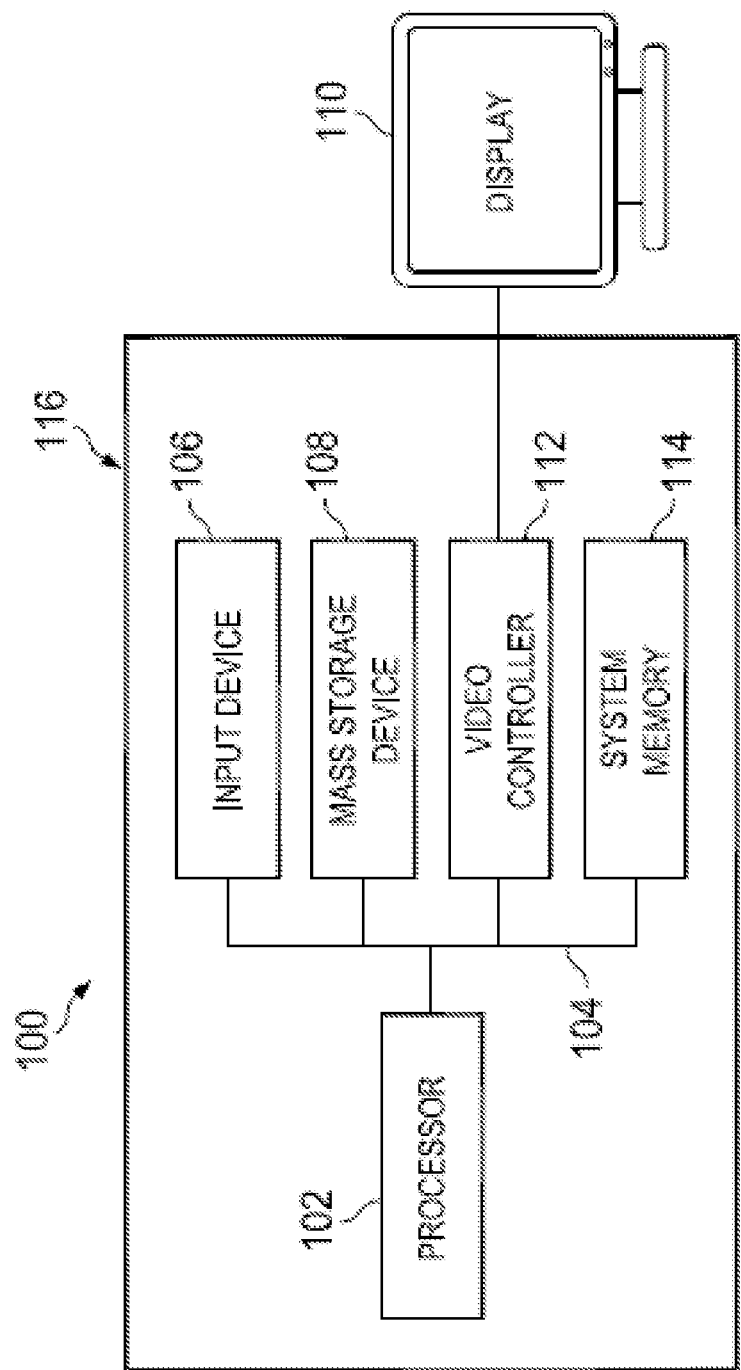
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
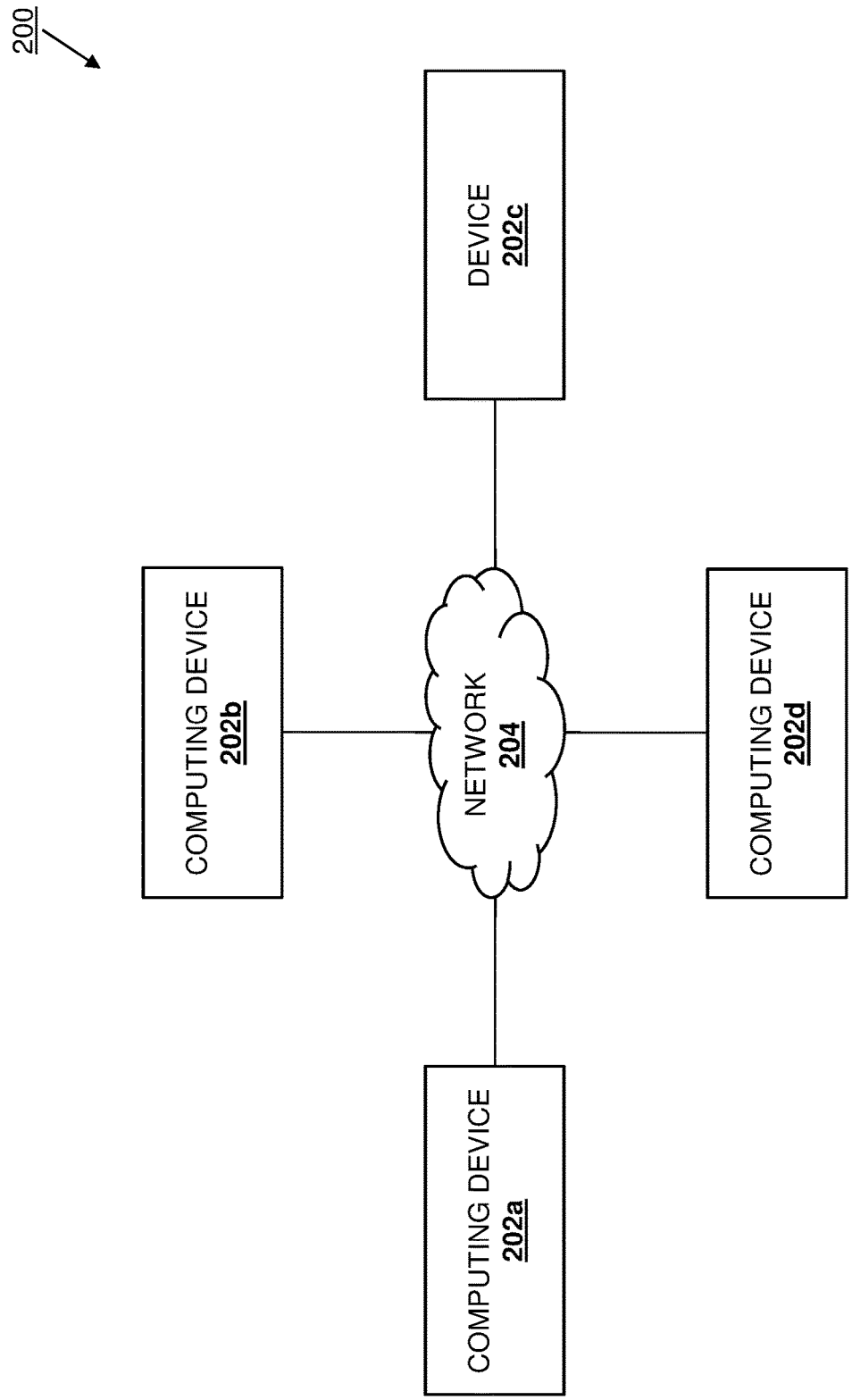
FIG. 2 is a schematic view illustrating an embodiment of a networked system that may include the networking device/storage device direct read/write system of the present disclosure.

Referring now to FIG. 2, an embodiment of a networked system 200 is illustrated that may include the networking device/storage device direct read/write system of the present disclosure. In the illustrated embodiment, the networked system 200 includes a plurality of computing devices 202a, 202b, 202c, and up to 202c. In an embodiment, any or each of the computing devices 202a-202d may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that computing devices provided in the networked system 200 may include any devices that may be configured to operate similarly as the computing devices 202a-202d discussed below. As illustrated, each of the computing devices 202a-202d may be coupled together via a network 204 that may be provided by a Local Area Network (LAN), the Internet, combinations thereof, and/or any other network that would be apparent to one of skill in the art in possession of the present disclosure. However, while a specific networked system 200 has been illustrated and described, one of skill in the art in possession of the present disclosure will recognize that the networking device/storage device direct read/write system of the present disclosure may include a variety of components and component configurations while remaining within the scope of the present disclosure as well.

Figure 3:
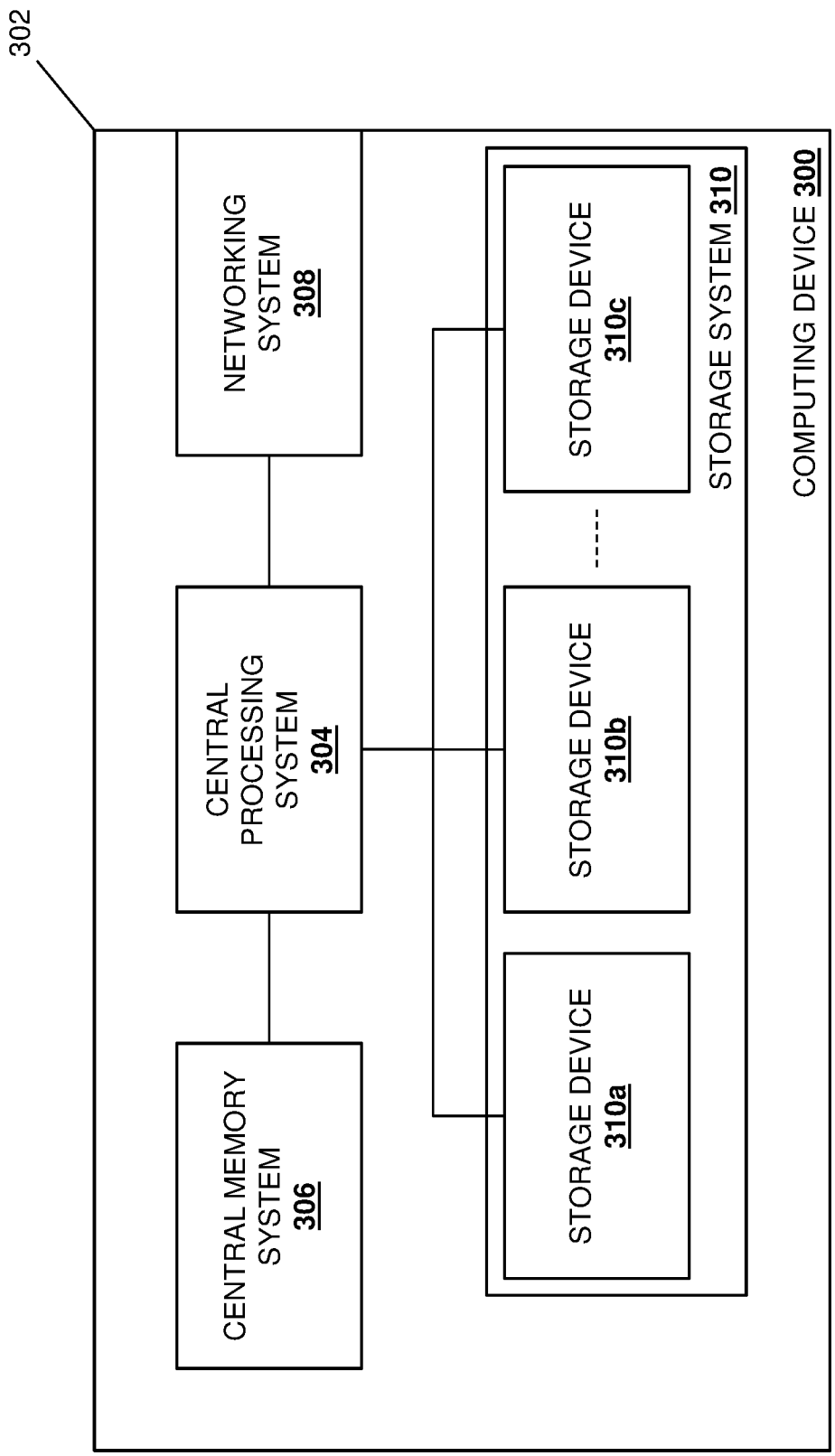
FIG. 3 is a schematic view illustrating an embodiment of a computing device that may provide the networking device/storage device direct read/write system of the present disclosure.

Referring now to FIG. 3, an embodiment of a computing device 300 is illustrated that may provide any of the computing devices 202a-202d discussed above with reference to FIG. 2. As such, the computing device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below. For example, the chassis 302 may house a central processing system 304 (e.g., which may include the processor 102 (e.g., a Central Processing Unit (CPU)) discussed above with reference to FIG. 1) and a central memory system 306 (e.g., which may include the memory 114 (e.g., Dual Inline Memory Modules (DIMMs) discussed above with reference to FIG. 1) that is coupled to the central processing system 304 and that includes instructions that, when executed by the central processing system 304, cause the central processing system 304 to perform any of a variety of server/computing device functionality that would be apparent to one of skill in the art in possession of the present disclosure.

The chassis 302 may also house a networking system 308 that is coupled to the central processing system 304. For example, the networking system 308 may be coupled to the central processing system 304 via a Peripheral Component Interconnect express (PCIe) port on the central processing system 304, an integrated PCIe switch device in the central processing system 304, an external PCIe switch device (e.g., external to the central processing system 306) in the chassis 302 that is also coupled to the central processing system 304, and/or in a variety of other manners that would be apparent to one of skill in the art in possession of the present disclosure.

In some example, the networking system 308 may be provided by a Network Interface Controller (NIC) device, wireless communication systems (e.g., BLUETOOTH®, Near Field Communication (NFC) components, WiFi components, etc.), and/or any other communication components that would be apparent to one of skill in the art in possession of the present disclosure. In the specific examples discussed below, the networking system 308 is provided by a Smart Network Interface Controller (SmartNIC) networking device that one of skill in the art in possession of the present disclosure will appreciate may be provided by a programmable network adapter card with programmable accelerators and network connectivity that is configured to accelerate infrastructure applications provided by the computing device 300. However, one of skill in the art in possession of the present disclosure will appreciate how the SmartNIC networking device of the present disclosure may be provided in a variety of manners and may perform a variety of SmartNIC functionality while remaining within the scope of the present disclosure as well.

However, in yet other specific example, the networking system 308 may be provided as part of a System Control Processor (SCP) that is included in the chassis 302 and that may be conceptualized as an "enhanced" SmartNIC device that may be configured to perform functionality that is not available in conventional SmartNIC devices such as, for example, data storage functionality, networking functionality, firewall functionality, and/or other functionality that may be considered technically "separate" from the central processing functionality performed by the central processing system 304 (and which may be managed separately from that central processing functionality). In different embodiments, the SCP discussed above may be provided as an SCP card that is configured to connect to a slot on a motherboard in the chassis 302, may be integrated into a motherboard in the chassis 302, may be a separate/co-motherboard circuit board that is connected to a motherboard in the chassis 302 (e.g., a two-part motherboard having a first portion that enables conventional motherboard functionality, and a second portion that enables the SCP functionality discussed below), and/or may be provided in the chassis 302 in a variety of other manners that will fall within the scope of the present disclosure as well. One of skill in the art in possession of the present disclosure will appreciate how the SCP may alternatively be referred to as a Data Processing Unit (DPU) that may be provided by a PCIe card including Advanced Reduced Instruction Set Computing (RISC) Machine (ARM) core(s) and a network interface. However, while a few specific examples are provided, one of skill in the art in possession of the present disclosure will appreciate that the SCP discussed above may be provided in the computing system 300 in a variety of manners that will fall within the scope of the present disclosure.

In the illustrated embodiment, the chassis 302 also houses the storage system 310 that includes a plurality of storage devices 310a, 310b, and up to 310c that are coupled to the central processing system 304. For example, any or each of the storage devices 310a, 310b, and up to 310c may be coupled to the central processing system 304 via a Peripheral Component Interconnect express (PCIe) port on the central processing system 304, an integrated PCIe switch device in the central processing system 304, an external PCIe switch device (e.g., external to the central processing system 306) in the chassis 302 that is also coupled to the central processing system 304, and/or in a variety of other manners that would be apparent to one of skill in the art in possession of the present disclosure. Furthermore, one of skill in the art in possession of the present disclosure will recognize that while the storage devices 310a-310c are described below as Non-Volatile Memory express (NVMe) Solid State Drive (SSD) storage devices including NVMe SSD storage device functionality, the storage devices 310a-310c may be provided by other types of storage device that are configured to perform the functionality described below.

Furthermore, while the storage devices 310a-310c are illustrated and described below as being coupled to the networking system 308 via the central processing system 304, one of skill in the art in possession of the present disclosure will appreciate how the storage devices 310a-310c may be connected directly to the networking system 308, or coupled to the networking system 308 without the use of the central processing system 304 (e.g., via a PCIe switch device), while remaining within the scope of the present disclosure as well. For example, the inventors of the present disclosure have developed computing devices (e.g., server devices) that include the networking system 308 and the storage devices 310a-310c directly connected/coupled together, and that do not include any central processing system, with the systems and methods discussed below utilized for data storage and retrieval in those computing devices. As such, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
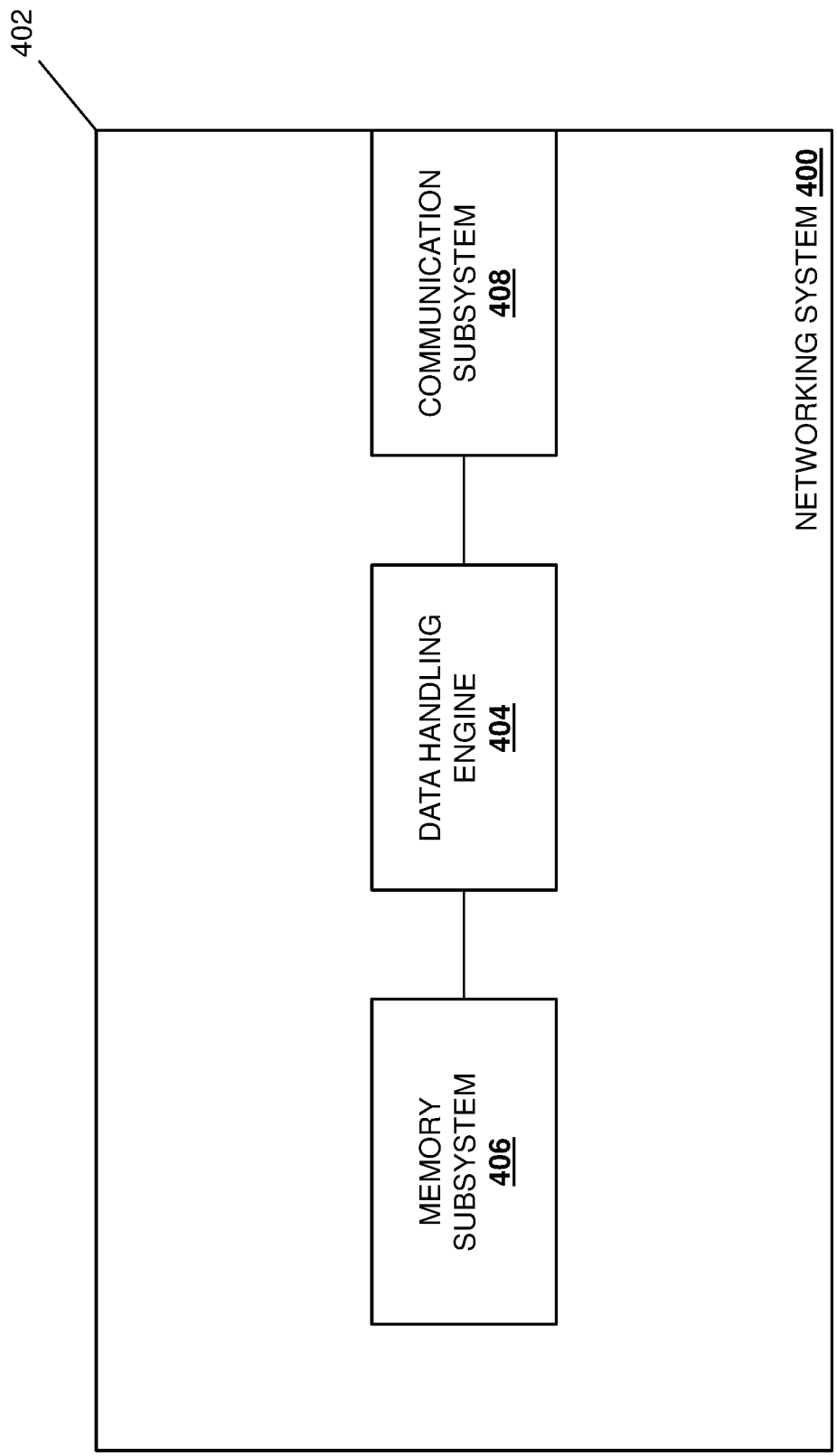
FIG. 4 is a schematic view illustrating an embodiment of a networking system that may be provided in the computing device of FIG. 3.

Referring now to FIG. 4, an embodiment of a networking system 400 is illustrated that may provide the networking system 308 discussed above with reference to FIG. 3. As such, the networking system 400 may be provided by the IHS 100 discussed above with reference to FIG. 1 and/or may include some or all of the components of the IHS 100, and in specific examples may be provided by a NIC, a SmartNIC, or an SCP device as discussed above. However, while illustrated and discussed as being provided by a NIC, SmartNIC, or SCP device, one of skill in the art in possession of the present disclosure will recognize that the functionality of the networking system 400 discussed below may be provided by other devices that are configured to operate similarly as the networking system 400 discussed below. In the illustrated embodiment, the networking system 400 includes a chassis 402 that houses the components of networking system 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data handling engine 404 that is configured to perform the functionality of the data handling engines and/or networking systems discussed below.

As such, in embodiments in which the networking system 400 includes a SmartNIC networking device, the chassis 402 may house a SmartNIC processing system (not illustrated, but which may include the processor 102 discussed above with reference to FIG. 1) and a SmartNIC memory system (not illustrated, but which may include the memory 114 discussed above with reference to FIG. 1) that is coupled to the SmartNIC processing system and that includes instructions that, when executed by the SmartNIC processing system, cause the SmartNIC processing system to provide a SmartNIC data handling engine 404 that is configured to perform the functionality of the SmartNIC data handling engines and/or SmartNIC networking devices discussed below. Similarly, in embodiments in which the networking system 400 includes an SCP device, the chassis 402 may house an SCP processing system (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP data handling engine 404 that is configured to perform the functionality of the SCP data handling engines and/or SCP devices discussed below.

The chassis 402 may also house a memory subsystem 406 (e.g., which may include the memory 114 discussed above with reference to FIG. 1) that is coupled to the data handling engine 404 (e.g., via a coupling between the memory subsystem 406 and the processing system). In some of the embodiments discussed below, the memory subsystem 406 in the networking system 400 is provided by a non-addressable buffer memory subsystem. However, in other embodiments discussed below, the memory subsystem 406 in the networking system 400 is provided by an addressable memory subsystem (e.g., a memory space that is addressable within a PCIe memory map). As such, one of skill in the art in possession of the present disclosure will appreciate that the memory subsystem 406 in the networking system 400 discussed below may be provided by a variety of memory devices and/or technologies while remaining within the scope of the present disclosure.

The chassis 402 may also house a communication system 408 that is coupled to the data handling engine 404 (e.g., via a coupling between the communication system 408 and the processing system) and that may be provided by any communication components that one of skill in the art in possession of the present disclosure would recognize as allowing for the connectivity (e.g., to the network 204 and the other components in the computing device 300) and functionality discussed below. However, while a specific networking system 400 has been illustrated and described, one of skill in the art in possession of the present disclosure will recognize that networking systems (or other devices operating according to the teachings of the present disclosure in a manner similar to that described below for the networking system 400) may include a variety of components and/or component configurations for providing conventional networking system functionality, as well as the functionality discussed below, while remaining within the scope of the present disclosure as well.

Figure 5:
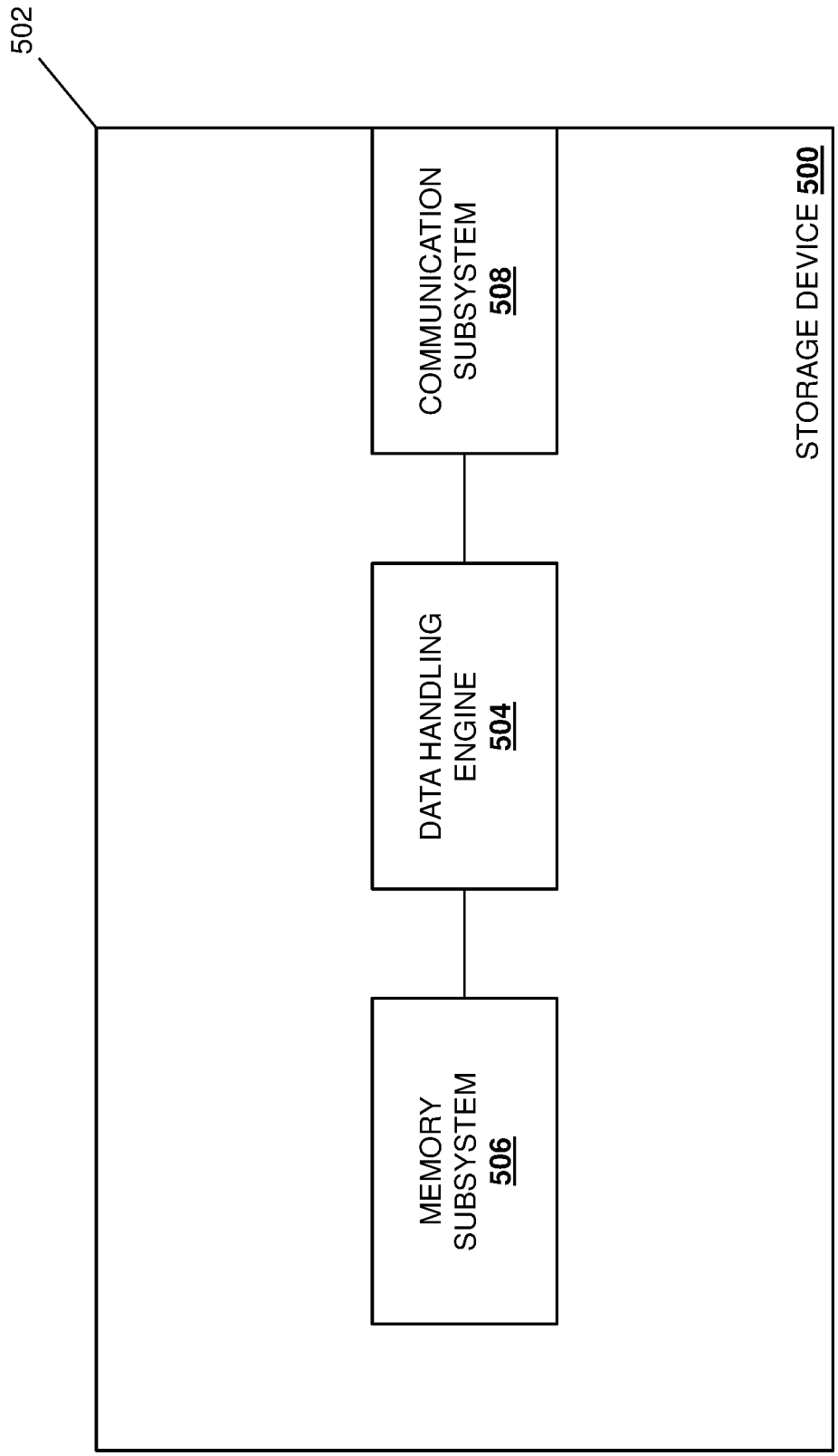
FIG. 5 is a schematic view illustrating an embodiment of a storage device that may be provided in the computing device of FIG. 3.

Referring now to FIG. 5, an embodiment of a storage device 500 is illustrated that may provide any or each of the storage devices 310a-310c discussed above with reference to FIG. 3. As such, the storage device 500 may be provided by the IHS 100 discussed above with reference to FIG. 1 and/or may include some or all of the components of the IHS 100, and in specific examples may be provided by an NVMe SSD storage device as discussed above. However, while illustrated and discussed as being provided by an NVMe SSD storage device, one of skill in the art in possession of the present disclosure will recognize that the functionality of the storage device 500 discussed below may be provided by other devices that are configured to operate similarly as the storage device 500 discussed below. In the illustrated embodiment, the storage device 500 includes a chassis 502 that houses the components of storage device 500, only some of which are illustrated and discussed below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data handling engine 504 that is configured to perform the functionality of the data handling engines and/or storage devices discussed below.

As such, in embodiments in which the storage device 500 includes an NVMe SSD storage device, the chassis 502 may house an NVMe SSD processing system (not illustrated, but which may include the processor 102 discussed above with reference to FIG. 1) and an NVMe SSD memory system (not illustrated, but which may include the memory 114 discussed above with reference to FIG. 1) that is coupled to the NVMe SSD processing system and that includes instructions that, when executed by the NVMe SSD processing system, cause the NVMe SSD processing system to provide an NVMe SSD data handling engine 404 that is configured to perform the functionality of the NVMe SSD data handling engines and/or NVMe SSD storage devices discussed below.

The chassis 402 may also house a memory subsystem 506 (e.g., which may include the memory 114 discussed above with reference to FIG. 1) that is coupled to the data handling engine 504 (e.g., via a coupling between the memory subsystem 506 and the processing system). In some of the embodiments discussed below, the memory subsystem 506 in the networking system 400 is provided by a non-addressable buffer memory subsystem. However, in other embodiments discussed below, the memory subsystem 406 in the networking system 400 is provided by an addressable memory subsystem (e.g., a memory space that is addressable within a PCIe memory map) such as a Controller Memory Buffer (CMB) in an NVMe SSD storage device. As such, one of skill in the art in possession of the present disclosure will appreciate that the memory subsystem 506 in the storage device 500 may be provided by a variety of memory devices and/or technologies while remaining within the scope of the present disclosure.

The chassis 502 may also house a communication system 508 that is coupled to the data handling engine 504 (e.g., via a coupling between the communication system 508 and the processing system) and that may be provided by any communication components that one of skill in the art in possession of the present disclosure would recognize as allowing for the connectivity (e.g., to the central processing system 304, networking system 308, and the other components in the computing device 300) and functionality discussed below. For example, the communication subsystem 508 may include the NVMe SSD storage device submission queues and completion queues discussed below, as well as any other NVMe SSD storage device communication components known in the art. However, while a specific storage device 500 has been illustrated and described, one of skill in the art in possession of the present disclosure will recognize that storage devices (or other devices operating according to the teachings of the present disclosure in a manner similar to that described below for the storage device 500) may include a variety of components and/or component configurations for providing conventional storage device functionality, as well as the functionality discussed below, while remaining within the scope of the present disclosure as well.

Figure 6A:
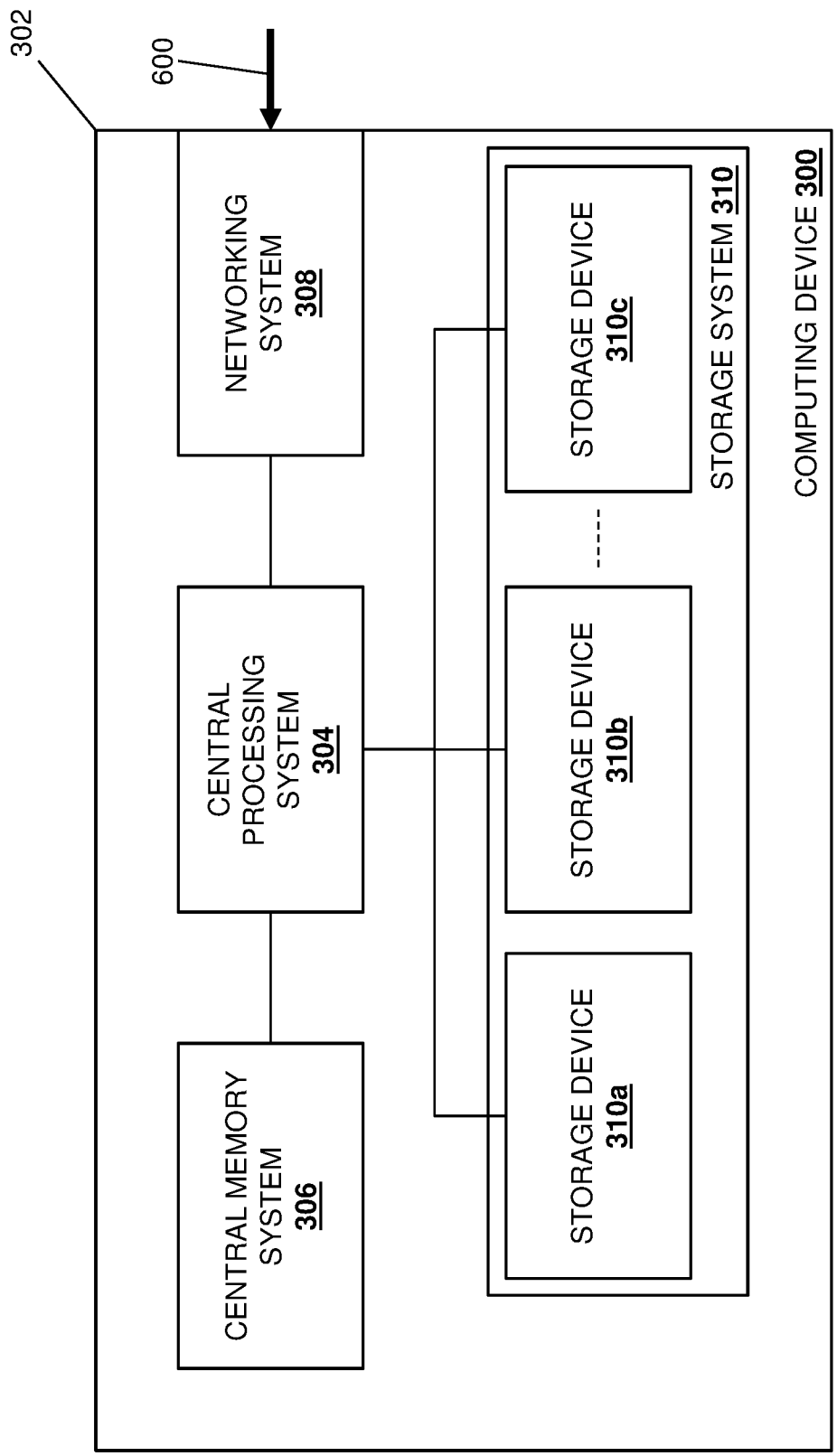
FIG. 6A is a schematic view illustrating an embodiment of the computing device of FIG. 3 performing conventional data storage operations.
Figure 6B:
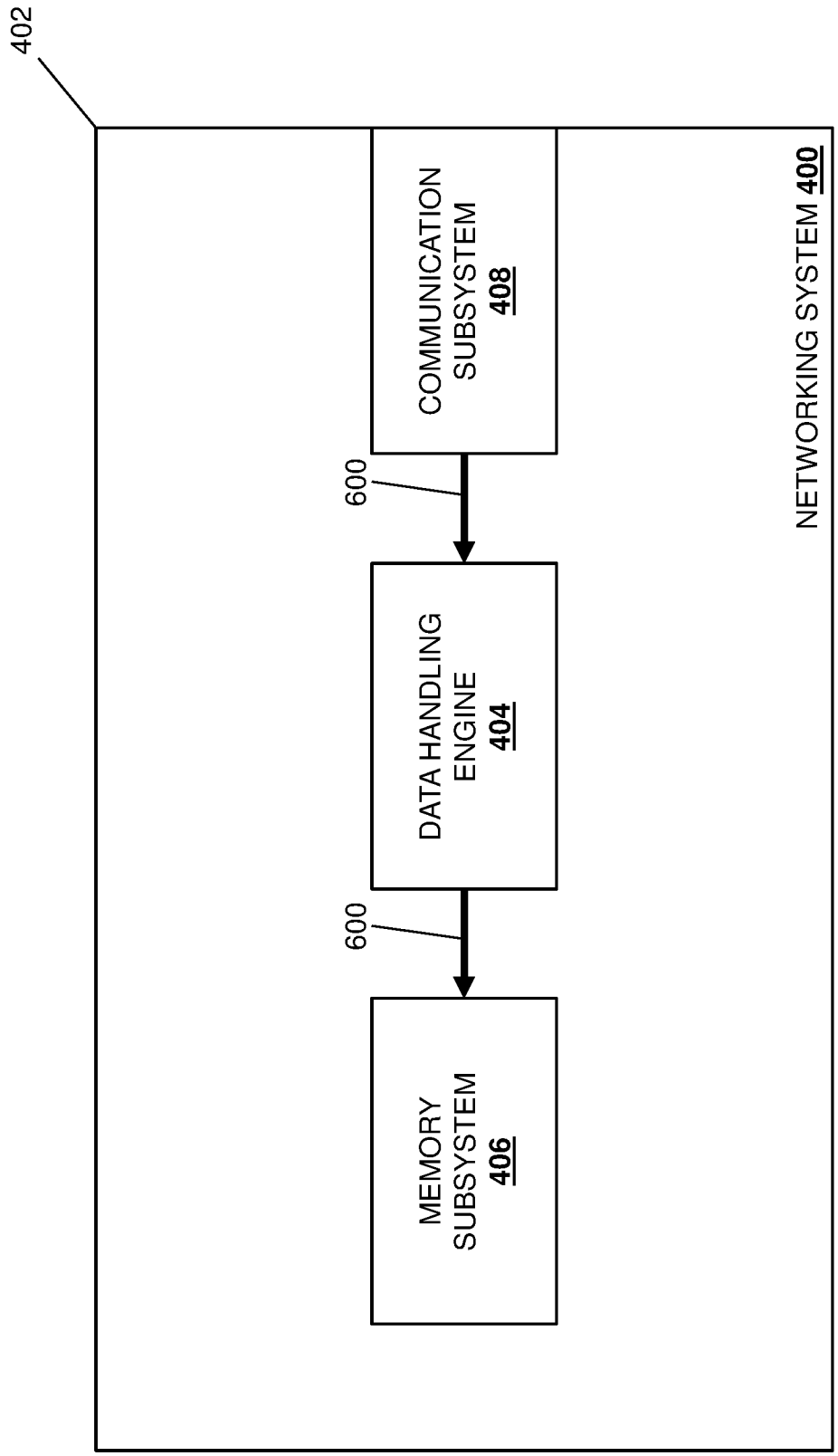
FIG. 6B is a schematic view illustrating an embodiment of the networking system of FIG. 4 performing conventional data storage operations.
Figure 6C:
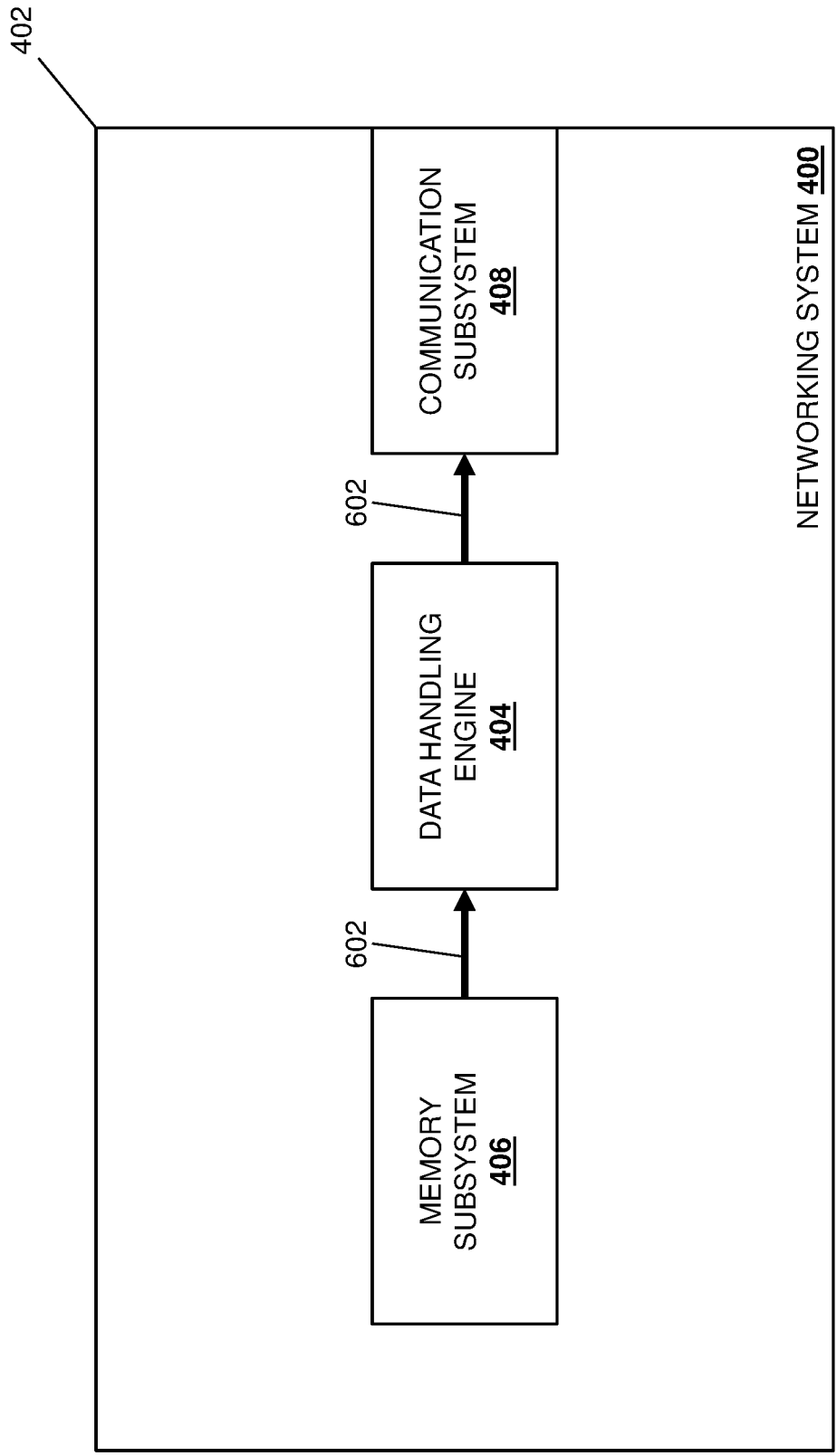
FIG. 6C is a schematic view illustrating an embodiment of the networking system of FIG. 4 performing conventional data storage operations.
Figure 6D:
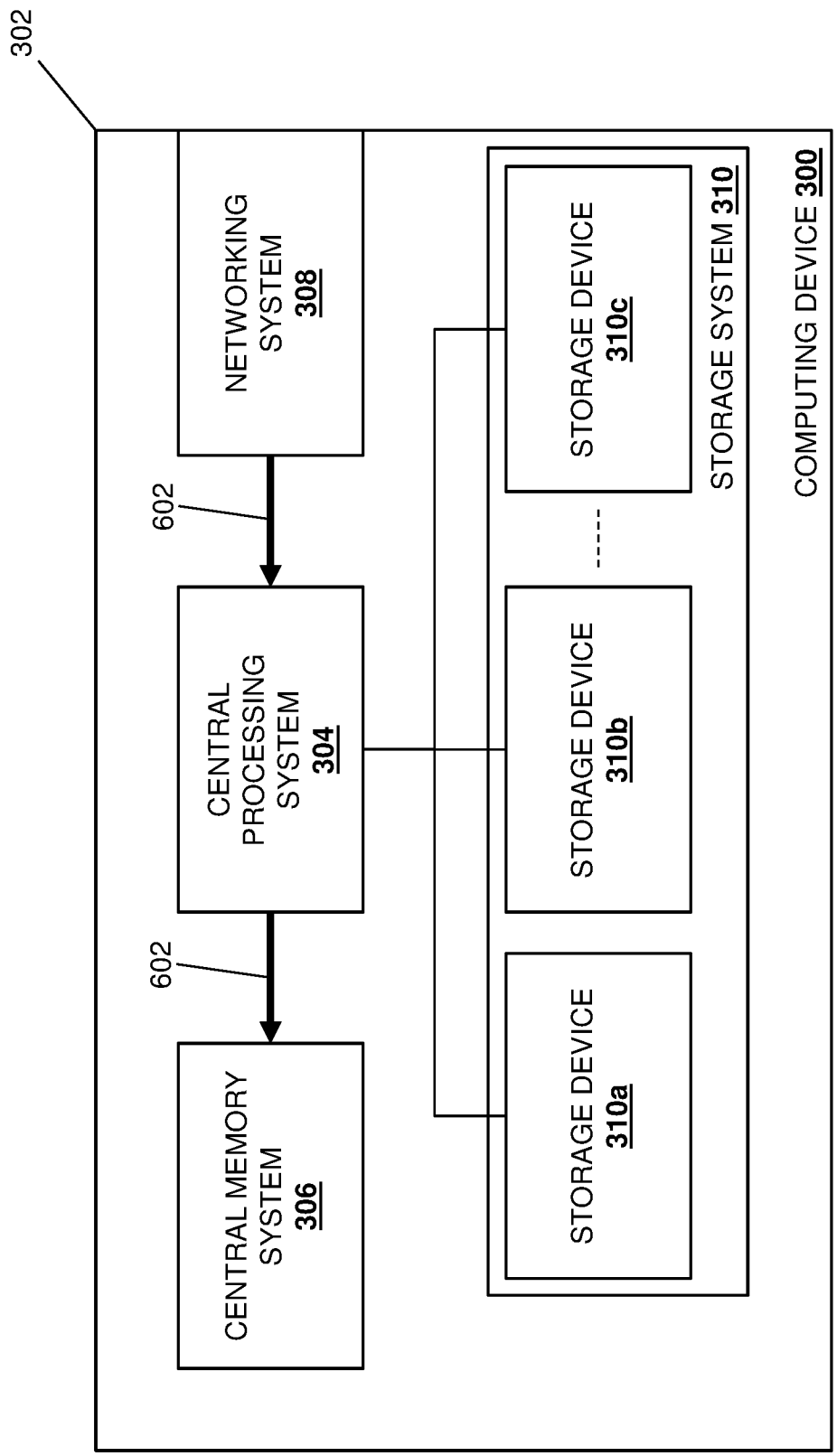
FIG. 6D is a schematic view illustrating an embodiment of the computing device of FIG. 3 performing conventional data storage operations.
Figure 6E:
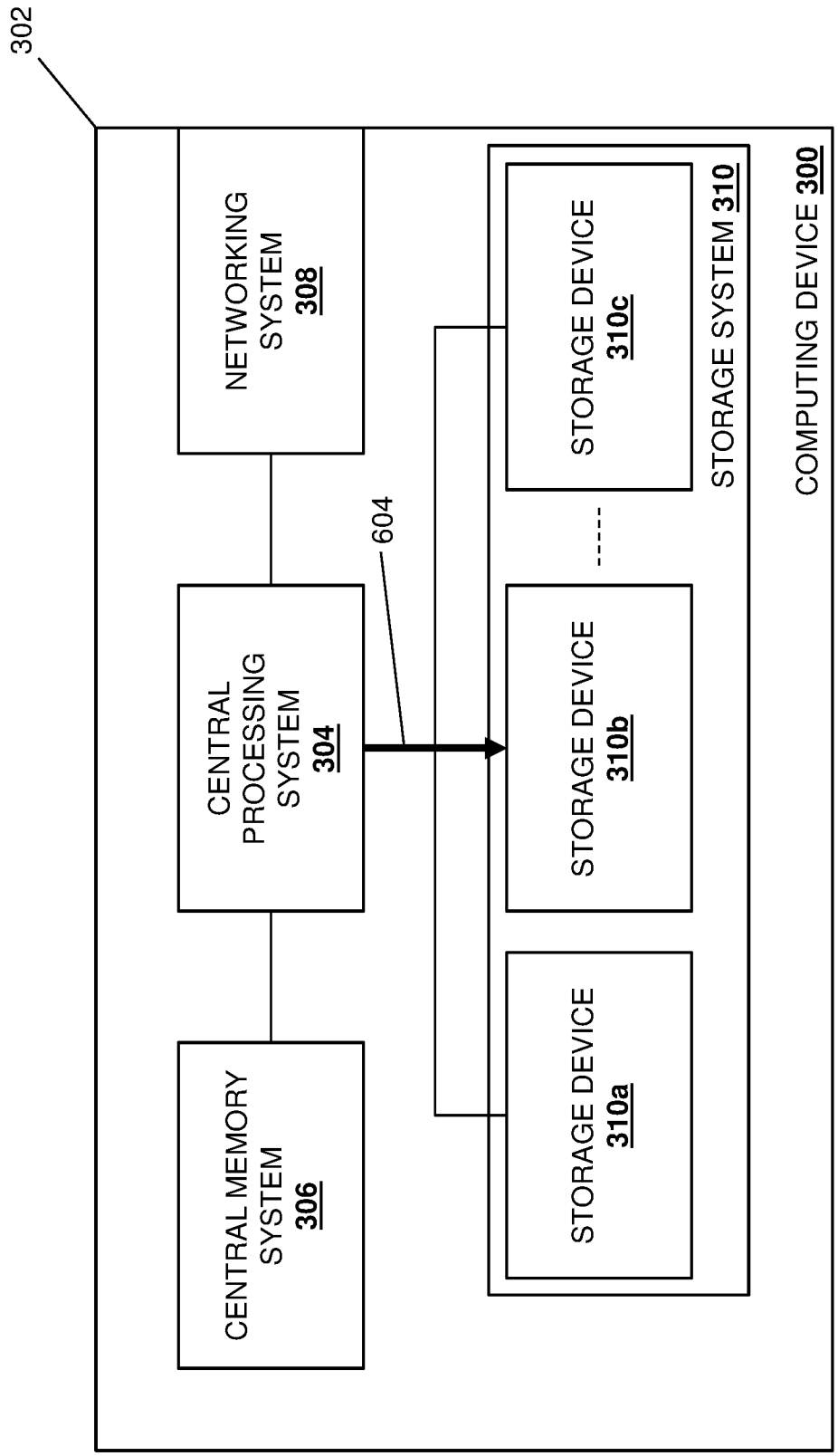
FIG. 6E is a schematic view illustrating an embodiment of the computing device of FIG. 3 performing conventional data storage operations.

Referring now to FIGS. 6A, 6B, 6C, 6D, 6E, 6F, 6G, 6H, and 6I, conventional data storage operations are illustrated and briefly described for the purposes of comparing them to the data storage operations of the present disclosure. With reference to FIGS. 6A and 6B, the networking system 308/400 in the computing device 202a/300 may perform data receiving operations 600 that include the data handling engine 404 receiving a write request including data for writing to the storage system 310 (e.g., the storage device 310b in this example) through the network 204 and via the communication subsystem 408 (e.g., from one of the other computing devices 202b-202d), and providing the data in the memory subsystem 406 (which is provided by a non-addressable buffer memory subsystem in this example). With reference to FIGS. 6C and 6D, the networking system 308/400 in the computing device 300 may then perform Direct Memory Access (DMA) write operations 602 that include the data handling engine 404 performing a DMA write via its communication system 408 and using the data that was stored in its memory subsystem 406 to write that data in the central memory system 306. With reference to FIG. 6E, the central processing system 304 may then perform data retrieval command operations 604 that include transmitting a data retrieval command to the storage device 310b that is configured to cause the storage device 310b to retrieve the data that was stored in the central memory system 306 by the networking system 308.

Figure 6F:
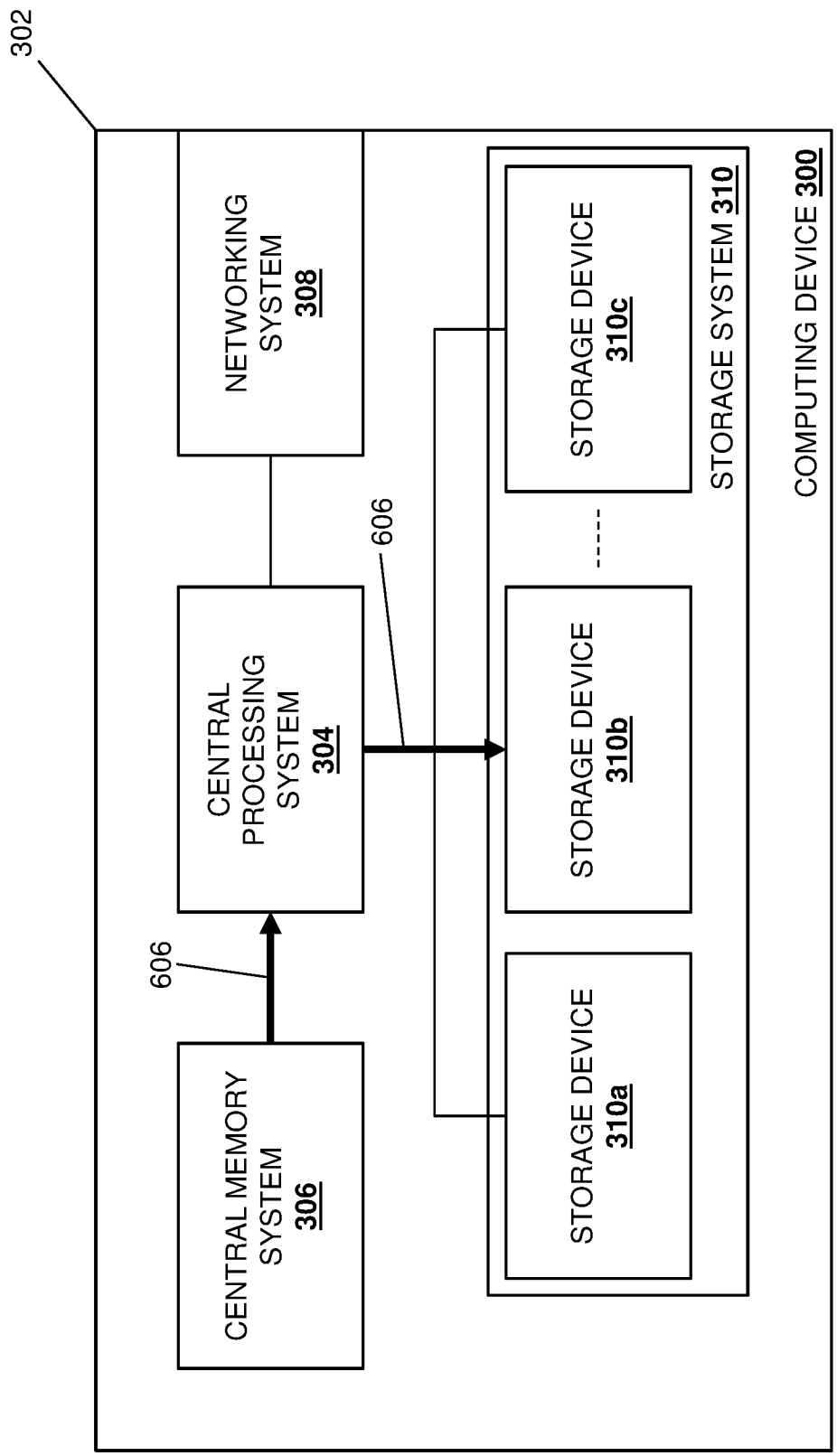
FIG. 6F is a schematic view illustrating an embodiment of the computing device of FIG. 3 performing conventional data storage operations.
Figure 6G:
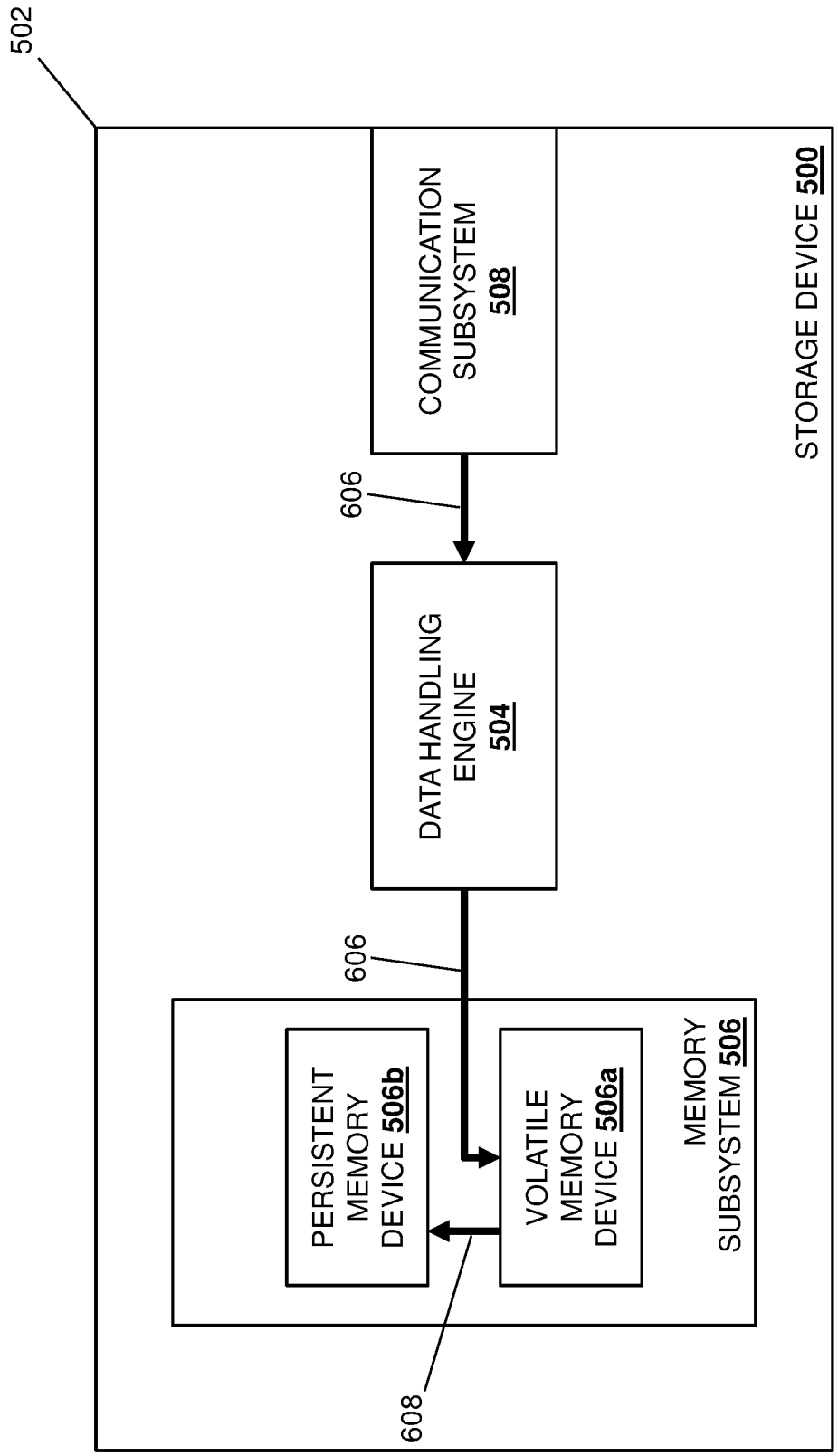
FIG. 6G is a schematic view illustrating an embodiment of the storage device of FIG. 5 performing conventional data storage operations.
Figure 6H:
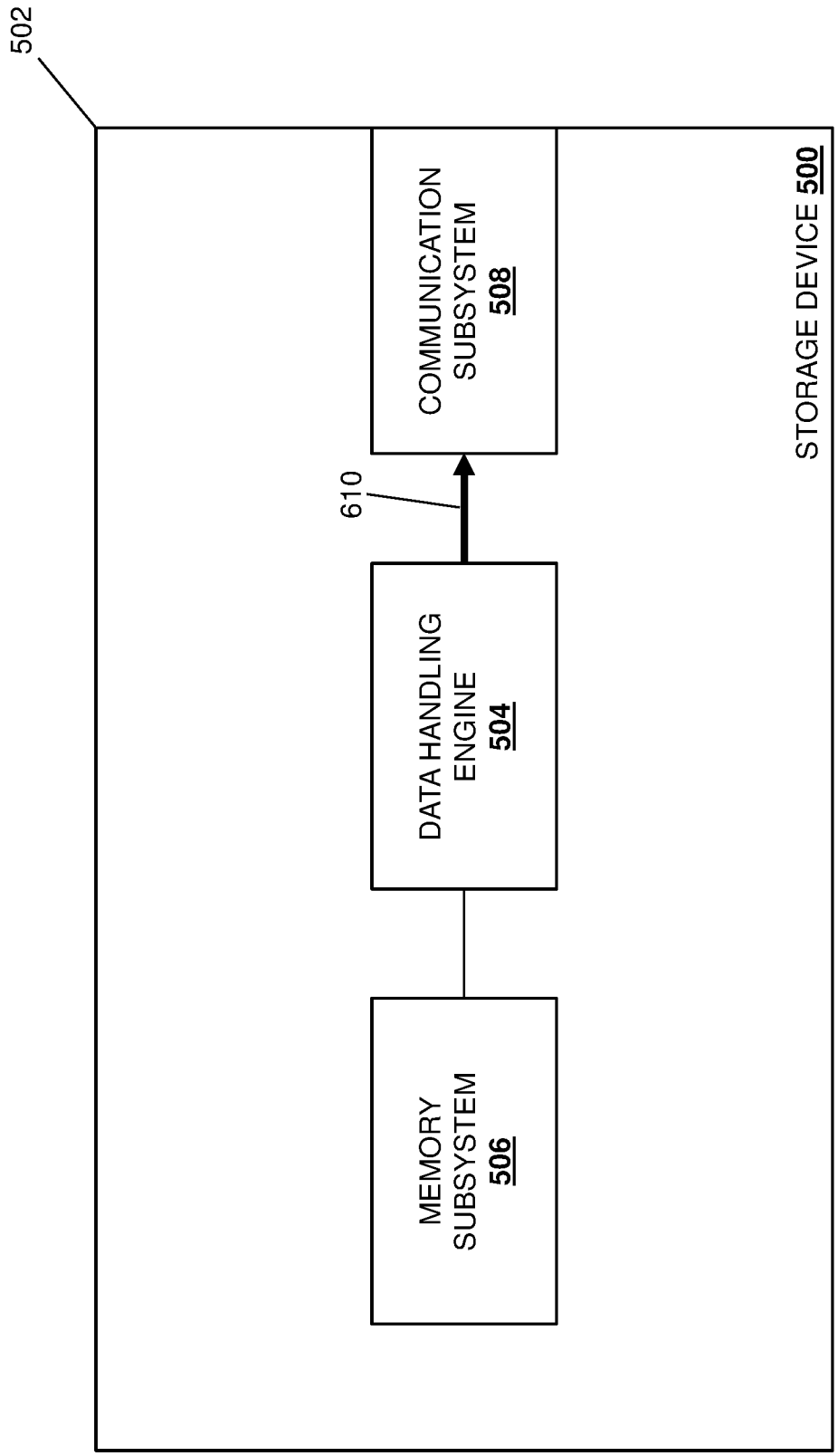
FIG. 6H is a schematic view illustrating an embodiment of the storage device of FIG. 5 performing conventional data storage operations.
Figure 6I:
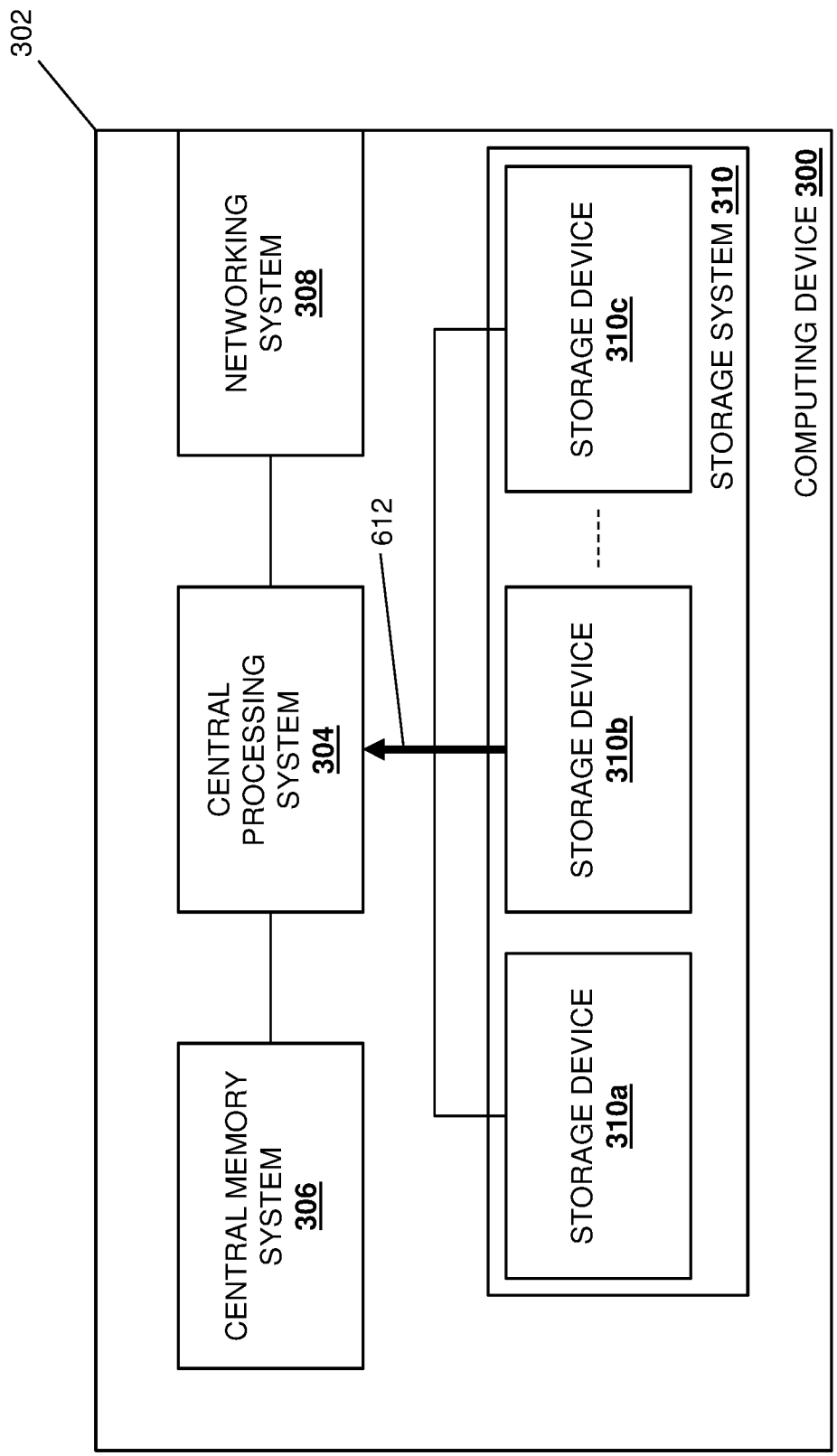
FIG. 6I is a schematic view illustrating an embodiment of the computing device of FIG. 3 performing conventional data storage operations.

As illustrated in FIGS. 6F and 6G, in response to receiving the data retrieval command from the central processing system 304, the storage device 310b/500 may perform DMA read operations 606 that include the data handling engine 504 performing a DMA read via its communication system 508 and on the data that was stored in the central memory system 306 by the networking system 308 to write that data in a volatile memory device 506a (which is provided by a non-addressable buffer memory subsystem in this example) that is included in its memory subsystem 506. With continued reference to FIG. 6G, the data handling engine 504 may then perform persistent storage operations 608 to transfer the data that it stored in its volatile memory device 506a to a persistent memory device 506b (which is provided by a flash memory array subsystem in this example) that is included in its memory subsystem 506. As illustrated in FIG. 6H, the data handling engine 504 in the storage device 310b/500 may then perform completion message provisioning operations 610 that include providing a completion message for the central processing system 304 in a completion queue that is included in its communication system 508. With reference to FIG. 6I, the central processing system 304 may then perform completion message retrieval operations 612 that include retrieving the completion message provided by the storage device 310b/500 (e.g., from the completion queue in the communication system 508 of the storage device 310b/500), which one of skill in the art in possession of the present disclosure will appreciate completes the conventional data storage operations.

As discussed above, the conventional data storage operations described with reference to FIGS. 6A-6I require two DMA operations (e.g., the DMA write operation 602 and the DMA read operation 606), utilize the central memory system 306 as a "bounce" memory where data is stored temporarily on its way to its final storage device/location (i.e., the storage device 310b/500 in this example), and occupy processing cycles of the central processing system 304 to provide a data storage "middleman" that is required to enable the conventional data storage operations. Furthermore, such conventional data storage operations also introduce storage delays, as the storage device 310b cannot perform the DMA read operations 606 to retrieve the data from the central memory system 306 until the networking system 308 has completed the DMA write operation 602 to write all of that data to the central memory system 306.

Figure 7A:
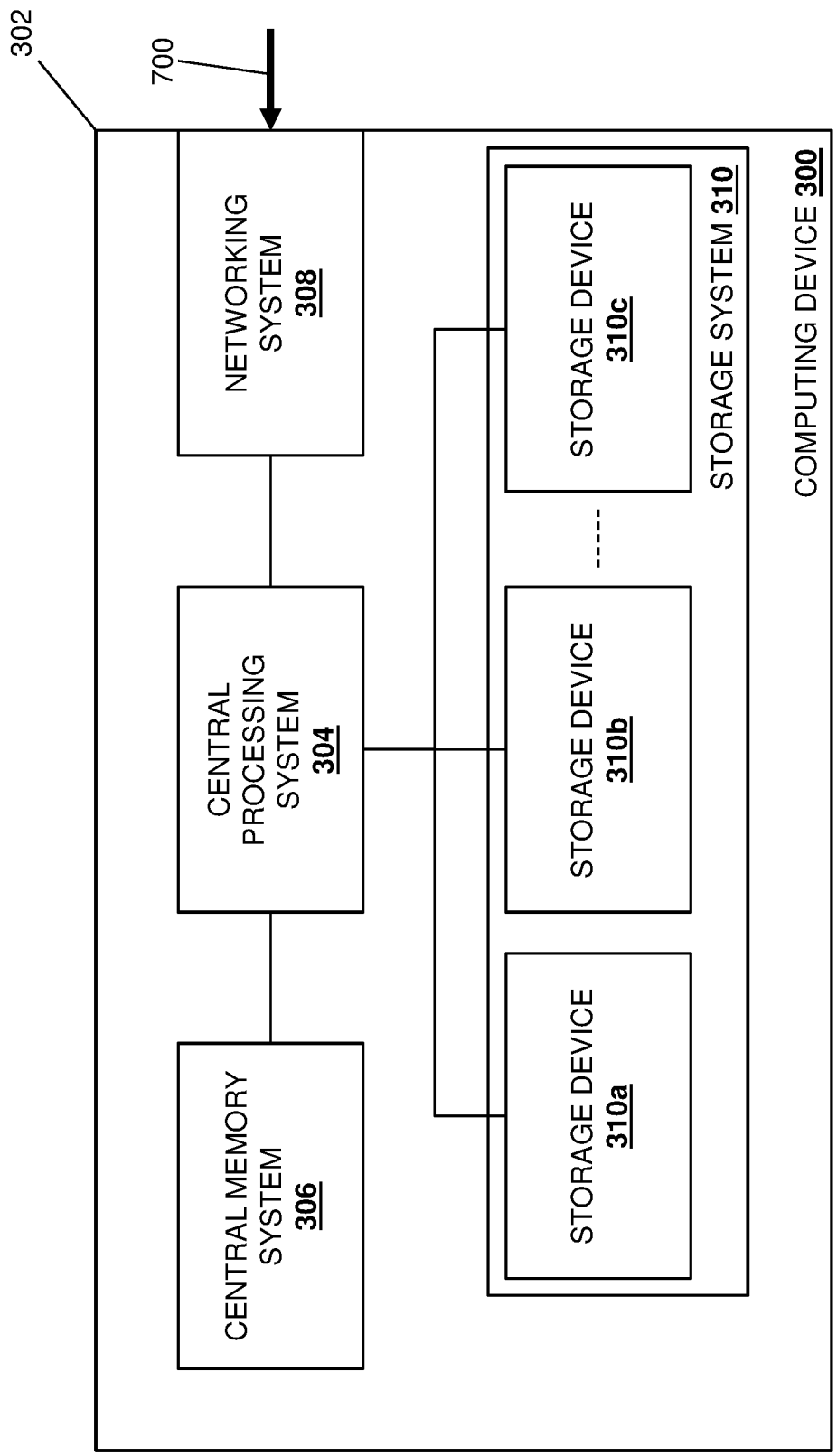
FIG. 7A is a schematic view illustrating an embodiment of the computing device of FIG. 3 performing conventional data retrieval operations.
Figure 7B:
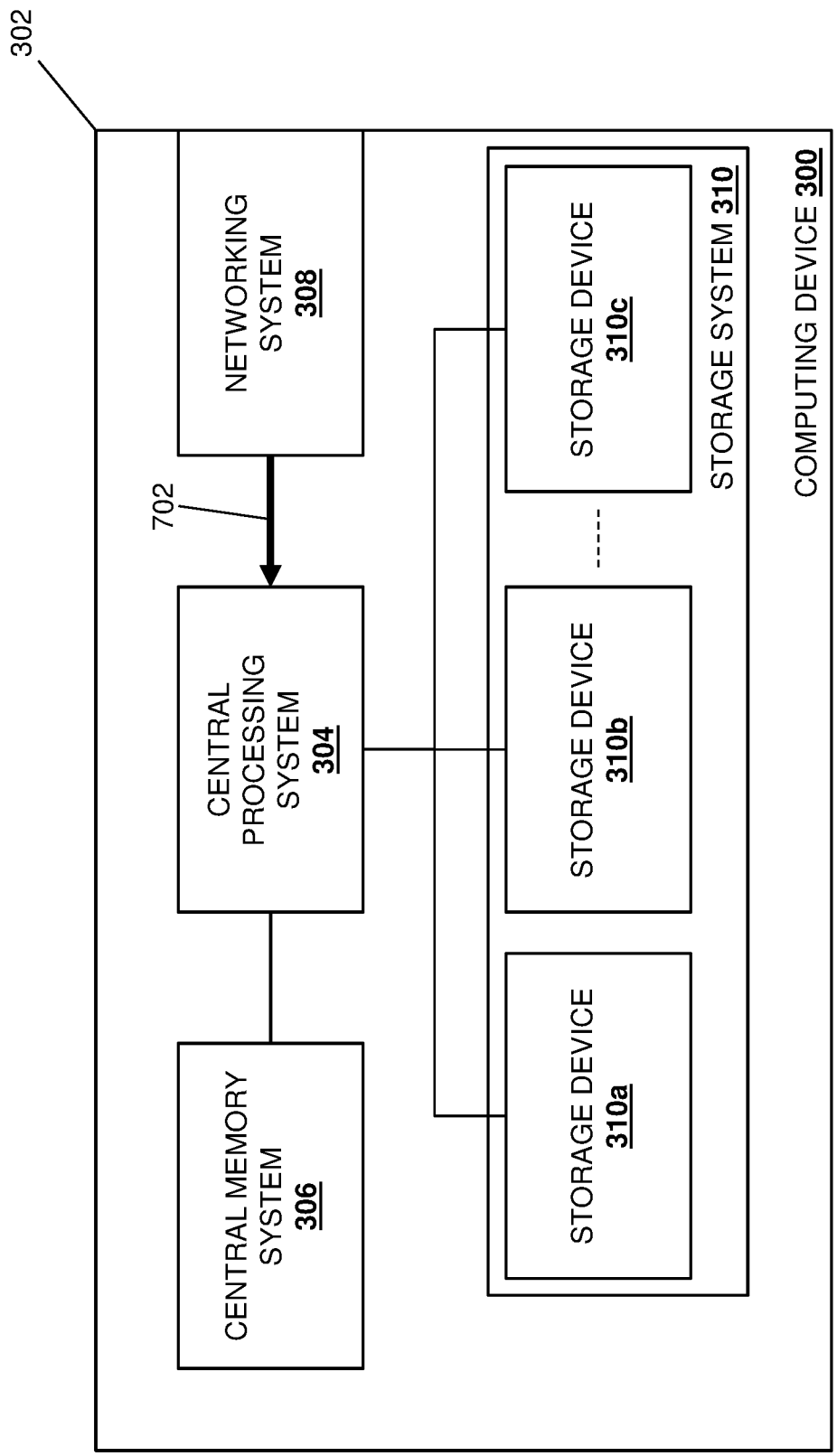
FIG. 7B is a schematic view illustrating an embodiment of the computing device of FIG. 3 performing conventional data retrieval operations.
Figure 7C:
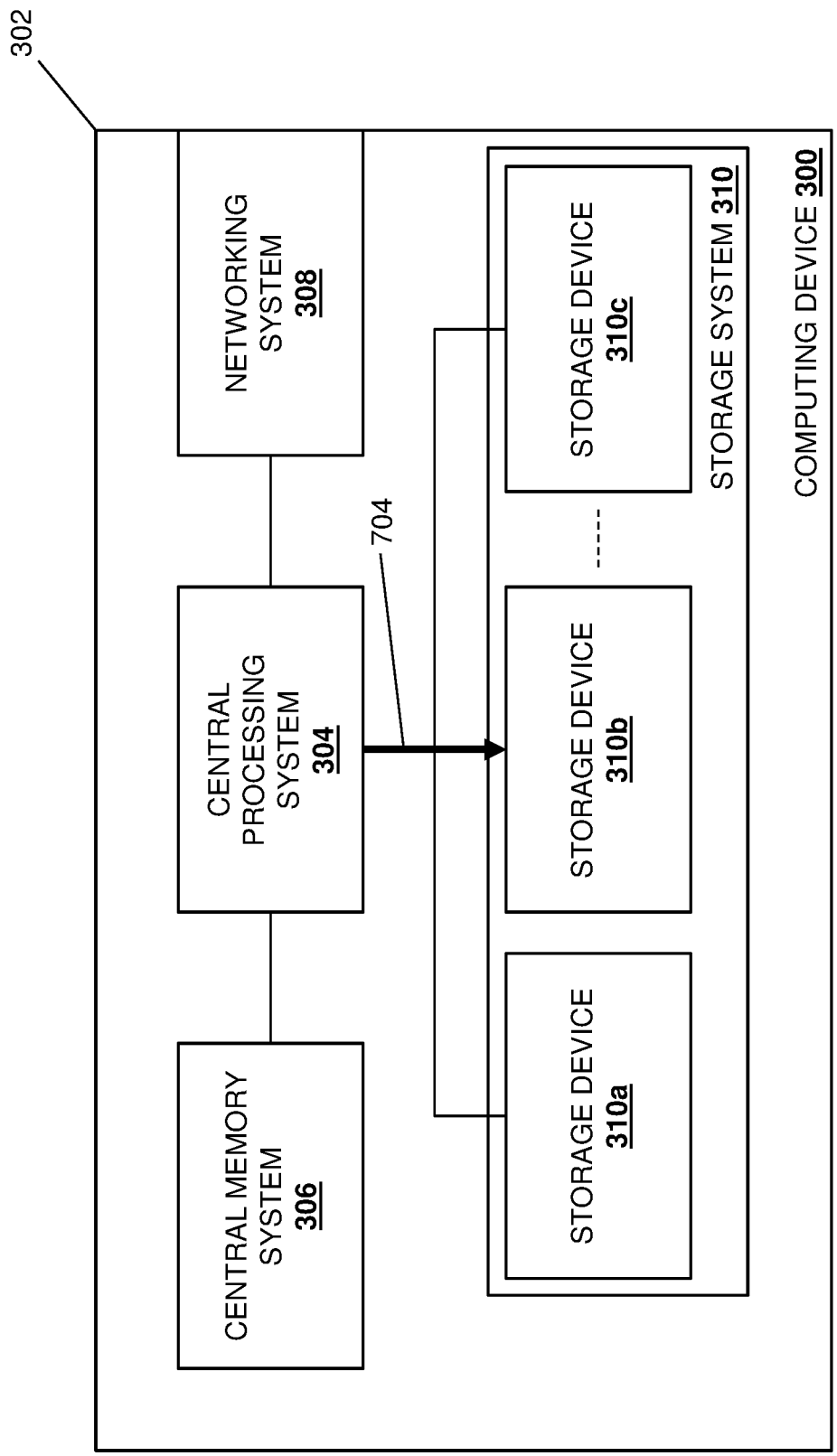
FIG. 7C is a schematic view illustrating an embodiment of the computing device of FIG. 3 performing conventional data retrieval operations.

Referring now to FIGS. 7A, 7B, C, 7D, 7E, 7F, 7G, 7H, and 7I, conventional data retrieval operations are illustrated and briefly described for the purposes of comparing them to the data retrieval operations of the present disclosure. With reference to FIG. 7A, the networking system 308/400 in the computing device 202a/300 may perform read request receiving operations 700 that include the data handling engine 404 receiving a read request identifying data for reading from the storage system 310 (e.g., the storage device 310b in this example) through the network 204 and via the communication subsystem 408 (e.g., from one of the other computing devices 202b-202d). With reference to FIG. 7B, the networking system 308/400 in the computing device 300 may then perform data request forwarding operations 702 that include the data handling engine 404 in the networking system 308/400 forwarding the read request to the central processing system 304. With reference to FIG. 7C, the central processing system 304 may then perform data provisioning command operations 704 that include transmitting a data provisioning command to the storage device 310b (e.g., by providing that data provisioning command in a submission queue in the communication subsystem 508 in the storage device 310b/500) that is configured to cause the storage device 310b to provide the data.

Figure 7D:
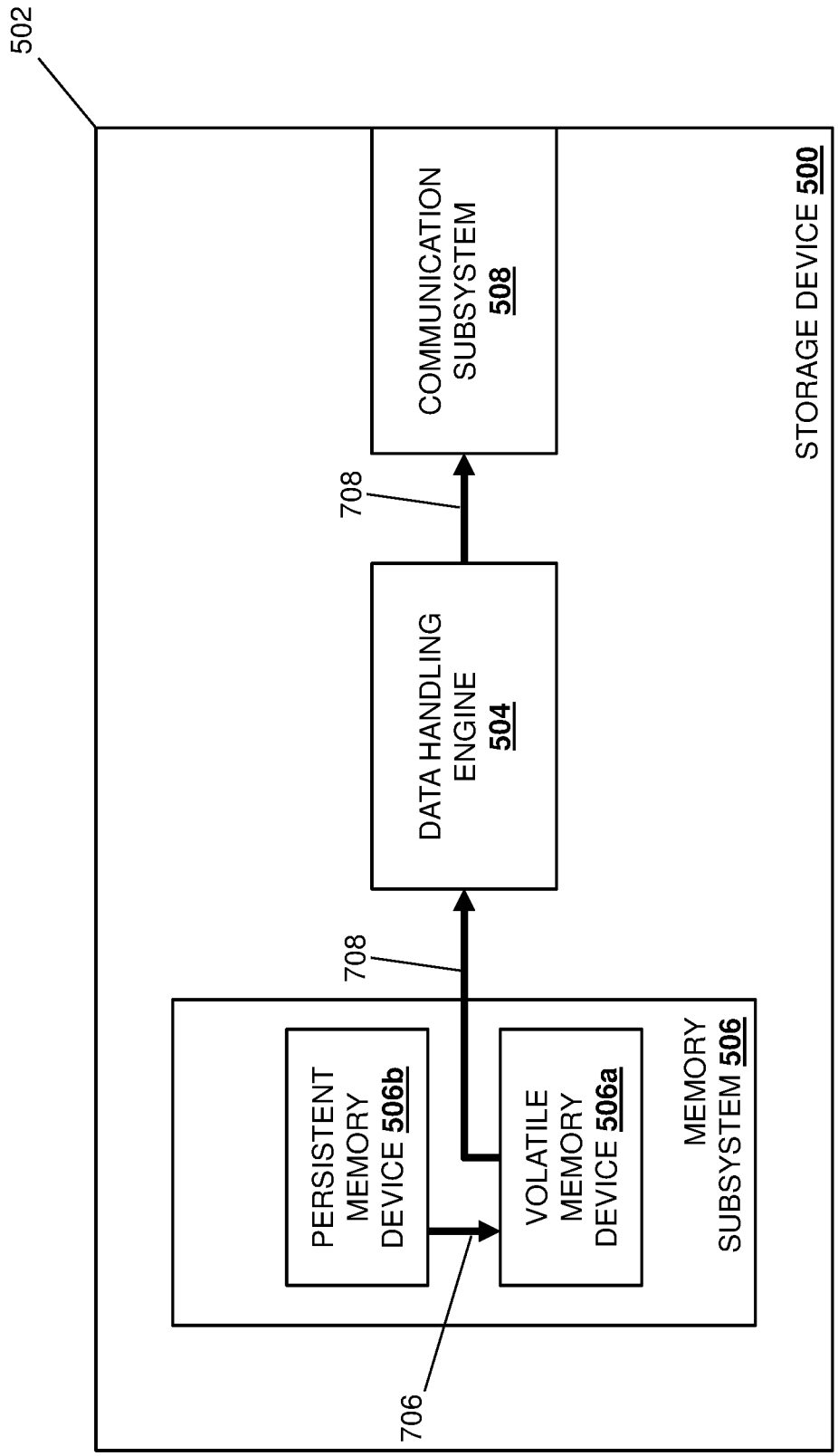
FIG. 7D is a schematic view illustrating an embodiment of the storage device of FIG. 5 performing conventional data retrieval operations.
Figure 7E:
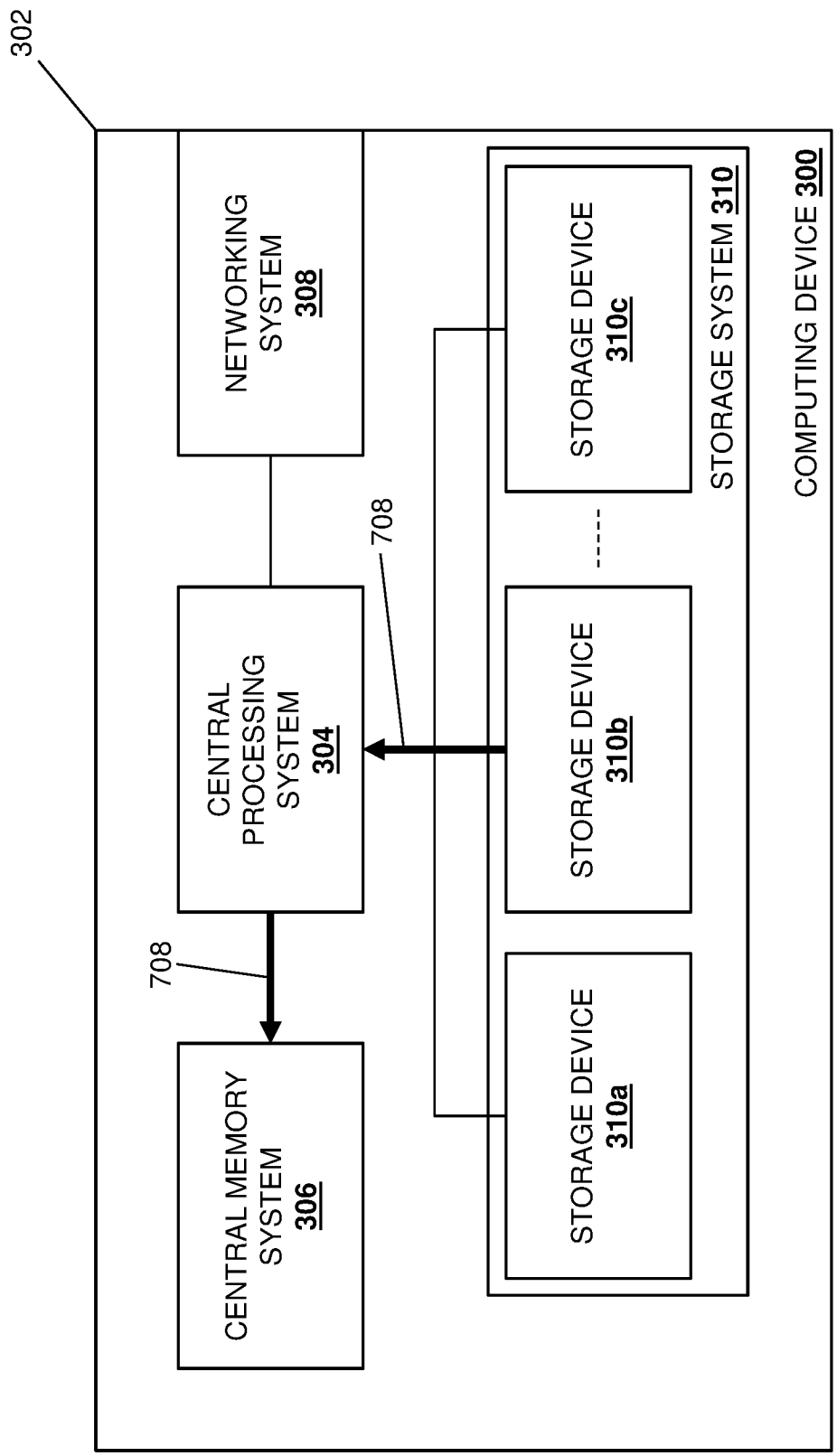
FIG. 7E is a schematic view illustrating an embodiment of the computing device of FIG. 3 performing conventional data retrieval operations.

As illustrated in FIG. 7D, in response to receiving the data provisioning command from the central processing system 304 (e.g., by retrieving that data provisioning command from the submission queue in its communication subsystem 508), the storage device 310b/500 may perform data provisioning preparation operations 706 that include the data handling engine 504 transferring the data from the persistent memory device 506b (which is provided by a flash memory array subsystem in this example) that is included in its memory subsystem 506, to the volatile memory device 506a (which is provided by a non-addressable buffer memory subsystem in this example) that is included in its memory subsystem 506. With continued reference to FIG. 7D and further reference to FIG. 7E, the storage device 310b/500 may then perform DMA write operations 708 that include the data handling engine 504 performing a DMA write via its communication system 508 and on the data that was stored in the volatile memory device 506a in its memory subsystem 506 to write that data in the central memory system 306. With reference to FIG. 7F, the central processing system 304 may then perform data retrieval command operations 710 that include transmitting a data retrieval command to the networking system 308 that is configured to cause the networking system 308 to retrieve the data that was stored in the central memory system 306 by the storage device 310b.

Figure 7G:
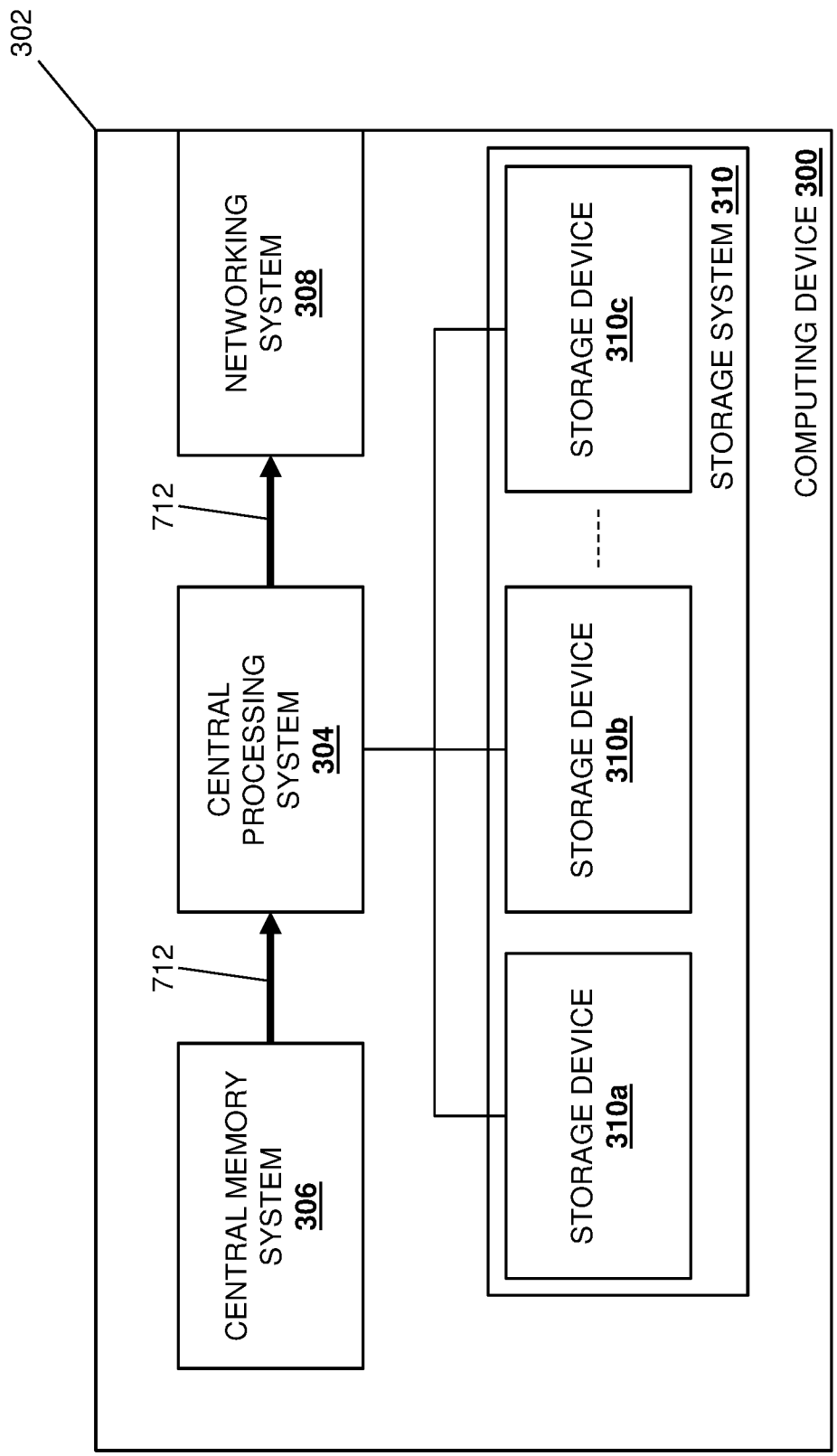
FIG. 7G is a schematic view illustrating an embodiment of the computing device of FIG. 3 performing conventional data retrieval operations.
Figure 7H:
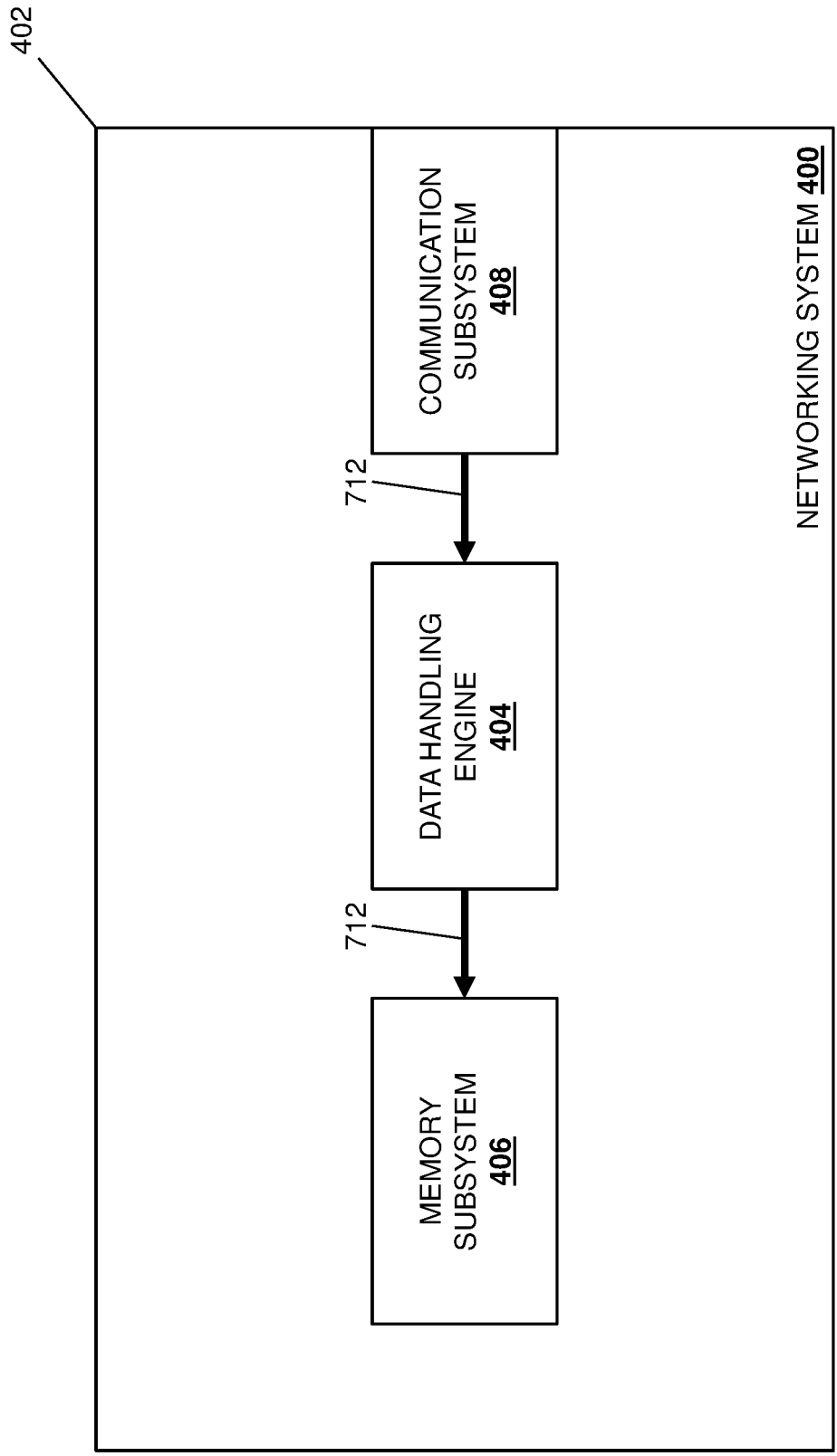
FIG. 7H is a schematic view illustrating an embodiment of the networking system of FIG. 4 performing conventional data retrieval operations.
Figure 7I:
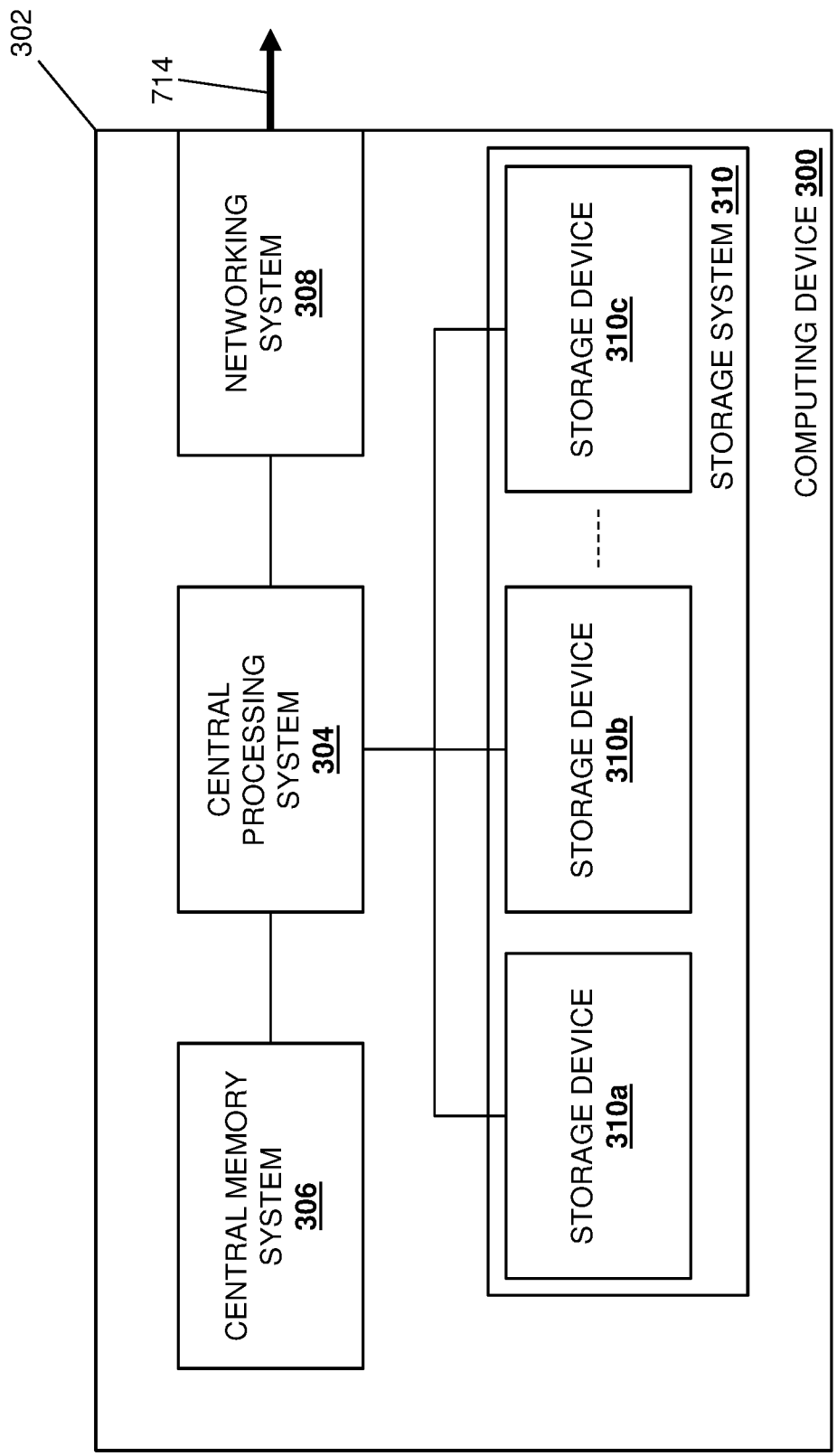
FIG. 7I is a schematic view illustrating an embodiment of the computing device of FIG. 3 performing conventional data retrieval operations.

As illustrated in FIGS. 7G and 7H, in response to receiving the data retrieval command from the central processing system 304, the networking system 308/400 may perform DMA read operations 712 that include the data handling engine 404 performing a DMA read via its communication system 408 and on the data that was stored in the central memory system 306 by the storage device 310b to write that data in its memory subsystem 406 (which is provided by a non-addressable buffer memory subsystem in this example). As illustrated in FIG. 7I, the networking system 308/400 may then perform data transmission operations 714 that include the data handling engine 404 retrieving the data stored in its memory subsystem 406 and transmitting it via its communication subsystem 408 and through the network 204 (e.g., to the one of the other computing devices 202b-202d that sent the read request), which one of skill in the art in possession of the present disclosure will appreciate completes the conventional data retrieval operations.

Similarly discussed above, the conventional data retrieval operations described with reference to FIGS. 7A-7I require two DMA operations (e.g., the DMA write operation 708 and the DMA read operation 712), utilize the central memory system 306 as a "bounce" memory where data is stored temporarily on its way to its requester (e.g., one of the other computing devices 202b-202d in this example), and occupy processing cycles of the central processing system 304 to provide a data storage "middleman" that is required to enable the conventional data retrieval operations. Furthermore, such conventional data retrieval operations also introduce retrieval delays, as the networking system 308 cannot perform the DMA read operations 712 to retrieve the data from the central memory system 306 until the storage device 310b has completed the DMA write operation 708 to write all of that data to the central memory system 306.

Figure 8:
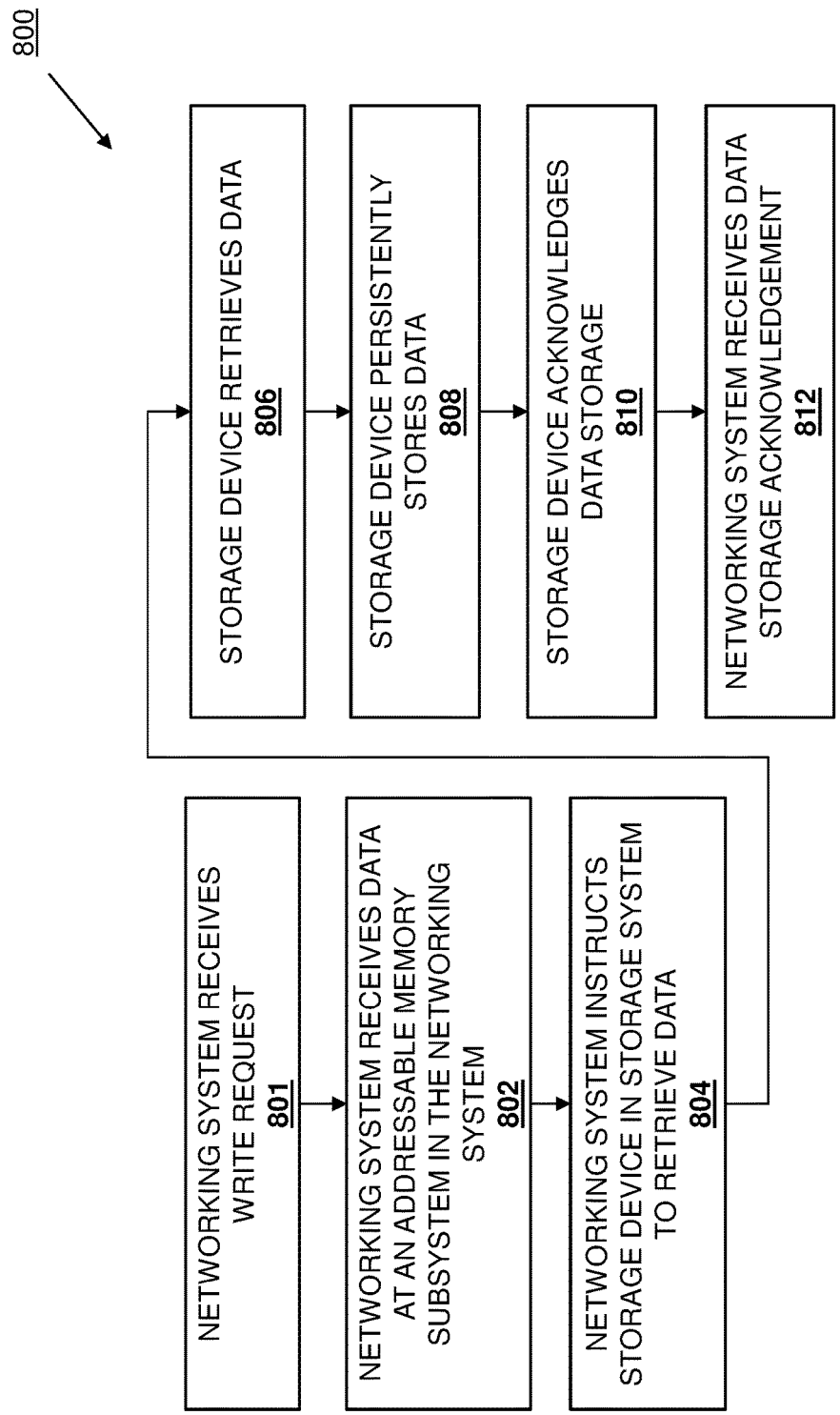
FIG. 8 is a flow chart illustrating an embodiment of a method for direct networking device/storage device write operations.

Referring now to FIG. 8, an embodiment of a method 800 direct networking device/storage device write operations is illustrated. As discussed below, the systems and methods of the present disclosure address the issues present with conventional data storage operations discussed above. For example, the systems and methods of the present disclosure may provide a networking device/storage device direct write system that includes a chassis that houses a Solid State Drive (SSD) storage device coupled to a Smart Network Interface Controller (SmartNIC) networking device. The SmartNIC networking device receives data via a network and in a SmartNIC addressable memory subsystem included in the SmartNIC networking device, and then transmits a data retrieval command to the SSD storage device that causes the SDD storage device to perform DMA read operations that include reading the data from the SmartNIC addressable memory subsystem and writing that data into an SSD memory subsystem in the SSD storage device, and transmitting a completion message to the SmartNIC networking device. As such, the direct networking device/storage device write operations of the present disclosure require only a single DMA read operation, eliminate the use of the central memory subsystem as a "bounce" memory, and eliminate the use of the central processing system as a data storage "middleman", while also eliminating data storage delays that result in conventional data storage systems that require the networking device to complete a DMA write operation to a central memory system before the storage device may perform a DMA read operation from that central memory system as discussed above.

Figure 9A:
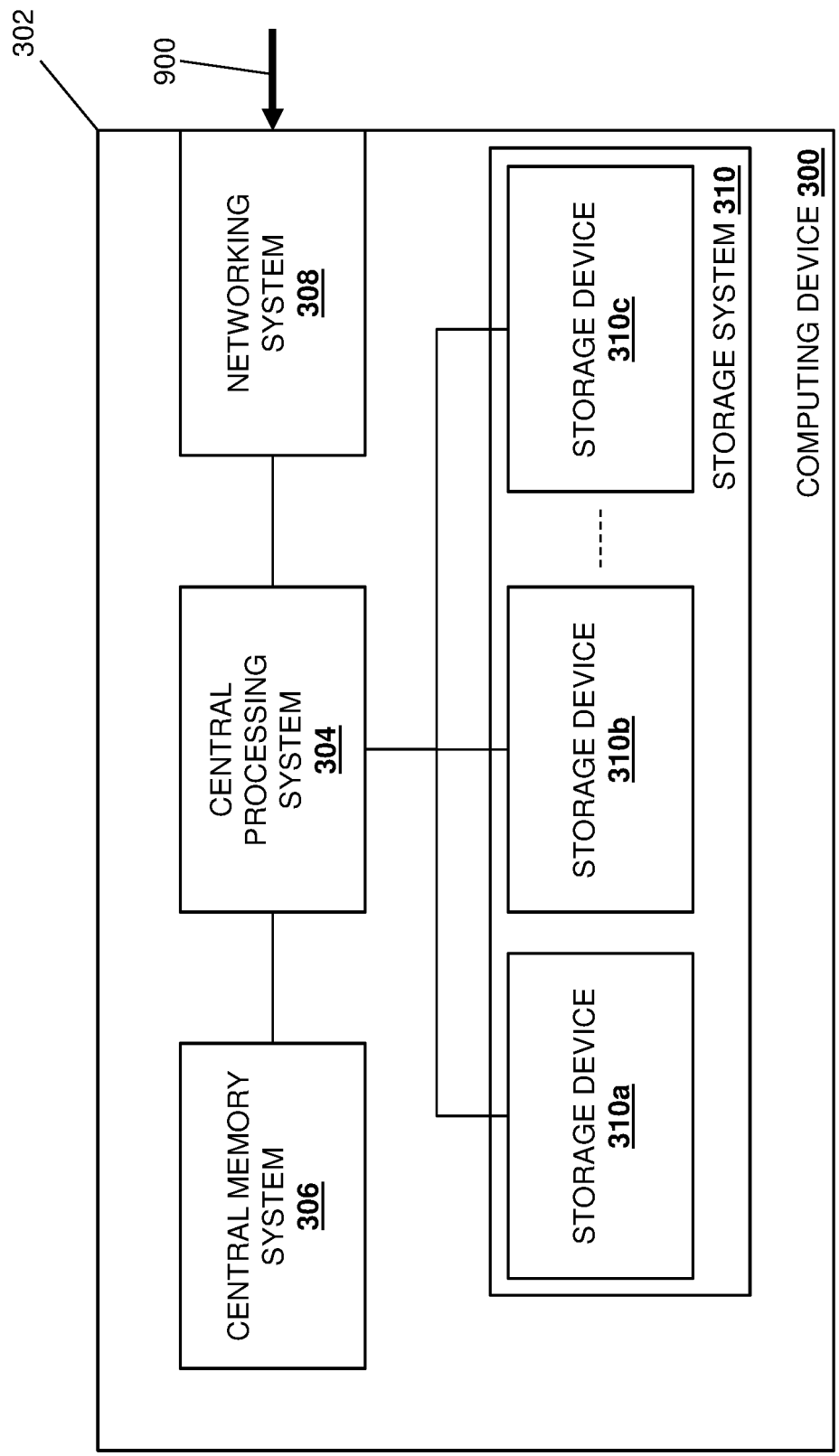
FIG. 9A is a schematic view illustrating an embodiment of the computing device of FIG. 3 operating during the method of FIG. 8.
Figure 9B:
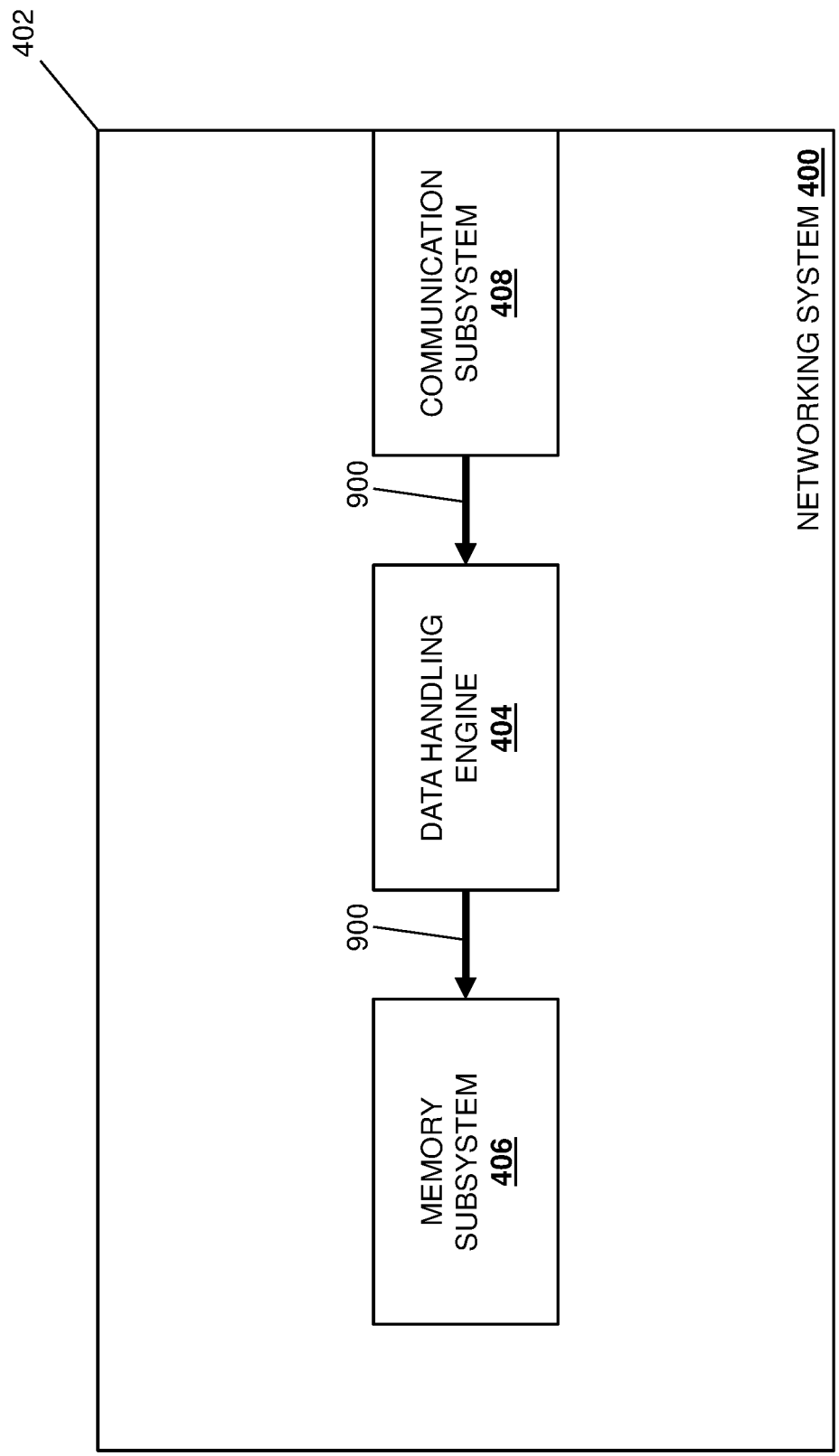
FIG. 9B is a schematic view illustrating an embodiment of the networking system of FIG. 4 operating during the method of FIG. 8.

The method 800 begins at block 801 where a networking system receives a write request. For example, at block 801, the networking system 308/400 may receive a write request/write command that identifies the memory subsystem 406 as the "target" of a write operation, as well as a size of the write operation, and/or other write request/write command parameters that would be apparent to one of skill in the art in possession of the present disclosure. The method 800 then proceeds to block 802 where the networking system receives data at an addressable memory subsystem in the networking system. With reference to FIGS. 9A and 9B, in an embodiment of block 802, the networking system 308/400 in the computing device 202a/300 may perform data receiving operations 900 that include the data handling engine 404 receiving data for writing to the storage system 310 (e.g., the storage device 310b in this example) in the computing system 202a/300 through the network 204 and via the communication subsystem 408 (e.g., from one of the other computing devices 202b-202d), with that data received directly at the memory subsystem 406. For example, at block 802 and in response to acknowledging the write request/write command received at block 801 (e.g., in response to determining that the memory subsystem 406 is large enough to accept the write), the data may be received by the networking system 308/400 via a direct write to an addressable memory subsystem (e.g., addressable within a PCIe memory map) that is provided by its memory subsystem 406.

Figure 9C:
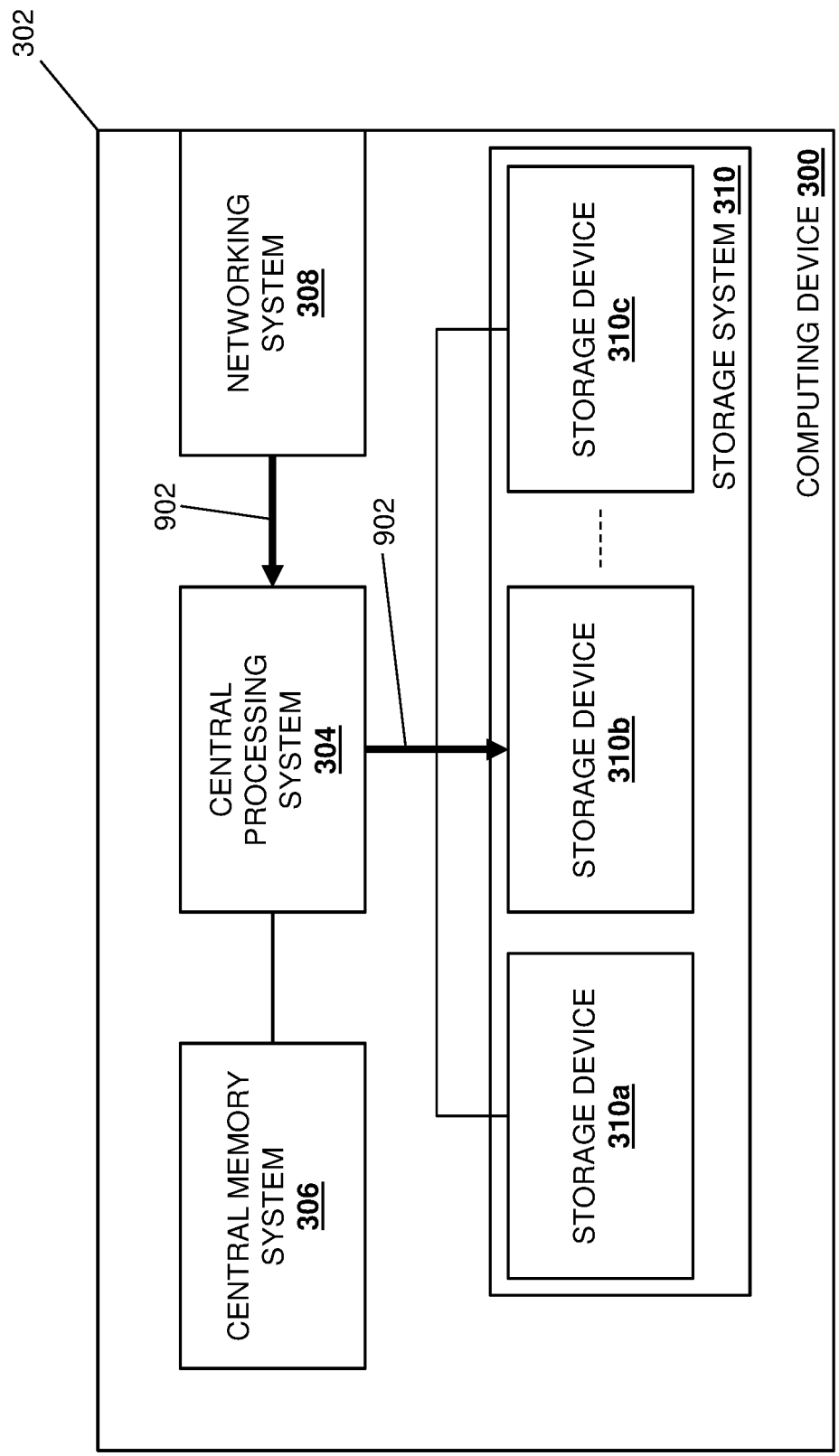
FIG. 9C is a schematic view illustrating an embodiment of the computing device of FIG. 3 operating during the method of FIG. 8.

The method 800 then proceeds to block 804 where the networking system instructs the storage device to retrieve the data. With reference to FIG. 9C, in an embodiment of block 804, the networking system 308/400 in the computing system 308/400 may perform data retrieval command operations 902 that include the data handling engine 404 transmitting a data retrieval command to the storage device 310b. For example, at block 804 the data handling engine 404 in the networking system 308/400 may write the data retrieval command to a submission queue in the storage device 310b, with that data retrieval command identifying data and instructing a DMA read operation of that data from the memory subsystem 406 in the networking system 308/400 that writes that data to the volatile memory device 506a (e.g., a non-addressable buffer memory device in the example below) in the memory subsystem 506 of the storage device 310b/500. However, while a specific data retrieval command (and specific technique for transmitting that data retrieval command) have been described, one of skill in the art in possession of the present disclosure will appreciate that storage devices may be instructed to retrieve data stored in the memory subsystem 406 in the networking system 308/400 in a variety of manners that will fall within the scope of the present disclosure as well.

Figure 9D:
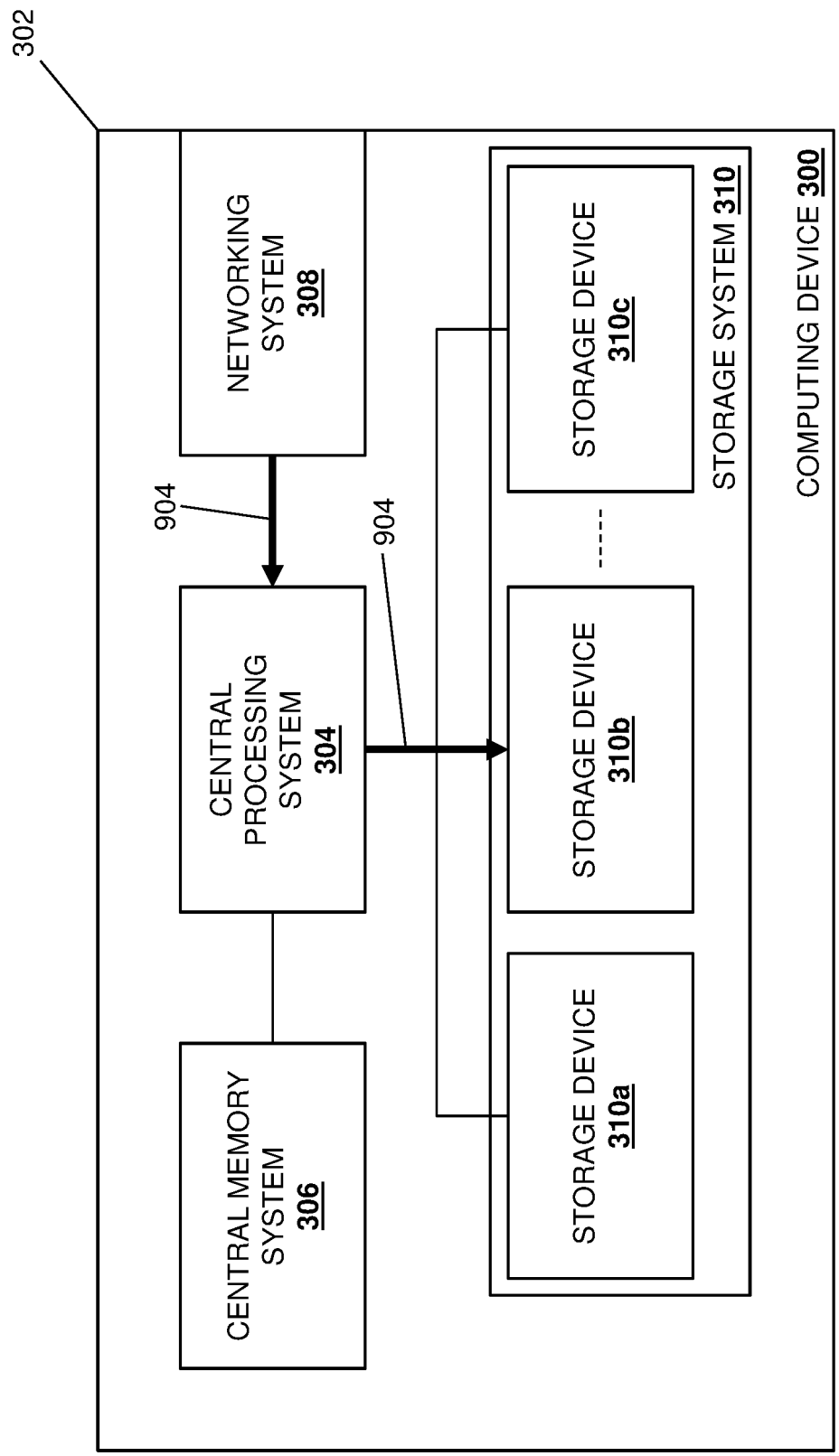
FIG. 9D is a schematic view illustrating an embodiment of the computing device of FIG. 3 operating during the method of FIG. 8.
Figure 9E:
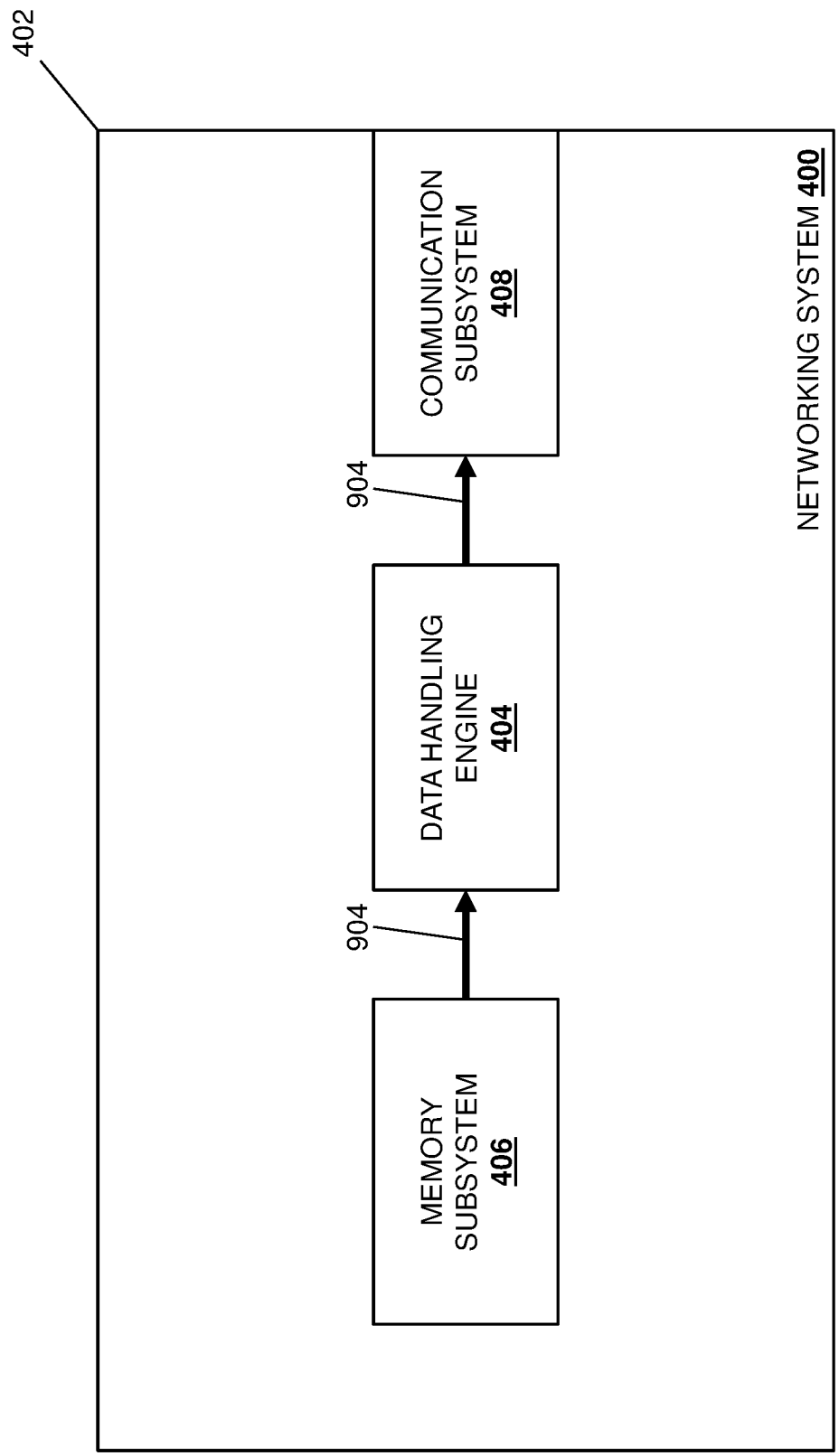
FIG. 9E is a schematic view illustrating an embodiment of the networking system of FIG. 4 operating during the method of FIG. 8.
Figure 9F:
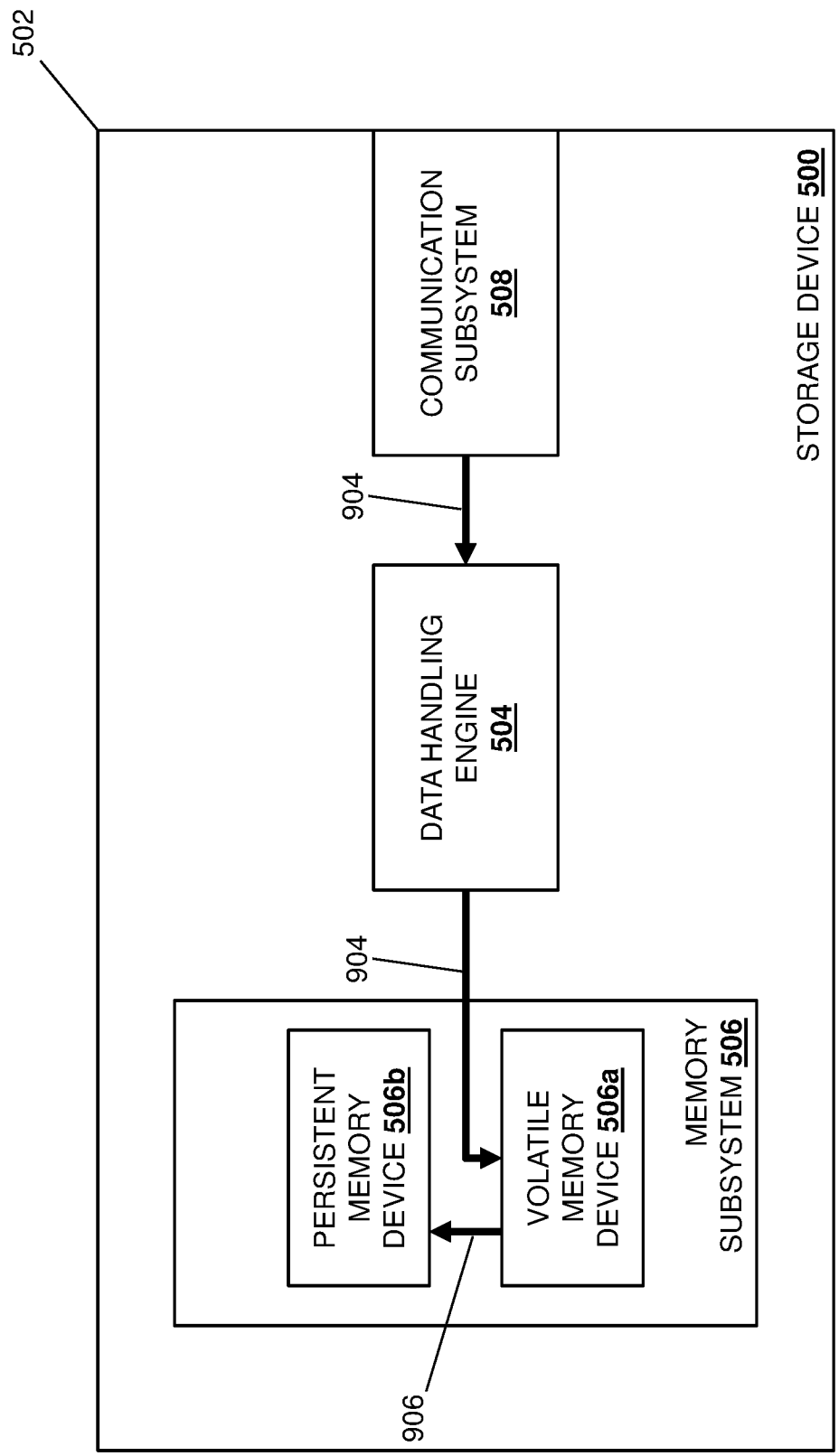
FIG. 9F is a schematic view illustrating an embodiment of the storage device of FIG. 5 operating during the method of FIG. 8.

The method 800 then proceeds to block 806 where the storage device performs data retrieval operations. With reference to FIGS. 9D, 9E, and 9F, in an embodiment of block 806 and in response to receiving the data retrieval command from the networking system 308 (e.g., via the submission queue in its communication subsystem 508), the storage device 310b/500 may perform DMA read operations 904 that include the data handling engine 504 performing a DMA read via its communication system 508 and on the data in memory subsystem 406 of the networking system 308 to write that data to its volatile memory device 506*a* that is included in its memory subsystem 506. For example, at block 806, the DMA read operations 904 may include the data handling engine 504 in the storage device 310*b*/500 writing the data from the memory subsystem 406 of the networking system 308 to a non-addressable buffer memory subsystem that is provided by the volatile memory device 506*a* in the memory subsystem 506. As will be appreciated by one of skill in the art in possession of the present disclosure, the DMA read performed during the DMA read operation 904 allows the data handling engine 504 to directly access the memory subsystem 406 in order to read data therein, and then write that data to the volatile memory device 506*a* in its memory subsystem 506. However, while a particular data retrieval operation is illustrated and described, one of skill in the art in possession of the present disclosure will appreciate that storage devices may retrieve data from the networking system 308 in a variety of manners that will fall within the scope of the present disclosure as well.

The method 800 then proceeds to block 808 where the storage device persistently stores the data. With continued reference to FIG. 9F, in an embodiment of block 808, the data handling engine 504 in the storage device 310*b*/500 may then perform persistent storage operations 906 to transfer the data that it stored in its volatile memory device 506*a* to the persistent memory device 506*b* that is included in its memory subsystem 506. For example, at block 808, the data handling engine 504 in the storage device 310*b*/500 may transfer the data from the non-addressable buffer memory subsystem that is provided by the volatile memory device 506*a* in the memory subsystem 506 to a flash memory array subsystem that is provided by the persistent memory device 506*b* in the memory subsystem 506. However, as discussed below, in other embodiments the DMA read performed during the DMA read operation 904 by the data handling engine 504 in the storage device 310*b*/500 at block 806 may include writing the data directly to the persistent memory device 506*b* in the memory subsystem 506.

Figure 9G:
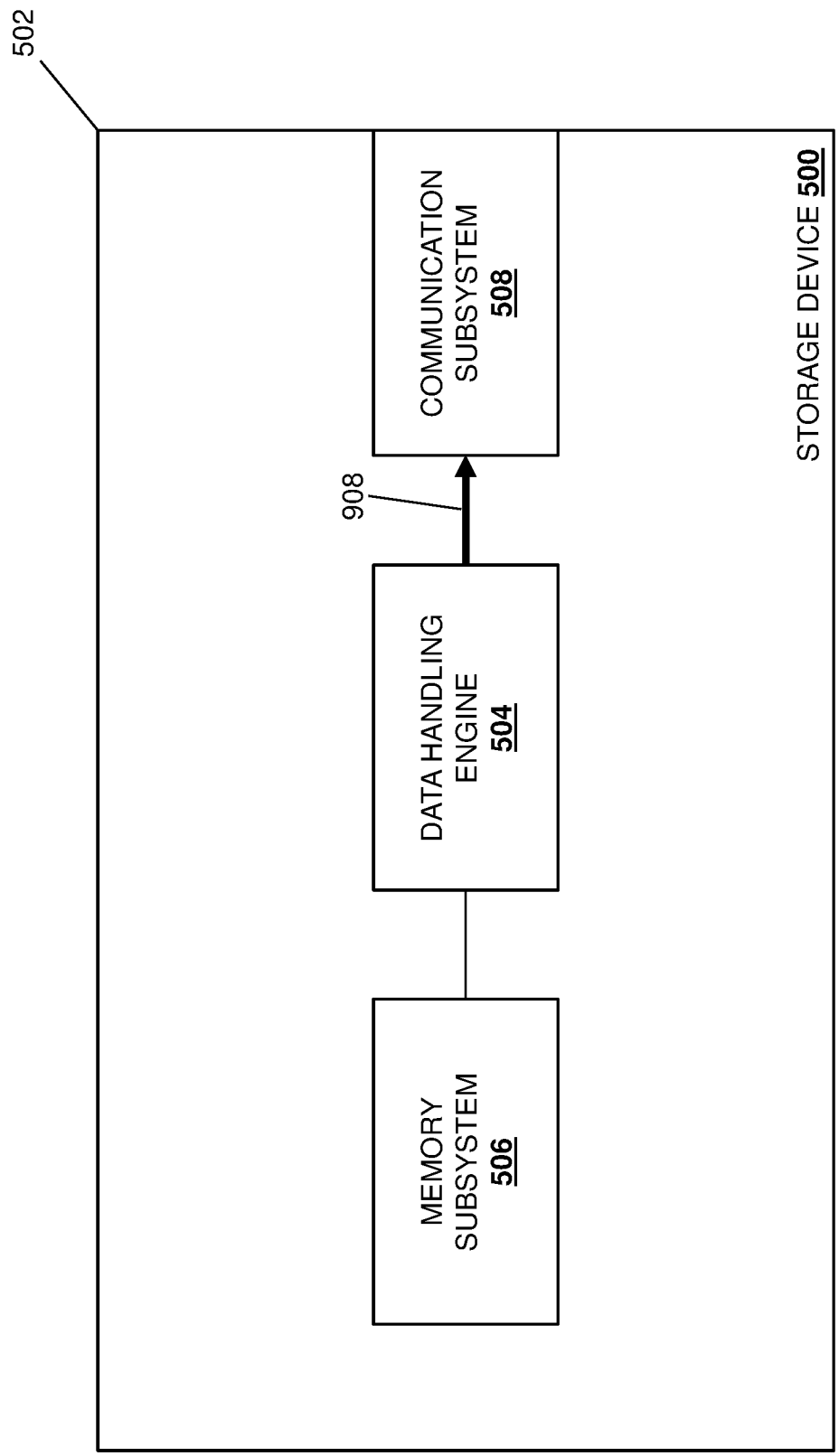
FIG. 9G is a schematic view illustrating an embodiment of the storage device of FIG. 5 operating during the method of FIG. 8.
Figure 9H:
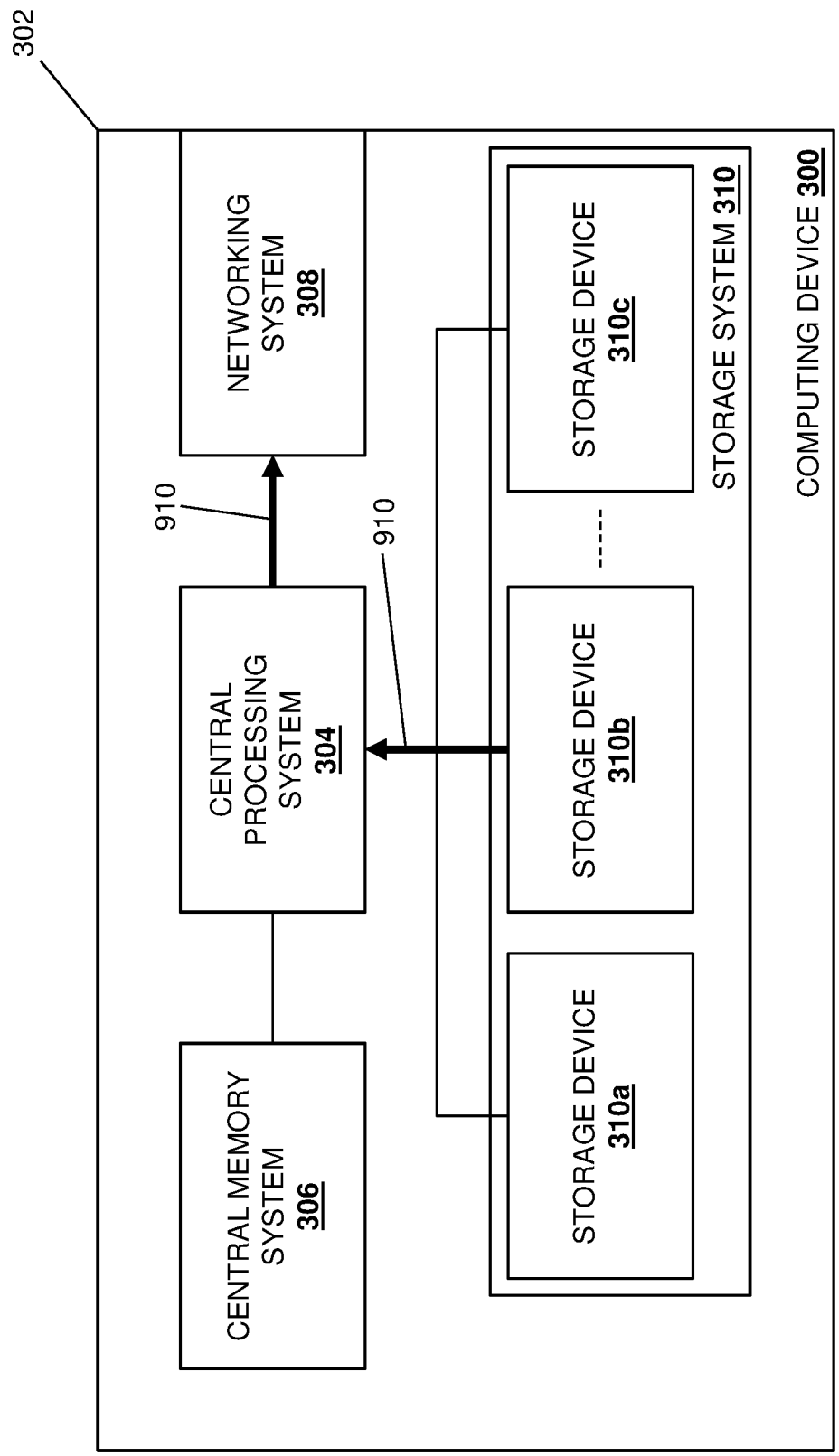
FIG. 9H is a schematic view illustrating an embodiment of the computing device of FIG. 3 operating during the method of FIG. 8.

The method 800 then proceeds to block 810 where the storage device acknowledges the data storage. With reference to FIG. 9G, in an embodiment of block 810, the data handling engine 504 in the storage device 310*b*/500 may then perform completion message provisioning operations 610 that include providing a completion message for the networking system 308. For example, at block 810, the data handling engine 504 in the storage device 310*b*/500 may provide a completion message in a completion queue that is included in its communication system 508, with that completion message indicating the data received by the networking device at block 802 has been persistently stored. The method 800 then proceeds to block 812 where the networking system receives the acknowledgement of the data storage. With reference to FIG. 9H, in an embodiment of block 812, the networking system 308 may then perform completion message receiving operations 910 that include receiving the completion message provided by the storage device 310*b*/500 at block 810. For example, at block 812, the data handling engine 404 in the networking system 308/400 may access the completion message in the completion queue in the communication subsystem 508 of the storage device 310*b*/500, which one of skill in the art in possession of the present disclosure will appreciate completes the data storage operations performed according the method 800.

Thus, systems and methods have been described that address the issues present with conventional data storage operations discussed above. For example, the systems and methods of the present disclosure may provide a networking device/storage device direct write system that includes a chassis that houses a Solid State Drive (SSD) storage device coupled to a Smart Network Interface Controller (Smart-NIC) networking device. The SmartNIC networking device receives data via a network and in a SmartNIC addressable memory subsystem included in the SmartNIC networking device, and then transmits a data retrieval command to an SSD storage device that causes the SDD storage device to perform DMA read operations that include reading the data from the SmartNIC addressable memory subsystem and writing that data into an SSD memory subsystem in the SSD storage device, and transmitting a completion message to the SmartNIC networking device. As such, the direct networking device/storage device write operations of the present disclosure require only a single DMA read operation, eliminate the use of the central memory subsystem as a "bounce" memory, and eliminate the use of the central processing system as a data storage "middleman", while also eliminating data storage delays that result in conventional data storage systems that require the networking device to complete a DMA write operation to a central memory system before the storage device may perform a DMA read operation from that central memory system as discussed above.

Figure 10:
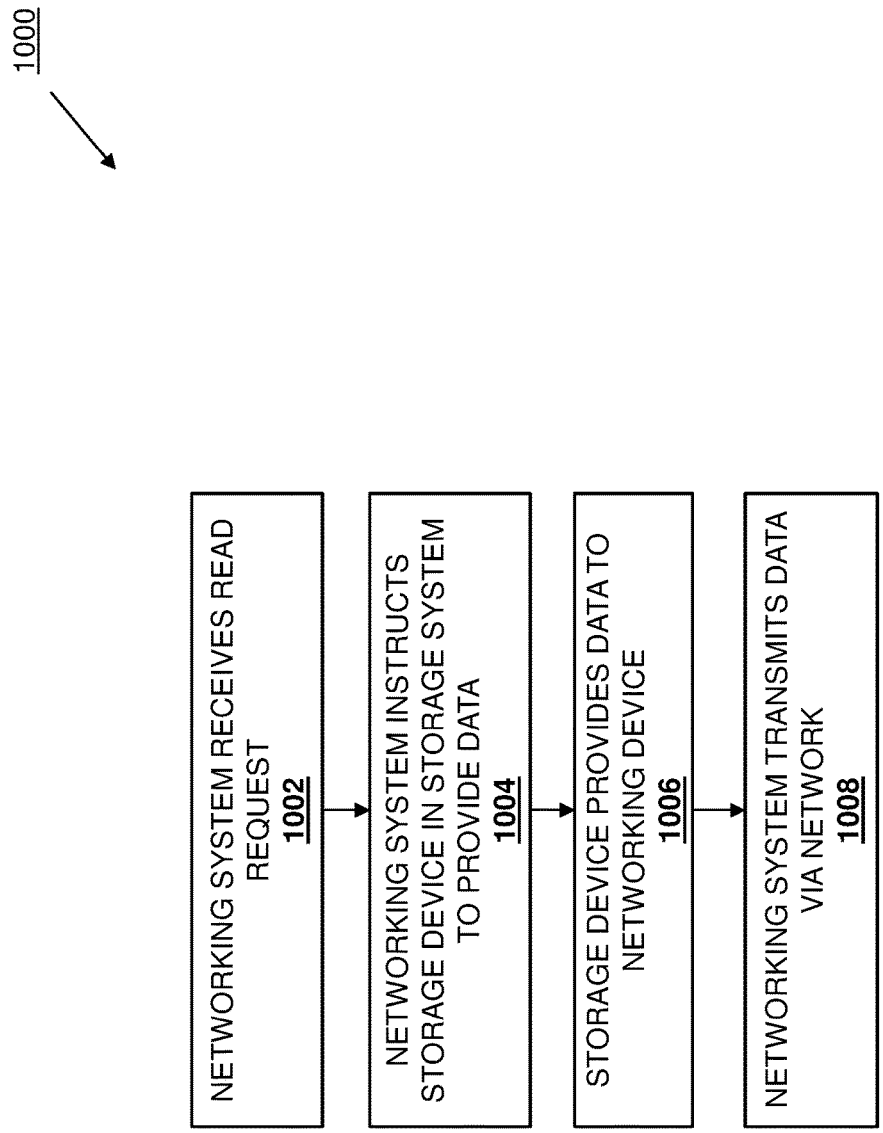
FIG. 10 is a flow chart illustrating an embodiment of a method for direct networking device/storage device read operations.

Referring now to FIG. 10, an embodiment of a method 1000 for direct networking device/storage device read operations is illustrated. As discussed below, the systems and methods of the present disclosure address the issues present with conventional data retrieval operations discussed above. For example, the systems and methods of the present disclosure provide a networking device/storage device direct read system that includes a chassis that houses a Solid State Drive (SSD) storage device coupled to a Smart Network Interface Controller (SmartNIC) networking device. The SmartNIC networking device receives a read request via a network, and then transmits a data retrieval command to an SSD storage device that causes the SDD storage device to transfer the data from a persistent memory device to a volatile memory device in its SSD memory subsystem, and then perform a Direct Memory Access (DMA) write operation to read that data from the volatile memory device in its SSD memory subsystem and write that data to an SmartNIC addressable memory subsystem in the SmartNIC networking device, with the SmartNIC networking device then transmitting that data via the network. As such, the direct networking device/storage device read operations of the present disclosure require only a single DMA write operation, eliminate the use of the central memory subsystem as a "bounce" memory, and eliminate the use of the central processing system as a data storage "middleman", while also eliminating data retrieval delays that result in conventional data retrieval systems that require the storage device to complete a DMA write operation to a central memory system before the networking device may perform a DMA read operation from that central memory system as discussed above.

Figure 11A:
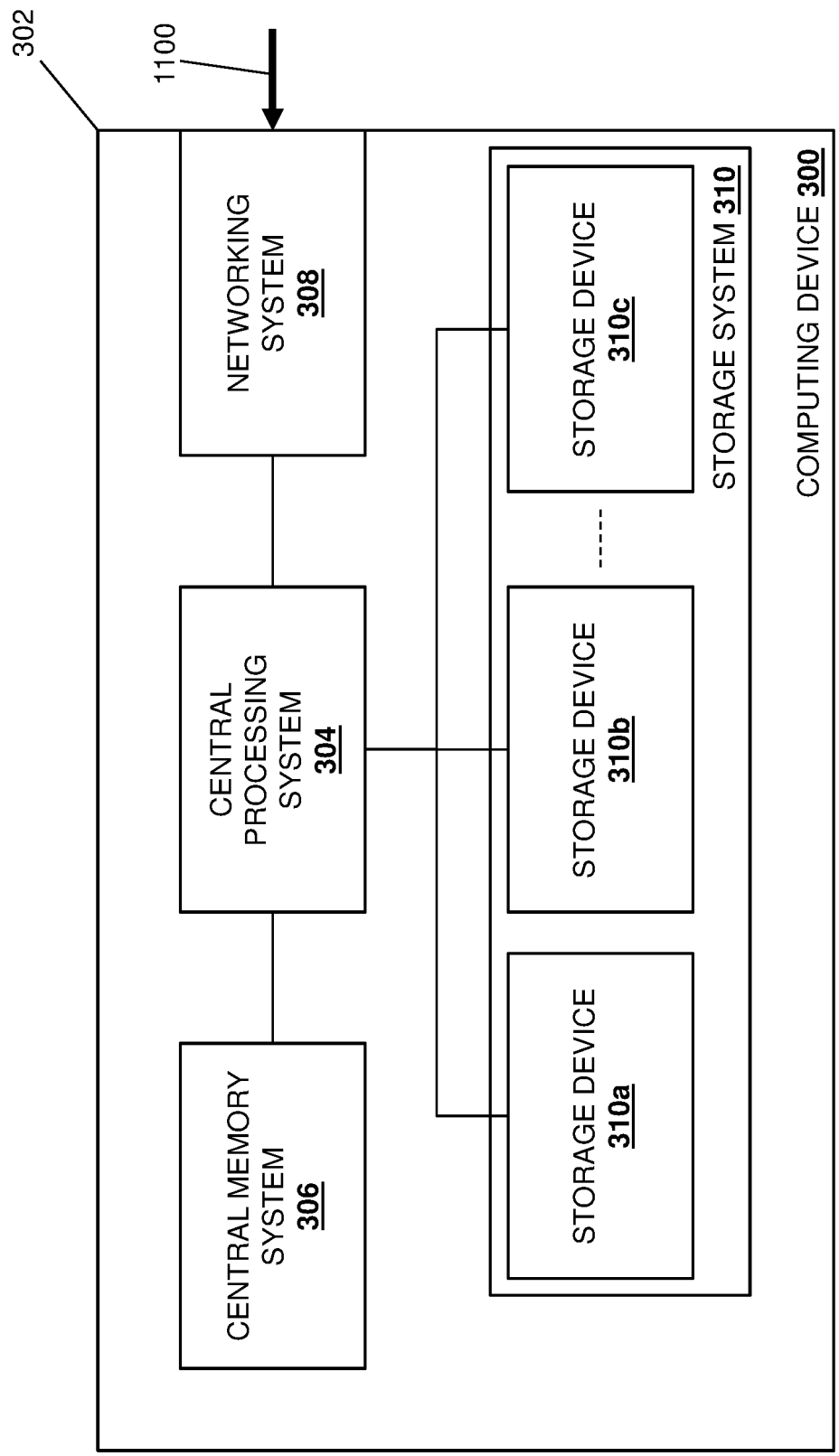
FIG. 11A is a schematic view illustrating an embodiment of the computing device of FIG. 3 operating during the method of FIG. 10.

The method 1000 begins at block 1002 where a networking system receives a read request. With reference to FIG. 11A, in an embodiment of block 1002, the networking system 308/400 in the computing device 202*a*/300 may perform read request receiving operations 1100 that include the data handling engine 404 receiving a read request identifying data for reading from the storage system 310 (e.g., the storage device 310*b* in this example), with that read request received through the network 204 (e.g., from one of the other computing devices 202b-202d) and via the communication subsystem 408 in the networking system 308/400.

Figure 11B:
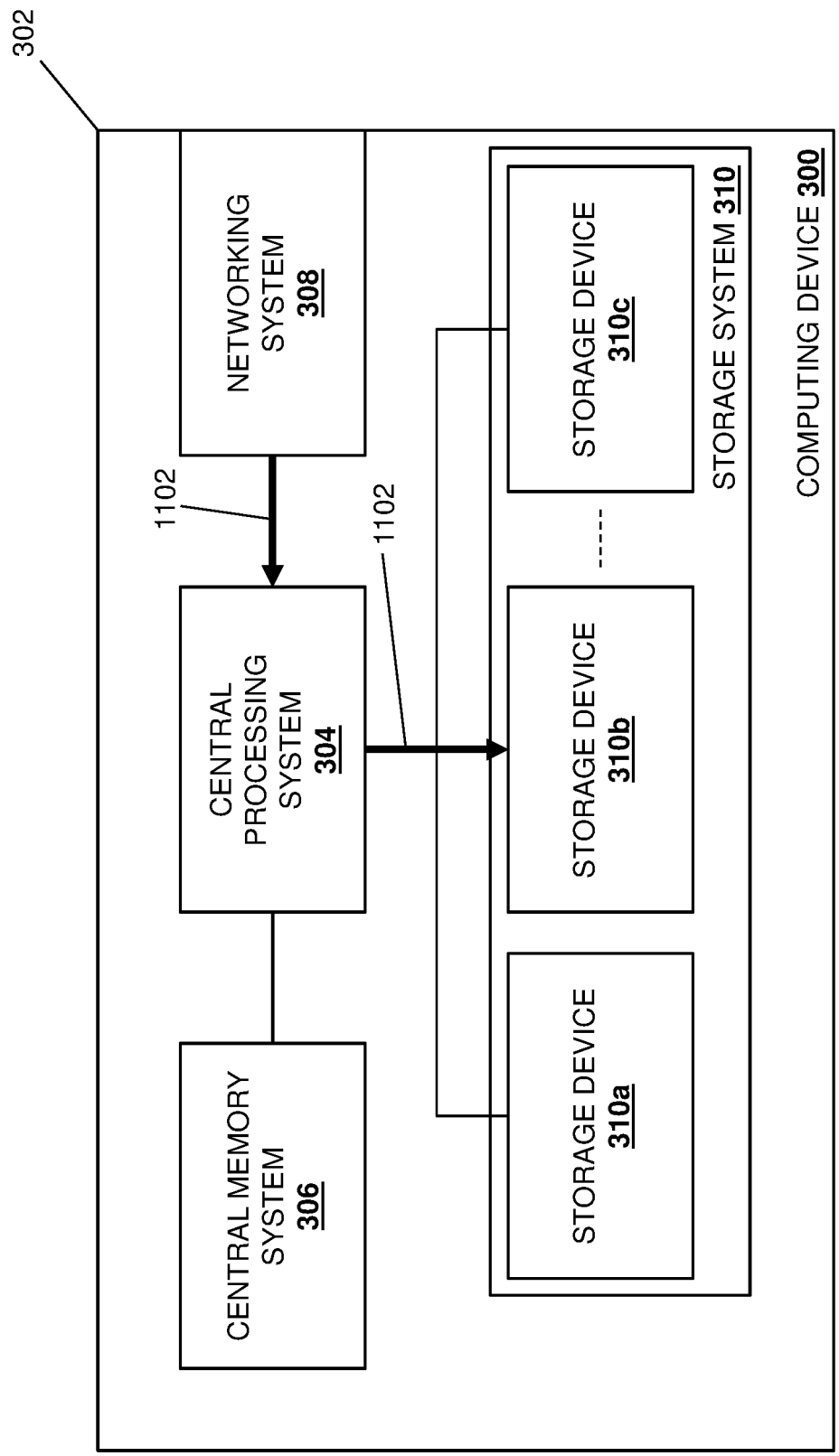
FIG. 11B is a schematic view illustrating an embodiment of the computing device of FIG. 3 operating during the method of FIG. 10.

The method 1000 then proceeds to block 1004 where the networking system instructs a storage device in a storage system to provide data. With reference to FIG. 11B, in an embodiment of block 1002, the networking system 308 may perform data provisioning command operations 1102 that include transmitting a data provisioning command to the storage device 310b that is configured to cause the storage device 310b to provide the data identified in the read request received at block 1002. For example, at block 1004 the data handling engine 404 in the networking system 308/400 may write the data provisioning command to a submission queue in the communication subsystem 508 of the storage device 310b/500, with that data provisioning command identifying data and instructing a DMA write operation using that data from the memory subsystem 506 in the storage device 310b/500 that writing that data to the memory subsystem 408 (e.g., an addressable memory subsystem in the example below) in the networking system 308/400. However, while a specific data provisioning command (and specific technique for transmitting that data provisioning command) have been described, one of skill in the art in possession of the present disclosure will appreciate that storage devices may be instructed to provide data stored in its memory subsystem 506 to the networking system 308/400 in a variety of manners that will fall within the scope of the present disclosure as well.

Figure 11C:
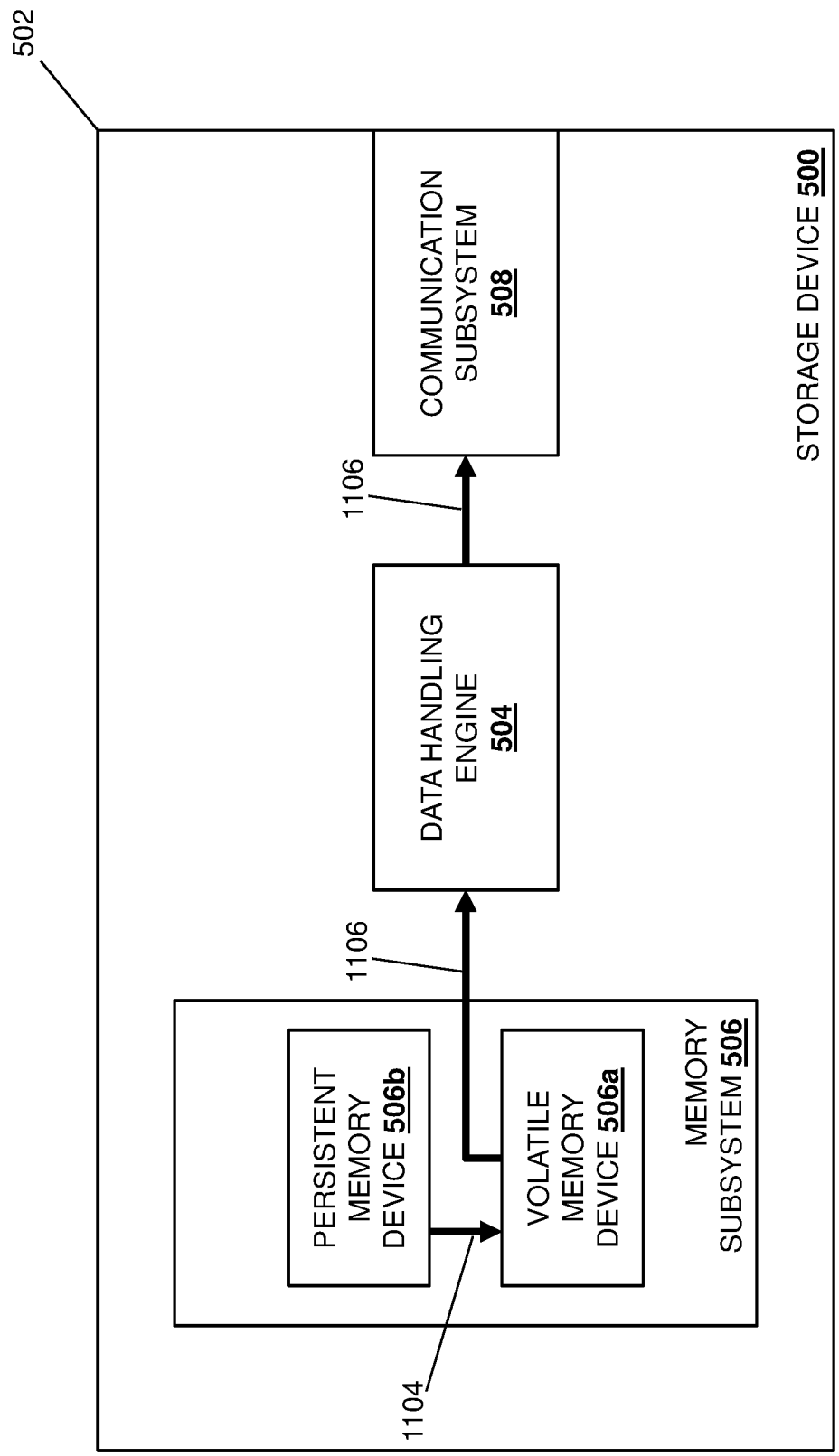
FIG. 11C is a schematic view illustrating an embodiment of the storage device of FIG. 5 operating during the method of FIG. 10.

The method 1000 then proceeds to block 1006 where the SSD storage device provides the data to the networking device. With reference to FIG. 11C, in an embodiment of block 1006 and in response to receiving the data provisioning command from the networking system 308 (e.g., via the submission queue in its communication subsystem 508), the data handling engine 504 in the storage device 310b/500 may then perform data provisioning preparation operations 1104 to transfer the data stored in the persistent memory device 506b that is included in its memory subsystem 506 to the volatile memory device 506a that is included in its memory subsystem 506. For example, at block 1006, the data handling engine 504 in the storage device 310b/500 may transfer the data from the flash memory array subsystem that is provided by the persistent memory device 506b in the memory subsystem 506 to the non-addressable buffer memory subsystem that is provided by the volatile memory device 506a in the memory subsystem 506.

Figure 11D:
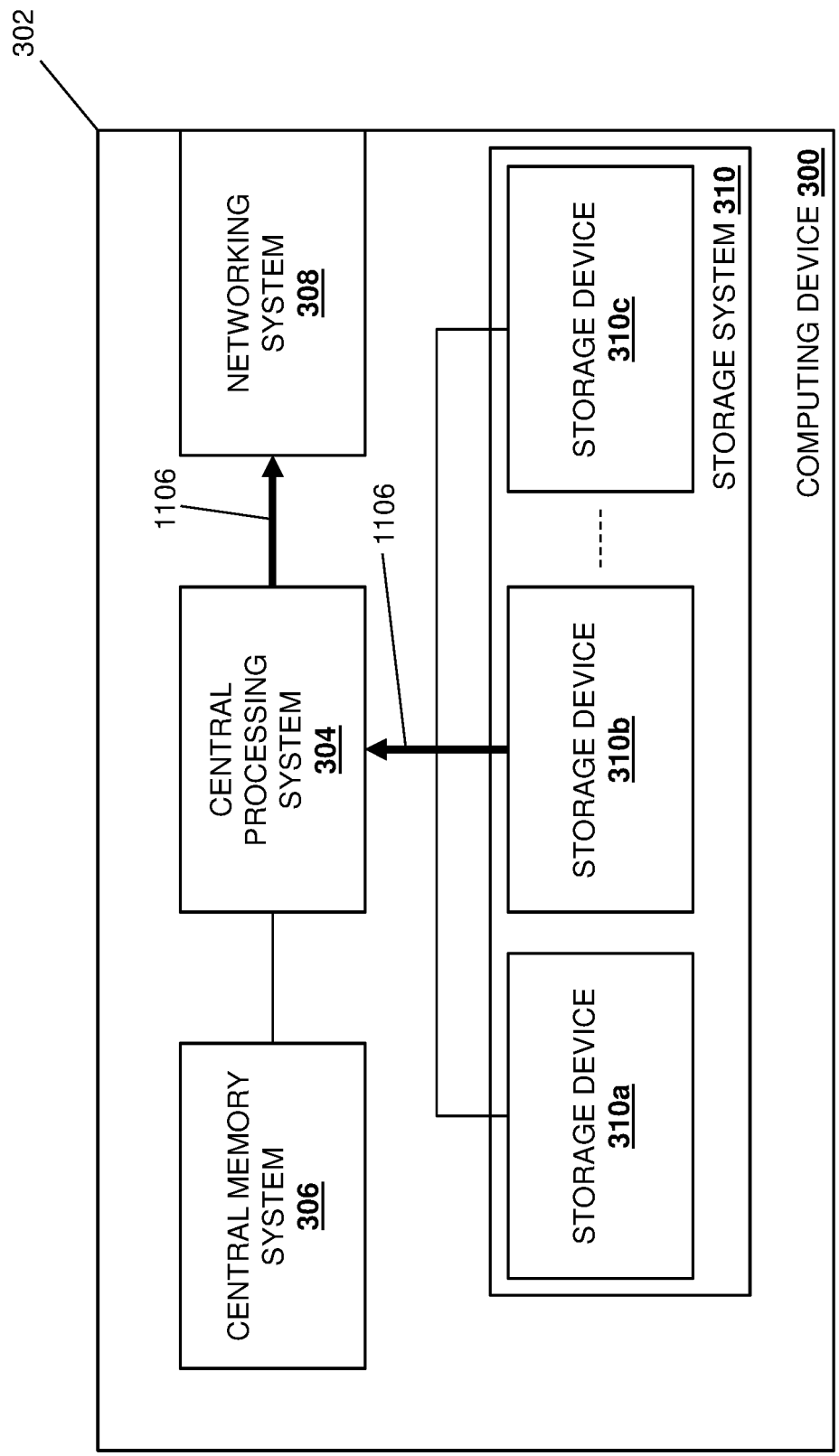
FIG. 11D is a schematic view illustrating an embodiment of the computing device of FIG. 3 operating during the method of FIG. 10.
Figure 11E:
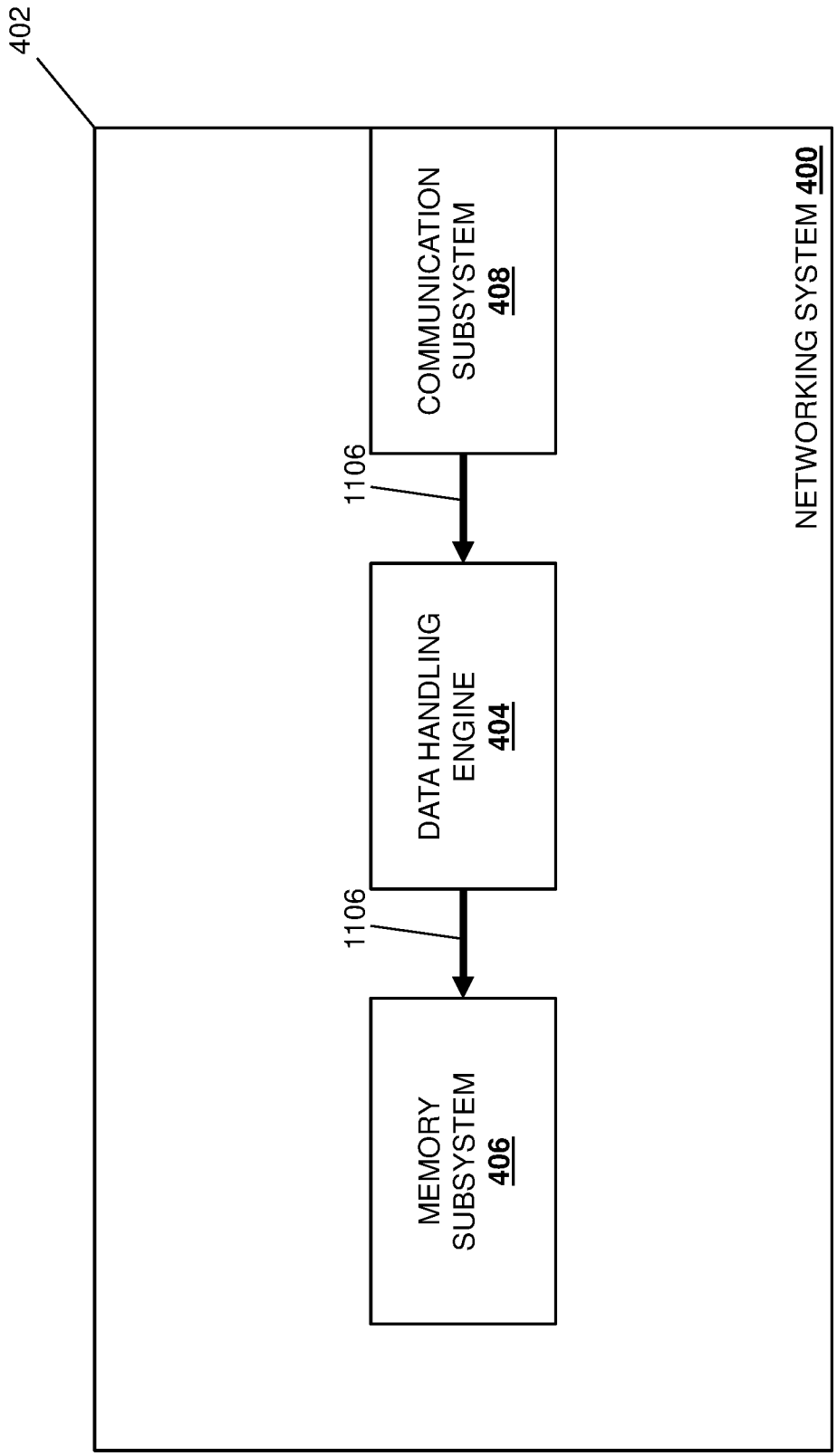
FIG. 11E is a schematic view illustrating an embodiment of the networking system of FIG. 4 operating during the method of FIG. 10.

With continued reference to FIG. 11C and further reference to FIGS. 11D and 11E, in an embodiment of block 1006 and subsequent to transferring the data stored in the persistent memory device 506b that is included in its memory subsystem 506 to the volatile memory device 506a that is included in its memory subsystem 506, the storage device 310b/500 may perform DMA write operations 1106 that include the data handling engine 504 performing a DMA write by reading the data in the volatile memory device 506a in the memory subsystem 506, and writing that data via its communication system 508 and to the memory subsystem 406 in the networking system 308/400. For example, at block 1006, the DMA write operations 1106 may include the data handling engine 504 in the storage device 310b/500 writing the data from a non-addressable buffer memory subsystem that is provided by the volatile memory device 506a in the memory subsystem 506 to an addressable memory subsystem (e.g., addressable within a PCIe memory map) that is provided by the memory subsystem 406 in the networking system 308/400. As will be appreciated by one of skill in the art in possession of the present disclosure, the DMA write performed during the DMA write operation 1106 allows the data handling engine 504 to read data from the volatile memory device 506a in its memory subsystem 506, and directly access the memory subsystem 406 in the networking device 400 in order to write data therein. However, while a particular data provisioning operation is illustrated and described, one of skill in the art in possession of the present disclosure will appreciate that storage devices may provide data to the networking system 308 in a variety of manners that will fall within the scope of the present disclosure as well.

Figure 11F:
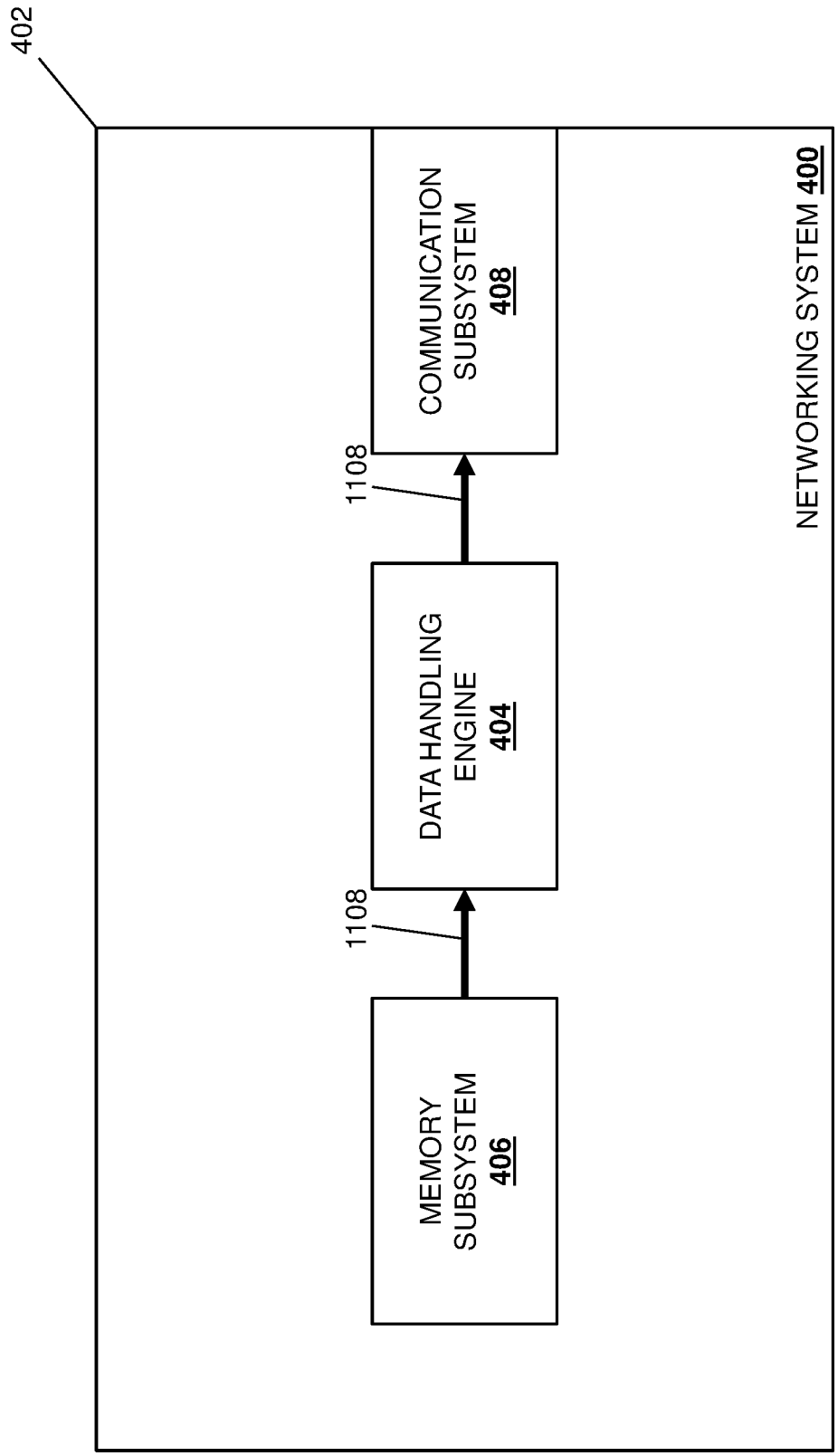
FIG. 11F is a schematic view illustrating an embodiment of the networking system of FIG. 4 operating during the method of FIG. 10.
Figure 11G:
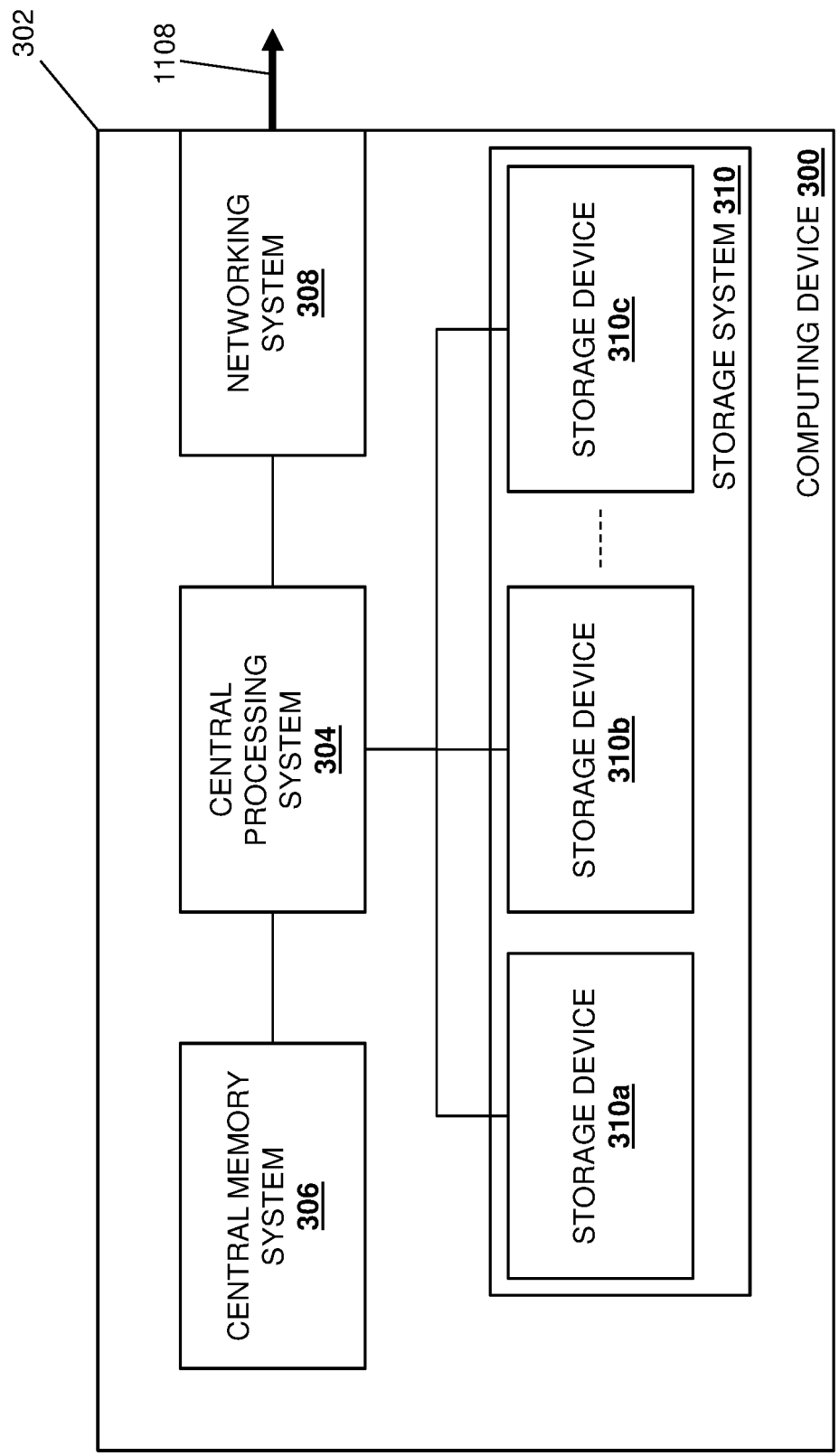
FIG. 11G is a schematic view illustrating an embodiment of the computing device of FIG. 3 operating during the method of FIG. 10.

The method 1000 then proceeds to block 1008 where the networking device transmits the data via the network. With reference to FIGS. 11F and 11G, in an embodiment of block 1008, the networking system 308/400 may then perform data transmission operations 1108 that include the data handling engine 404 retrieving the data stored in its memory subsystem 406 and transmitting it via its communication subsystem 408 and through the network 204 (e.g., to the one of the other computing devices 202b-202d that sent the read request), which one of skill in the art in possession of the present disclosure will appreciate completes the data retrieval operations performed according the method 1000.

Thus, systems and methods have been described that address the issues present with conventional data retrieval operations discussed above. For example, the systems and methods of the present disclosure may provide a networking device/storage device direct write system that includes a chassis that houses a Solid State Drive (SSD) storage device coupled to a Smart Network Interface Controller (SmartNIC) networking device. The SmartNIC networking device receives a read request via a network, and then transmits a data retrieval command to an SSD storage device that causes the SDD storage device to transfer the data from a persistent memory device to a volatile memory device in its SSD memory subsystem, and then perform a Direct Memory Access (DMA) write operation to read that data from the volatile memory device in its SSD memory subsystem and write that data to an SmartNIC addressable memory subsystem in the SmartNIC networking device, with the SmartNIC networking device then transmitting that data via the network. As such, the direct networking device/storage device read operations of the present disclosure require only a single DMA write operation, eliminate the use of the central memory subsystem as a "bounce" memory, and eliminate the use of the central processing system as a data storage "middleman", while also eliminating data retrieval delays that result in conventional data retrieval systems that require the storage device to complete a DMA write operation to a central memory system before the networking device may perform a DMA read operation from that central memory system as discussed above.

The inventors of the present disclosure have discovered that, while the methods 800 and 1000 discussed above address several issues present in conventional data storage operations and data retrieval operations, those methods 800 and 1000 suffer from some issues as well. For example, the networking system 308/400 (e.g., a SmartNIC networking device) utilized in the method 800 and 1000 described above requires a relatively large addressable memory subsystem 406 (e.g., a relatively large addressable memory subsystem that can be addressed from PCIe space), and the size of that memory subsystem 406 must increase as the number of SSD storage devices utilized with the networking system 308/400 increases. One of skill in the art in possession of the present disclosure will recognize how response times for SSD storage devices to the DMA commands discussed above may be indeterministic due to, for example, the SSD device performing other operations that are prioritized over those DMA commands, and thus the networking system 308/400 is required to hold data in its memory subsystem 406 until the SSD storage device(s) retrieve it, adding to the memory subsystem size issue discussed above. As will be appreciated by one of skill in the art in possession of the present disclosure, such memory subsystem size issues may be exacerbated as the speed of the network increases (i.e., more data is received by the networking system 308/400), more SSD storage devices are connected to the networking system 308/400, and those SSD storage device(s) issue multiple commands. As discussed below, the systems and methods discussed below operate to address these issues.

Figure 12:
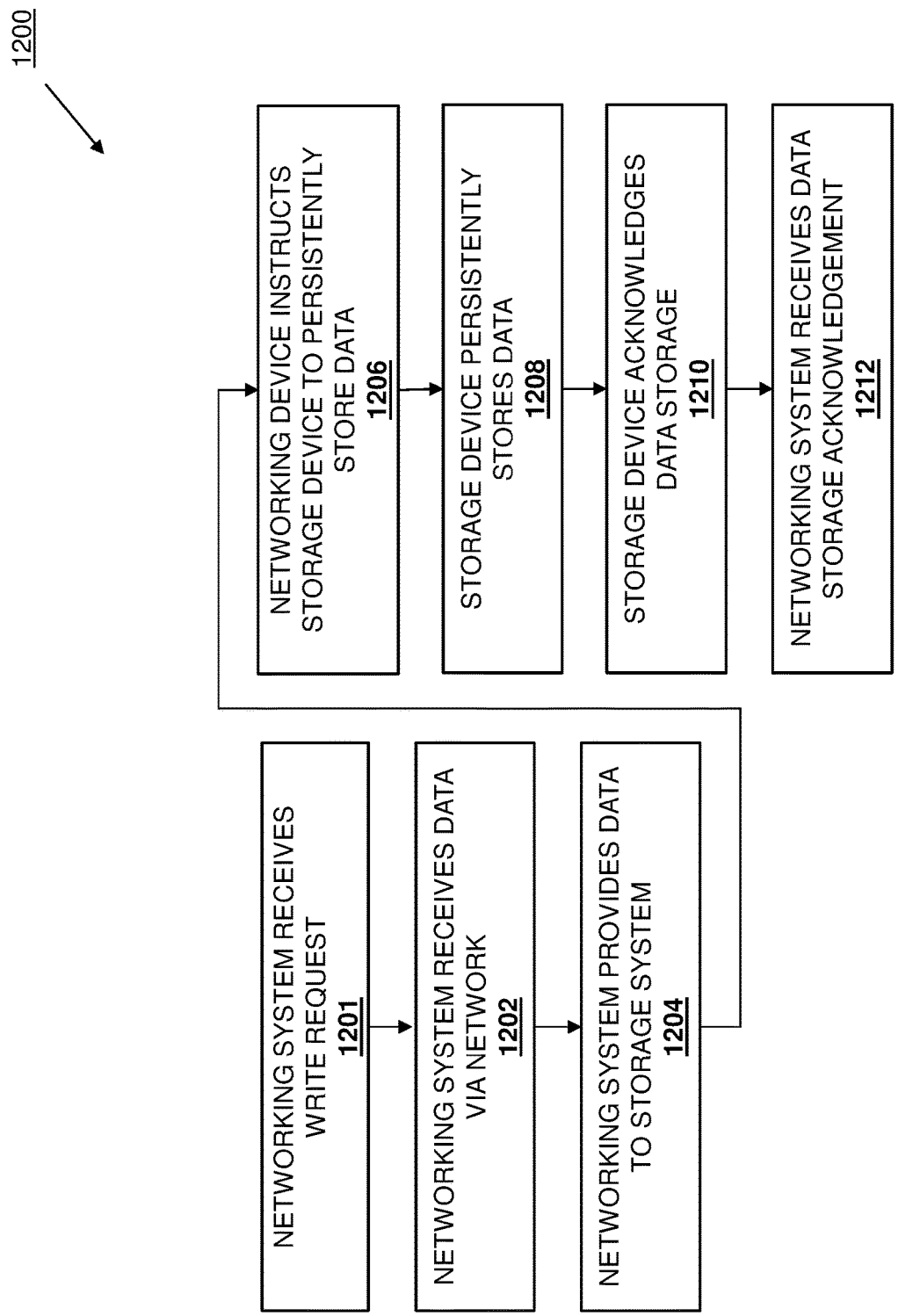
FIG. 12 is a flow chart illustrating an embodiment of a method for direct networking device/storage device write operations.

Referring now to FIG. 12, an embodiment of a method 1200 direct networking device/storage device write operations is illustrated. As discussed below, the systems and methods of the present disclosure address the issues present with conventional data storage operations discussed above, as well as issues present in the method 800 discussed above. For example, the systems and methods of the present disclosure may provide a networking device/storage device direct write system that includes a chassis that houses a Solid State Drive (SSD) storage device coupled to a Smart Network Interface Controller (SmartNIC) networking device. The SmartNIC networking device receives data via a network, stores the data in a SmartNIC buffer memory subsystem that is included in the SmartNIC networking device, and then perform a Direct Memory Access (DMA) operation to transfer the data stored in the SmartNIC buffer memory subsystem to an addressable memory subsystem that is included in the SSD storage device. If the addressable memory subsystem in the SSD storage device is a volatile memory subsystem, the SmartNIC networking device then transmits a persistent storage instruction to the SSD storage device that causes the SSD storage device to transfer the data stored in the addressable memory subsystem to a persistent memory subsystem in the SSD storage device. As such, the direct networking device/storage device write operations of the present disclosure require only a single DMA read operation, eliminate the use of the central memory subsystem as a "bounce" memory, and eliminate the use of the central processing system as a data storage "middleman", while also eliminating data storage delays that result in conventional data storage systems that require the networking device to complete a DMA write operation to a central memory system before the storage device may perform a DMA read operation from that central memory system as discussed above, and also reducing the size of the memory subsystem required for the SmartNIC networking device relative to the method 800 discussed above.

Figure 13A:
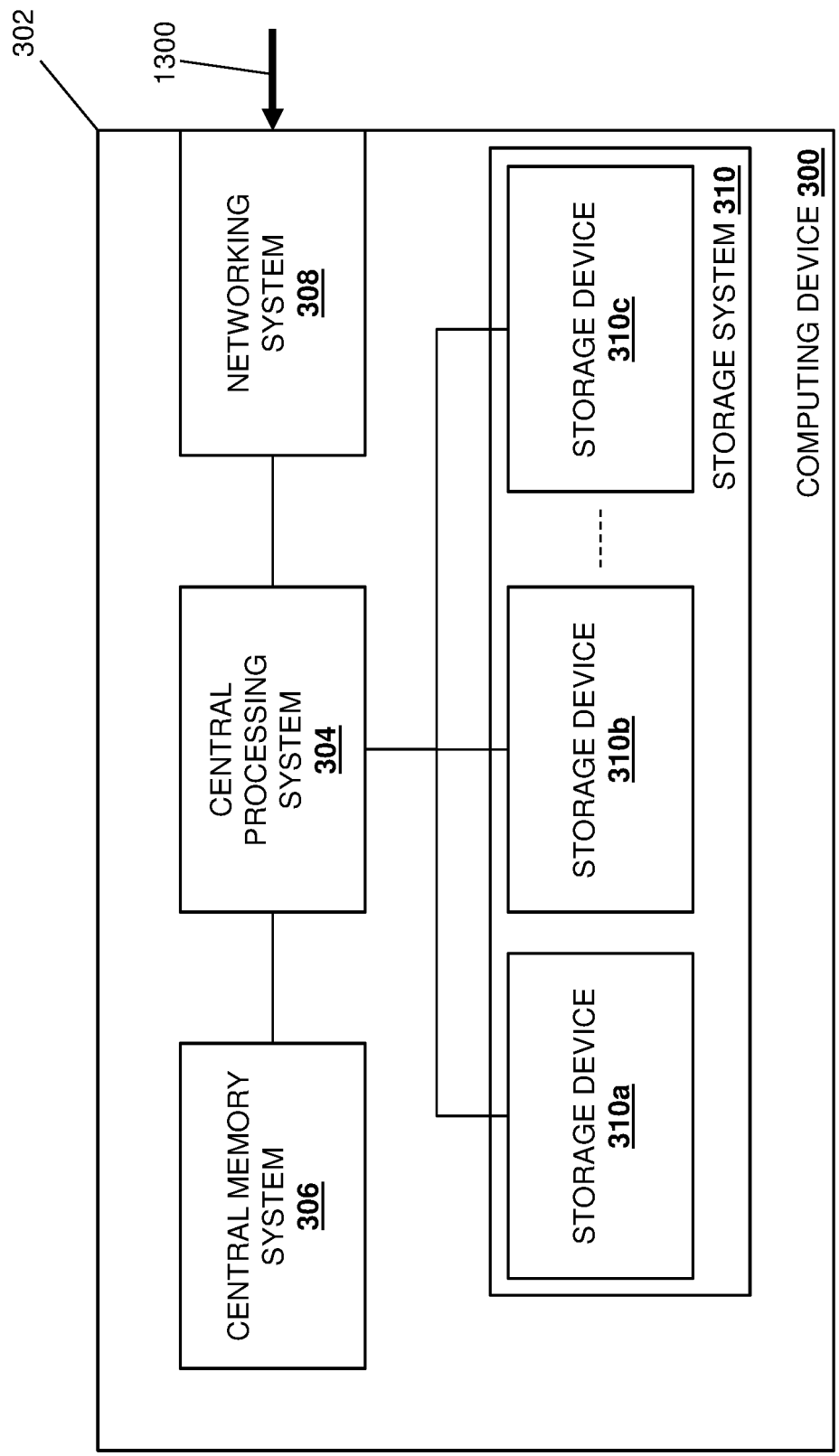
FIG. 13A is a schematic view illustrating an embodiment of the computing device of FIG. 3 operating during the method of FIG. 12.
Figure 13B:
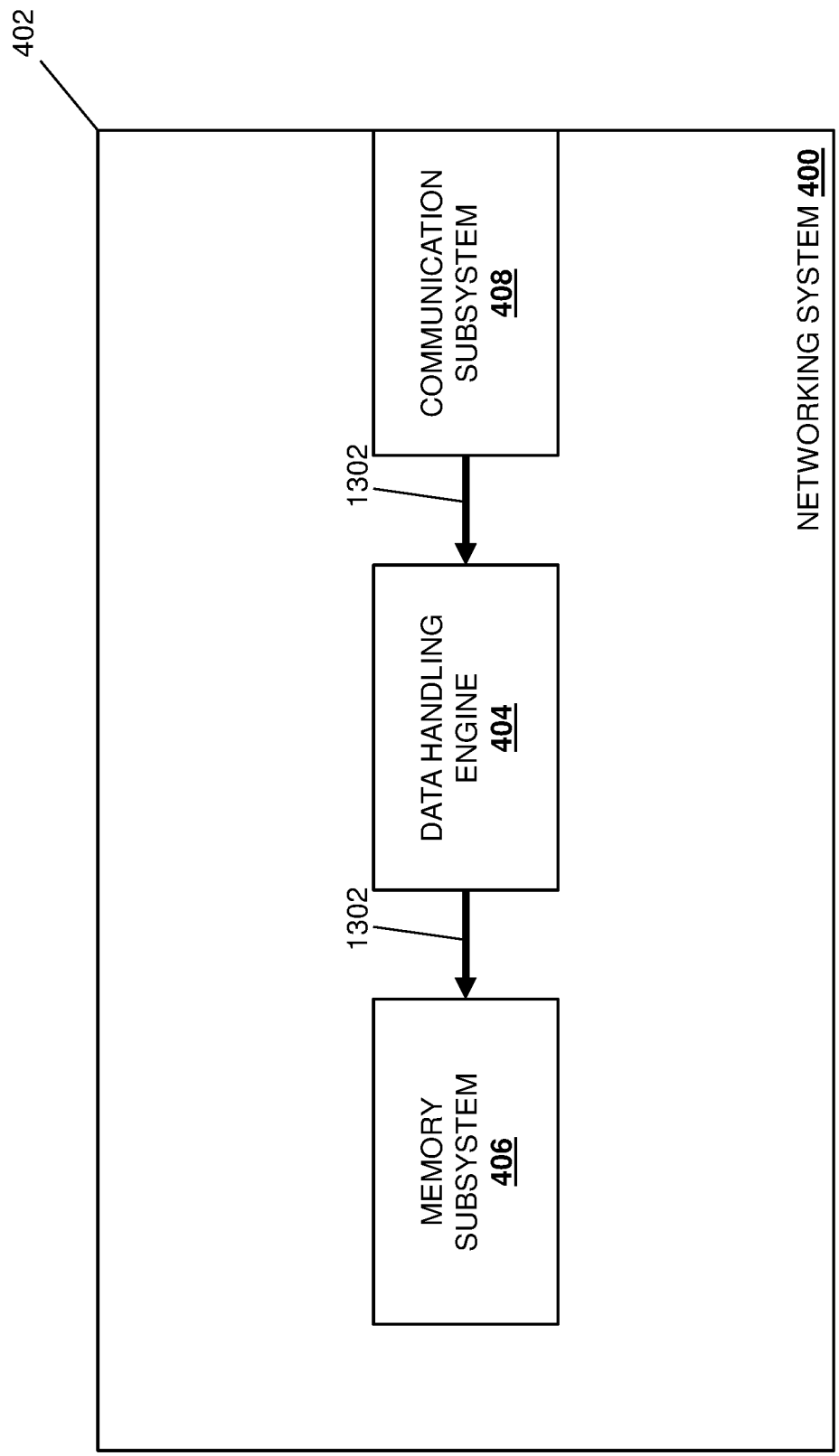
FIG. 13B is a schematic view illustrating an embodiment of the networking system of FIG. 4 operating during the method of FIG. 12.

The method 1200 begins at block 1201 where a networking system receives a write request. For example, at block 1201, the networking system 308/400 may receive a write request/write command that identifies the memory subsystem 406 as the "target" of a write operation, as well as a size of the write operation, and/or other write request/write command parameters that would be apparent to one of skill in the art in possession of the present disclosure. The method 1200 then proceeds to block 1202 where a networking system receives data via a network. With reference to FIGS. 13A and 13B, in an embodiment of block 1202, the networking system 308/400 in the computing device 202a/300 may perform data receiving operations 1300 that include the data handling engine 404 receiving data for writing to the storage system 310 (e.g., the storage device 310b in this example) in the computing system 202a/300 through the network 204 and via the communication subsystem 408 (e.g., from one of the other computing devices 202b-202d), and providing that data in its memory subsystem 408. For example, at block 1202 and in response to acknowledging the write request/write command received at block 1201 (e.g., in response to determining that the memory subsystem 406 is large enough to accept the write), the networking system 308/400 may receive the data at block 1202 and write that data in a non-addressable buffer memory subsystem that is provided by its memory subsystem 406.

Figure 13C:
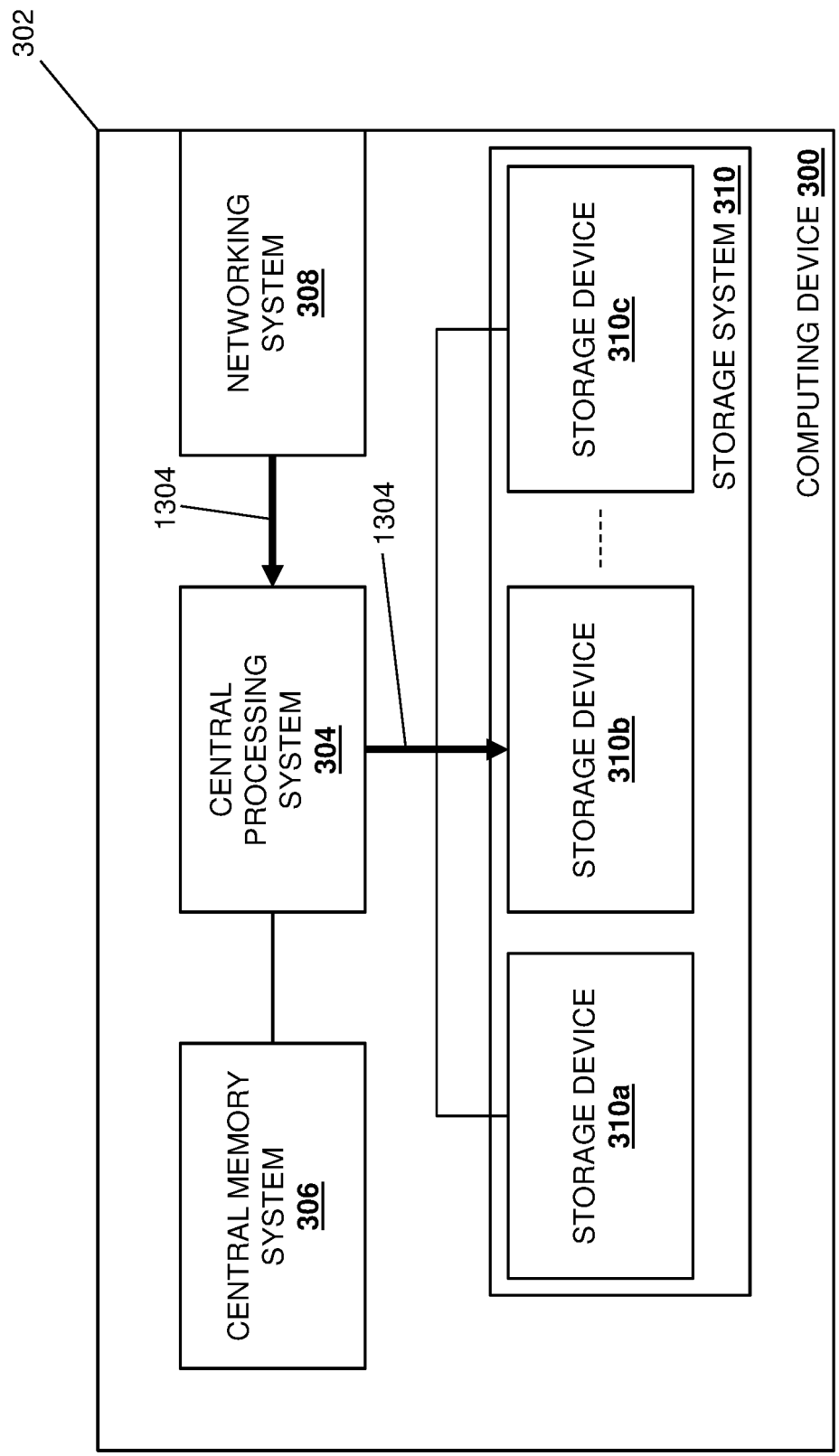
FIG. 13C is a schematic view illustrating an embodiment of the computing device of FIG. 3 operating during the method of FIG. 12.
Figure 13D:
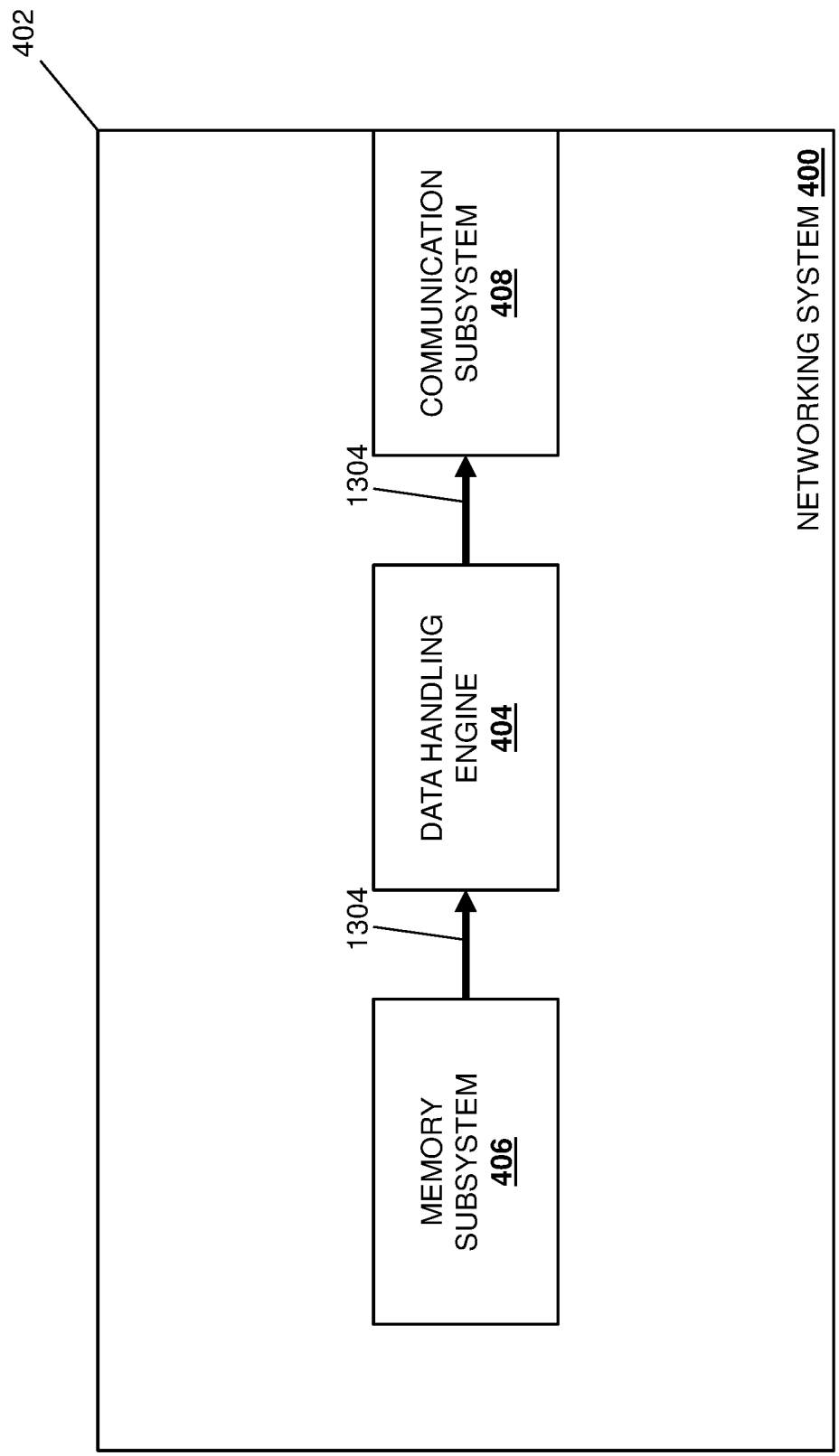
FIG. 13D is a schematic view illustrating an embodiment of the networking system of FIG. 4 operating during the method of FIG. 12.
Figure 13E:
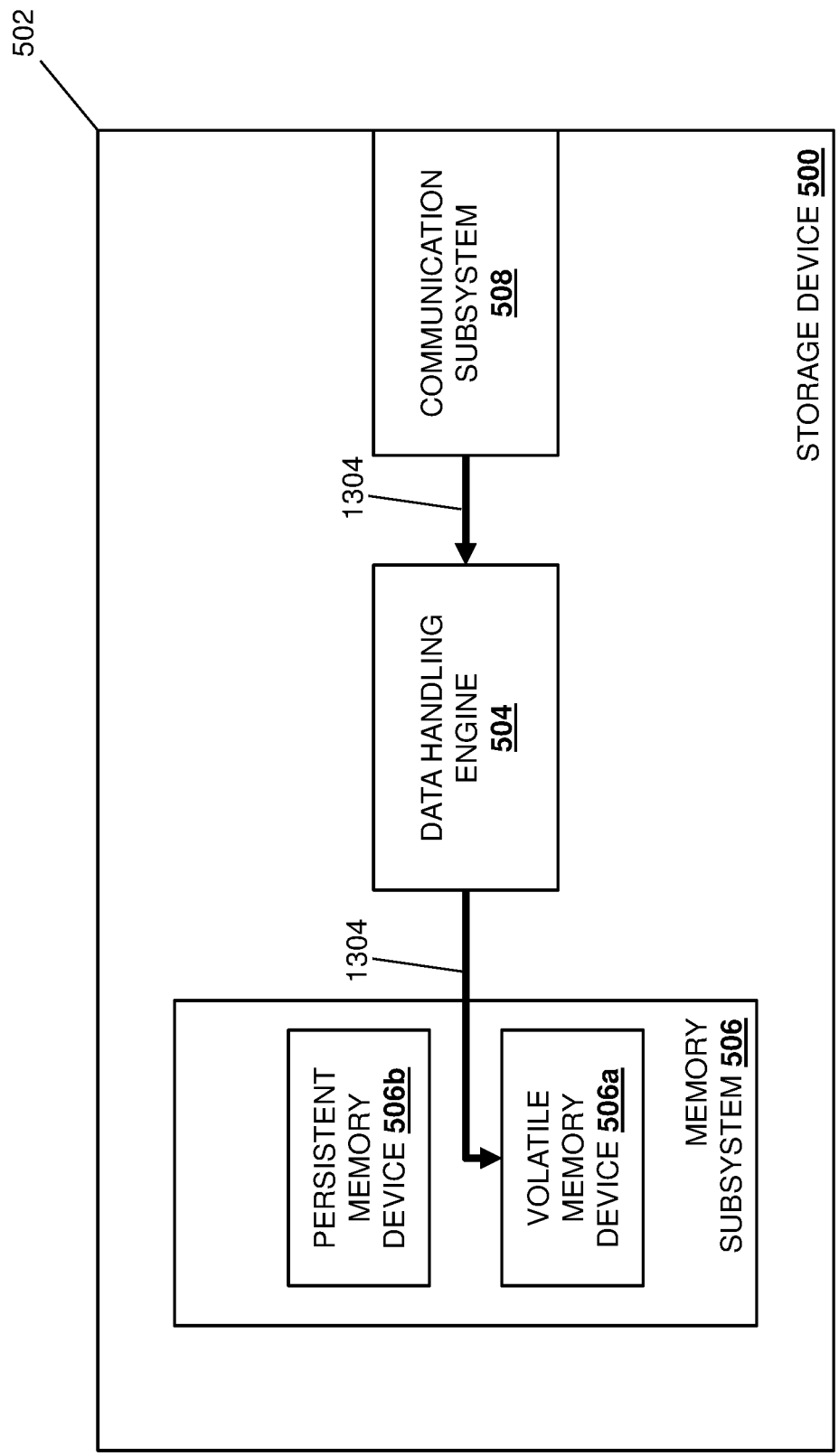
FIG. 13E is a schematic view illustrating an embodiment of the storage device of FIG. 5 operating during the method of FIG. 12.

The method 1200 then proceeds to block 1204 where the networking system provides the data to a storage device. With reference to FIGS. 13C, 13D, and 13E, in an embodiment of block 1204 and following the receiving of the data at block 1202, the networking system 308/400 may perform DMA write operations 1304 that include the data handling engine 404 performing a DMA write via its communication system 408 and using the data in its memory subsystem 406 to write that data to the volatile memory device 506a that is included in the memory subsystem 506 of the storage device 310b/500. As will be appreciated by one of skill in the art in possession of the present disclosure, the data handling engine 404 in the networking system 308/400 may be performed immediately subsequent to (or as soon as possible after) the receiving and storage of the data in the memory subsystem 406, which as discussed below limits the size of the memory subsystem 406 required in the networking system 308/400 (e.g., the size of the memory subsystem 406 may be limited based on the amount of data the networking system 308/400 is expected to receive and the speed at which it is capable of transferring that data to the storage devices 310a-310c).

As such, at block 1204, the DMA write operations 1304 may include the data handling engine 404 in the networking system 308/400 immediately writing the data from a non-addressable buffer memory subsystem provided by the memory subsystem 406 in the networking system 308 to an addressable memory subsystem (e.g., the CMB discussed above) provided by the volatile memory device 506a in the memory subsystem 506 of the storage device 310b/500. As will be appreciated by one of skill in the art in possession of the present disclosure, the DMA write performed during the DMA write operation 1304 allows the data handling engine 404 to read data from the memory subsystem 406 in the networking system 308/400, and directly access the volatile memory device 506a in the memory subsystem 506 of the storage device 310b/500 in order to write that data therein. However, while a particular data provisioning operation is illustrated and described, one of skill in the art in possession of the present disclosure will appreciate that networking device 308 may provide data to the storage devices in a variety of manners that will fall within the scope of the present disclosure as well.

Figure 13F:
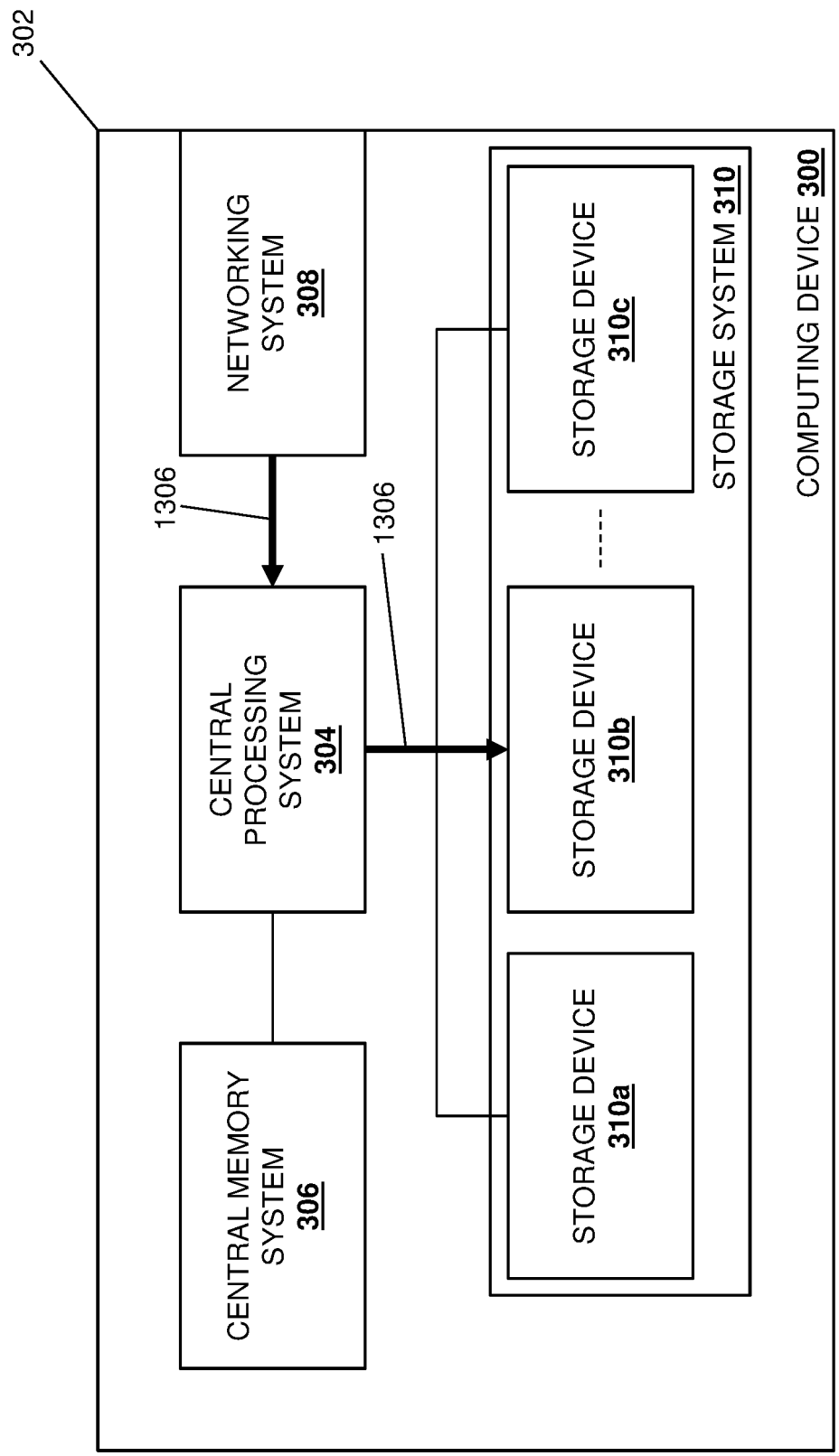
FIG. 13F is a schematic view illustrating an embodiment of the computing device of FIG. 3 operating during the method of FIG. 12.

The method 1200 then proceeds to block 1206 wherein the networking system instructs the storage device to persistently store the data. With reference to FIG. 13F, in an embodiment of block 1206, the networking system 308/400 in the computing system 308/400 may perform data storage command operations 1306 that include the data handling engine 404 transmitting a data storage command to the storage device 310b. For example, at block 1206 the data handling engine 404 in the networking system 308/400 may write the data storage command to a submission queue in the communication subsystem 508 of the storage device 310b, with that data storage command identifying the data in the volatile memory device 506a in the memory subsystem 506 of the storage device 310b/500 and instructing a write operation of that data from the volatile memory device 506a in the memory subsystem 506 to the persistent memory device 506b (e.g., a flash memory array in the example below) in the memory subsystem 506 of the storage device 310b/500. However, while a specific data storage command (and specific technique for transmitting that data storage command) have been described, one of skill in the art in possession of the present disclosure will appreciate that storage devices may be instructed to store data in the volatile memory device 506a of its memory subsystem 506 in a variety of manners that will fall within the scope of the present disclosure as well. Furthermore, as discussed below, in other embodiments the write performed during the DMA write operation 1304 by the data handling engine 404 in the networking system 308/400 at block 1204 may include writing the data directly to the persistent memory device 506b in the memory subsystem 506, and thus block 1206 may be skipped in those embodiments.

Figure 13G:
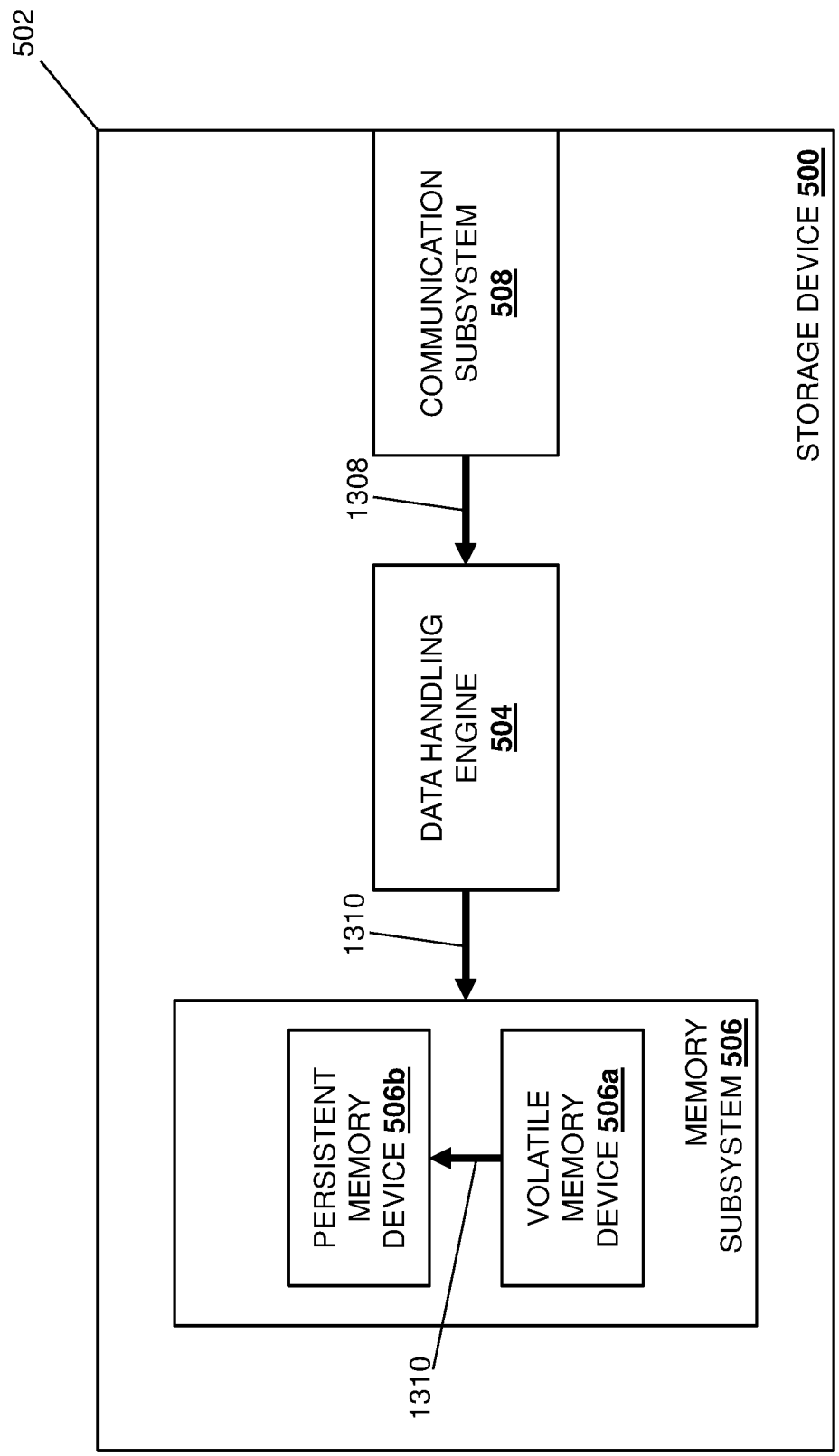
FIG. 13G is a schematic view illustrating an embodiment of the storage device of FIG. 5 operating during the method of FIG. 12.

The method 1200 then proceeds to block 1208 where the storage device persistently stores the data. With continued reference to FIG. 13G, in an embodiment of block 1208 and in response to receiving the data storage command in the submission queue in the communication subsystem 508 of the storage device 310b, the data handling engine 504 in the storage device 310b/500 may then perform persistent storage operations 1310 to transfer the data that is stored in its volatile memory device 506a to the persistent memory device 506b that is included in its memory subsystem 506. For example, at block 1310, the data handling engine 504 in the storage device 310b/500 may transfer the data from the addressable memory subsystem (e.g., a CMB) that is provided by the volatile memory device 506a in the memory subsystem 506 to a flash memory array subsystem that is provided by the persistent memory device 506b in the memory subsystem 506.

Figure 13H:
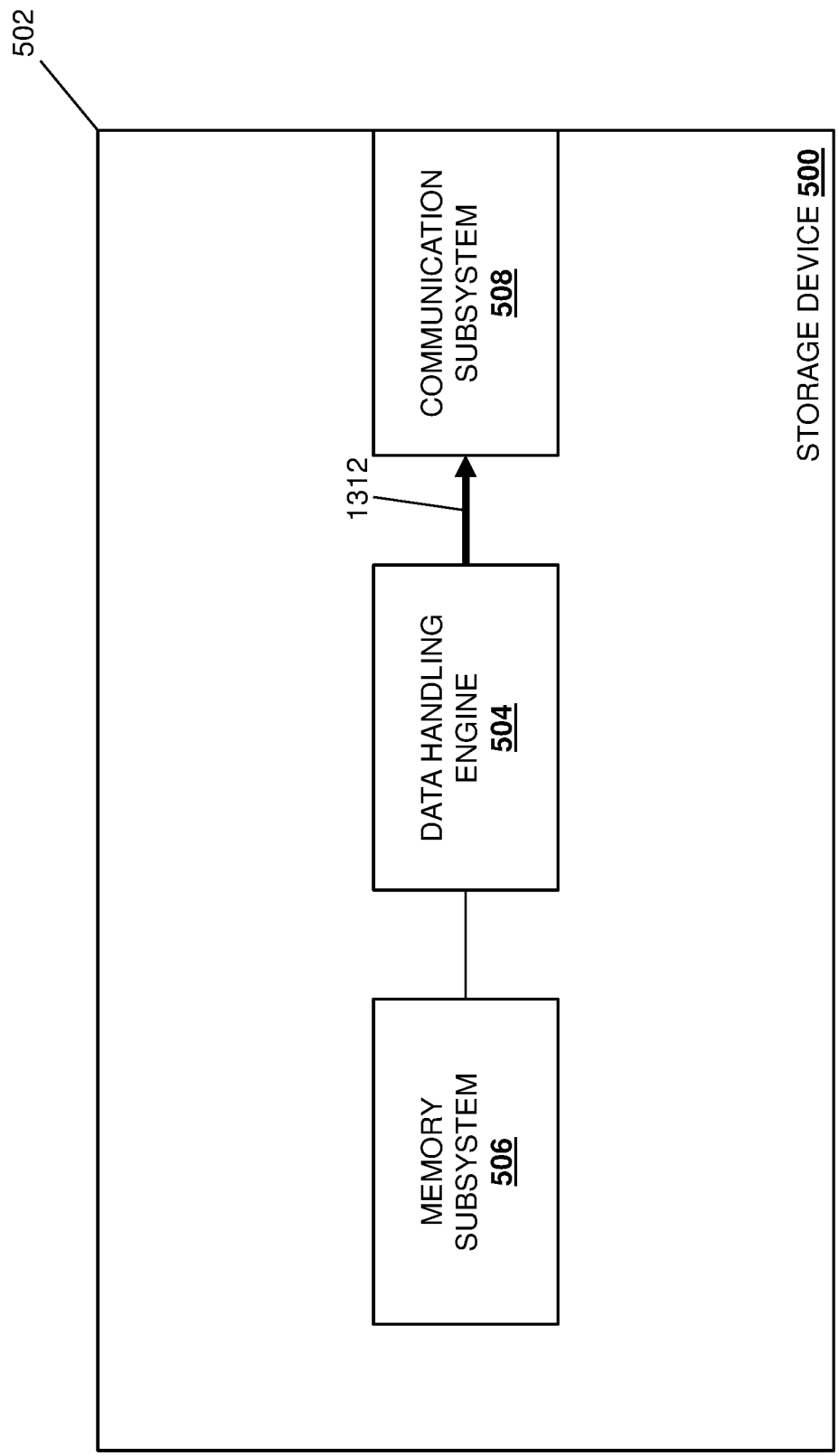
FIG. 13H is a schematic view illustrating an embodiment of the storage device of FIG. 5 operating during the method of FIG. 12.
Figure 13I:
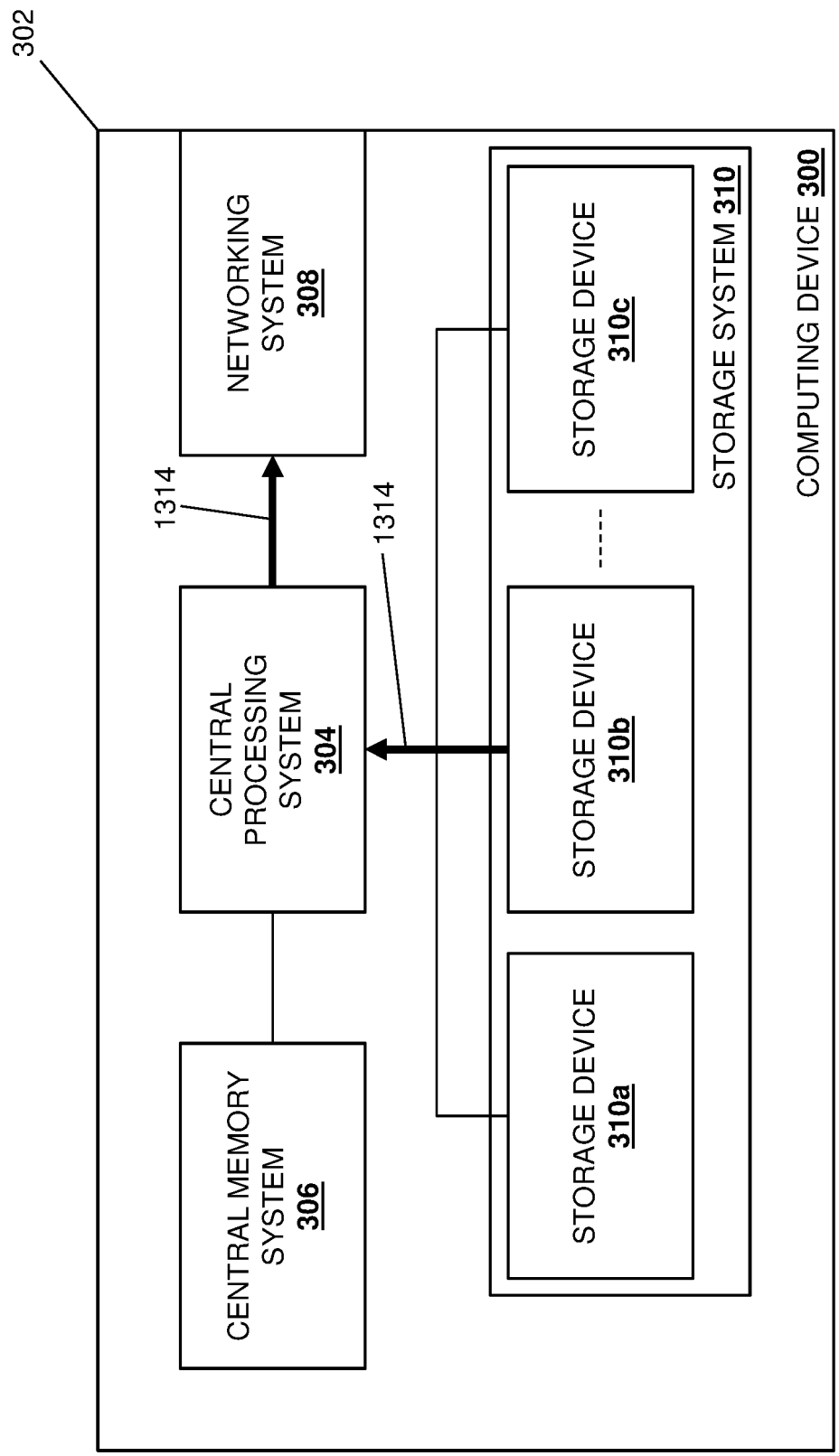
FIG. 13I is a schematic view illustrating an embodiment of the computing device of FIG. 3 operating during the method of FIG. 12.

The method 1200 then proceeds to block 1210 where the storage device acknowledges the data storage. With reference to FIG. 13H, in an embodiment of block 1210, the data handling engine 504 in the storage device 310b/500 may then perform completion message provisioning operations 1312 that include providing a completion message for the networking system 308. For example, at block 1310, the data handling engine 504 in the storage device 310b/500 may provide a completion message in a completion queue that is included in its communication system 508, with that completion message indicating the data received by the networking device at block 1202 has been persistently stored. The method 1200 then proceeds to block 1212 where the networking system receives the acknowledgement of the data storage. With reference to FIG. 13I, in an embodiment of block 1212, the networking system 308 may then perform completion message receiving operations 1314 that include receiving the completion message provided by the storage device 310b/500 at block 1210. For example, at block 1212, the data handling engine 404 in the networking system 308/400 may access the completion message in the completion queue in the communication subsystem 508 of the storage device 310b/500, which one of skill in the art in possession of the present disclosure will appreciate completes the data storage operations performed according the method 1200.

Figure 14:
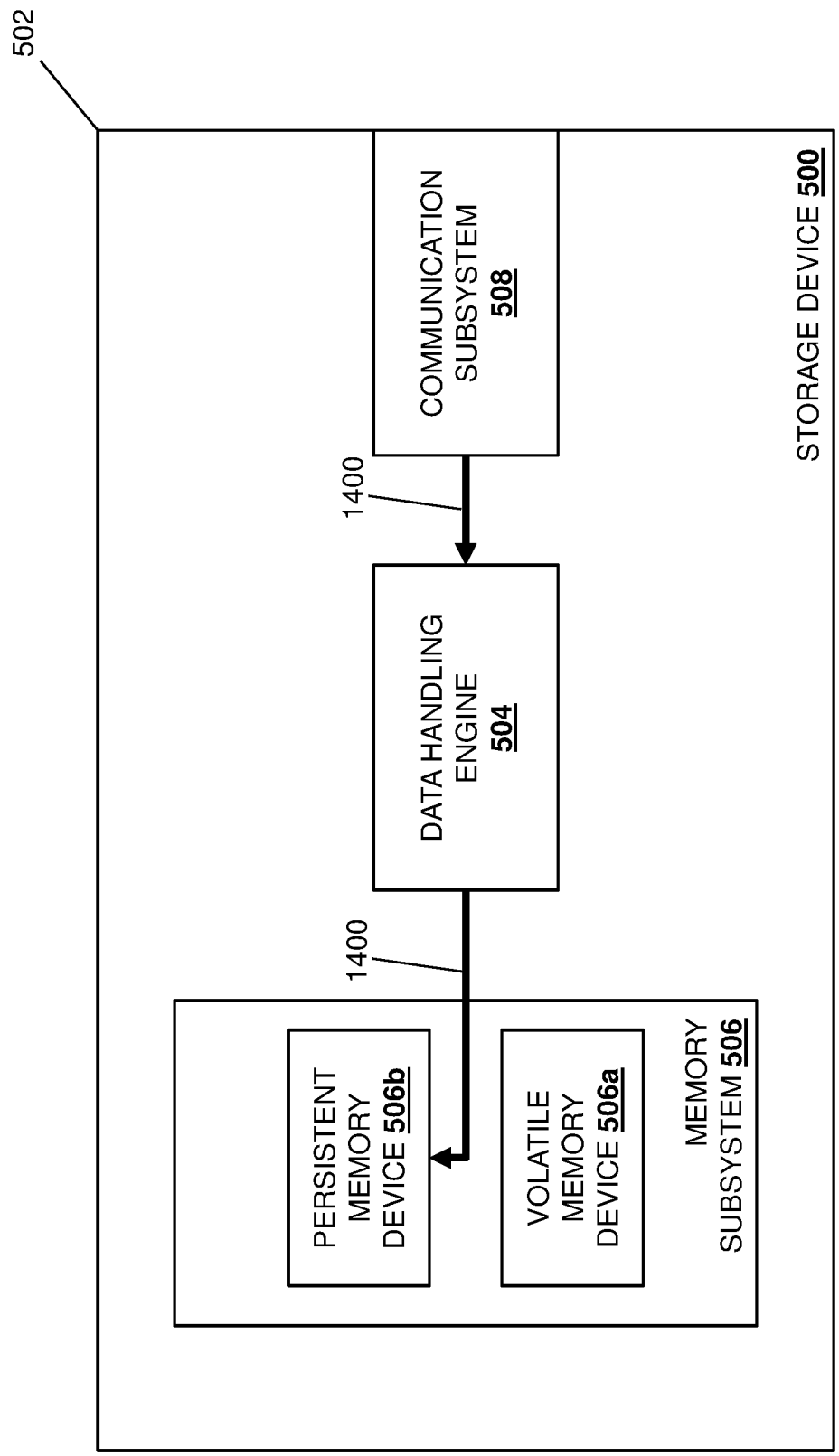
FIG. 14 is a schematic view illustrating an embodiment of the storage device of FIG. 5 operating during the method of FIG. 12.

As discussed above, in some embodiments, the DMA read operations 904 performed by the storage device 310b/500 at block 1206 or the DMA write operations 1304 performed by the networking device 308/400 at block 1204 may provide the data at issue in a persistent memory device rather than the volatile memory device 506a discussed above. In some examples, FIG. 14 illustrates how the DMA read operations 904 performed by the storage device 310b/500 at block 1206 may include a persistent write operation 1400 that writes the data to the persistent memory device 506b in the memory subsystem 506 (rather than the volatile memory subsystem 506a as discussed above). In a specific example, the non-addressable buffer memory subsystem provided by the volatile memory device 506a used in the DMA read operations 904 performed by the storage device 310b/500 at block 1206 may instead be provided in a Persistent Memory Region (PMR) of the SSD storage device 310b/500 that is either natively persistent or configured to be powered by a power storage subsystem such as a capacitor, battery, or other power storage subsystem that would be apparent to one of skill in the art in possession of the present disclosure and that is configured to provide power to the storage device in the event external power is unavailable. As will be appreciated by one of skill in the art in possession of the present disclosure, the storage device 310b/500 may subsequently transfer the data stored in PMR of the SSD storage device 310b/500 to a different (e.g., larger) persistent storage subsystem while remaining within the scope of the present disclosure as well.

Similarly, in some examples FIG. 14 illustrates how the DMA write operations 1304 performed by the networking device 308/400 at block 1204 may include the persistent write operation 1400 that writes the data to the persistent memory device 506b in the memory subsystem 506 (rather than the volatile memory subsystem 506a as discussed above). In a specific example, the addressable memory subsystem (e.g., the CMB) provided by the volatile memory device 506a used in the DMA write operations 1304 performed by the networking device 308/400 at block 1204 may instead be provided in a Persistent Memory Region (PMR) of the SSD storage device 310b/500 that is either natively persistent or configured to be powered by a power storage subsystem such as a capacitor, battery, or other PMR power storage subsystem that would be apparent to one of skill in the art in possession of the present disclosure and that is configured to provide power to the storage device in the event external power is unavailable. As will be appreciated by one of skill in the art in possession of the present disclosure, the storage device 310b/500 may subsequently transfer the data stored in PMR of the SSD storage device 310b/500 to a different (e.g., larger) persistent storage subsystem while remaining within the scope of the present disclosure as well.

As discussed above and will be appreciated by one of skill in the art in possession of the present disclosure, modifying the DMA read operations 904 performed by the storage device 310b/500 at block 806 or the DMA write operations 1304 performed by the networking device 308/400 at block 1204 to provide the data at issue in a persistent memory device rather than the volatile memory device 506a discussed above allows the storage device 310b/500 to provide the completion message discussed above to the SmartNIC networking device immediately following completion of the DMA operation, thus increasing data throughput.

Thus, systems and methods have been described that address the issues present with conventional data storage operations discussed above, as well as issues present in the method 800 discussed above. For example, the systems and methods of the present disclosure may provide a networking device/storage device direct write system that includes a chassis that houses a Solid State Drive (SSD) storage device coupled to a Smart Network Interface Controller (Smart- NIC) networking device. The SmartNIC networking device receives data via a network, stores the data in a SmartNIC buffer memory subsystem that is included in the SmartNIC networking device, and then perform a Direct Memory Access (DMA) operation to transfer the data stored in the SmartNIC buffer memory subsystem to an addressable memory subsystem that is included in the SSD storage device. If the addressable memory subsystem in the SSD storage device is a volatile memory subsystem, the SmartNIC networking device then transmits a persistent storage instruction to the SSD storage device that causes the SSD storage device to transfer the data stored in the addressable memory subsystem to a persistent memory subsystem in the SSD storage device. As such, the direct networking device/storage device write operations of the present disclosure require only a single DMA read operation, eliminate the use of the central memory subsystem as a "bounce" memory, and eliminate the use of the central processing system as a data storage "middleman", while also eliminating data storage delays that result in conventional data storage systems that require the networking device to complete a DMA write operation to a central memory system before the storage device may perform a DMA read operation from that central memory system as discussed above, and also reducing the size of the memory subsystem required for the SmartNIC networking device relative to the method 800 discussed above.

Referring now to FIG. 15, an embodiment of a method 1500 for direct networking device/storage device read operations is illustrated. As discussed below, the systems and methods of the present disclosure address the issues present with conventional data retrieval operations discussed above, as well as issues present in the method 1000 discussed above. For example, the systems and methods of the present disclosure provide a networking device/storage device direct read system that includes a chassis that houses a Solid State Drive (SSD) storage device coupled to a Smart Network Interface Controller (SmartNIC) networking device. The SmartNIC networking device receives a read request via a network, and then transmits a data provisioning command to an SSD storage device that causes the SDD storage device to transfer the data from a persistent memory device to an addressable memory subsystem in its SSD memory subsystem, and then acknowledge that data transfer to the SmartNIC networking device. The SmartNIC networking device them performs a Direct Memory Access (DMA) read operation to read that data from the addressable memory subsystem in the SSD memory subsystem and write that data to a SmartNIC non-addressable memory subsystem in the SmartNIC networking device, with the SmartNIC networking device then transmitting that data via the network. As such, the direct networking device/storage device read operations of the present disclosure require only a single DMA write operation, eliminate the use of the central memory subsystem as a "bounce" memory, and eliminate the use of the central processing system as a data storage "middleman", while also eliminating data retrieval delays that result in conventional data retrieval systems that require the storage device to complete a DMA write operation to a central memory system before the networking device may perform a DMA read operation from that central memory system, and also reducing the size of the memory subsystem required for the SmartNIC networking device relative to the method 1000 discussed above.

Figure 16A:
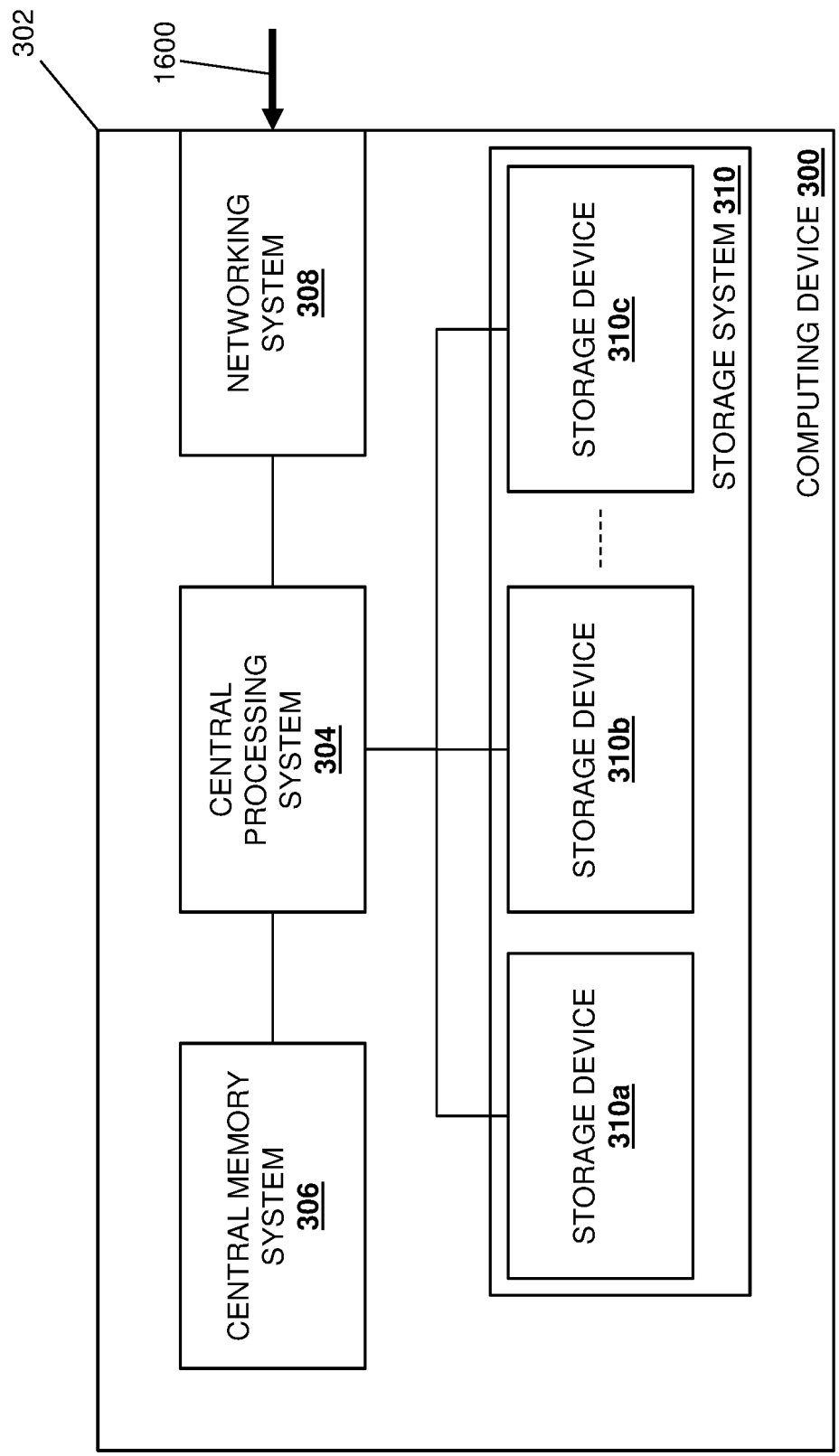
FIG. 16A is a schematic view illustrating an embodiment of the computing device of FIG. 3 operating during the method of FIG. 15.

The method 1500 begins at block 1502 where a networking system receives a read request. With reference to FIG. 16A, in an embodiment of block 1502, the networking system 308/400 in the computing device 202a/300 may perform read request receiving operations 1600 that include the data handling engine 404 receiving a read request identifying data for reading from the storage system 310 (e.g., the storage device 310b in this example), with that read request received through the network 204 (e.g., from one of the other computing devices 202b-202d) and via the communication subsystem 408 in the networking system 308/400.

Figure 16B:
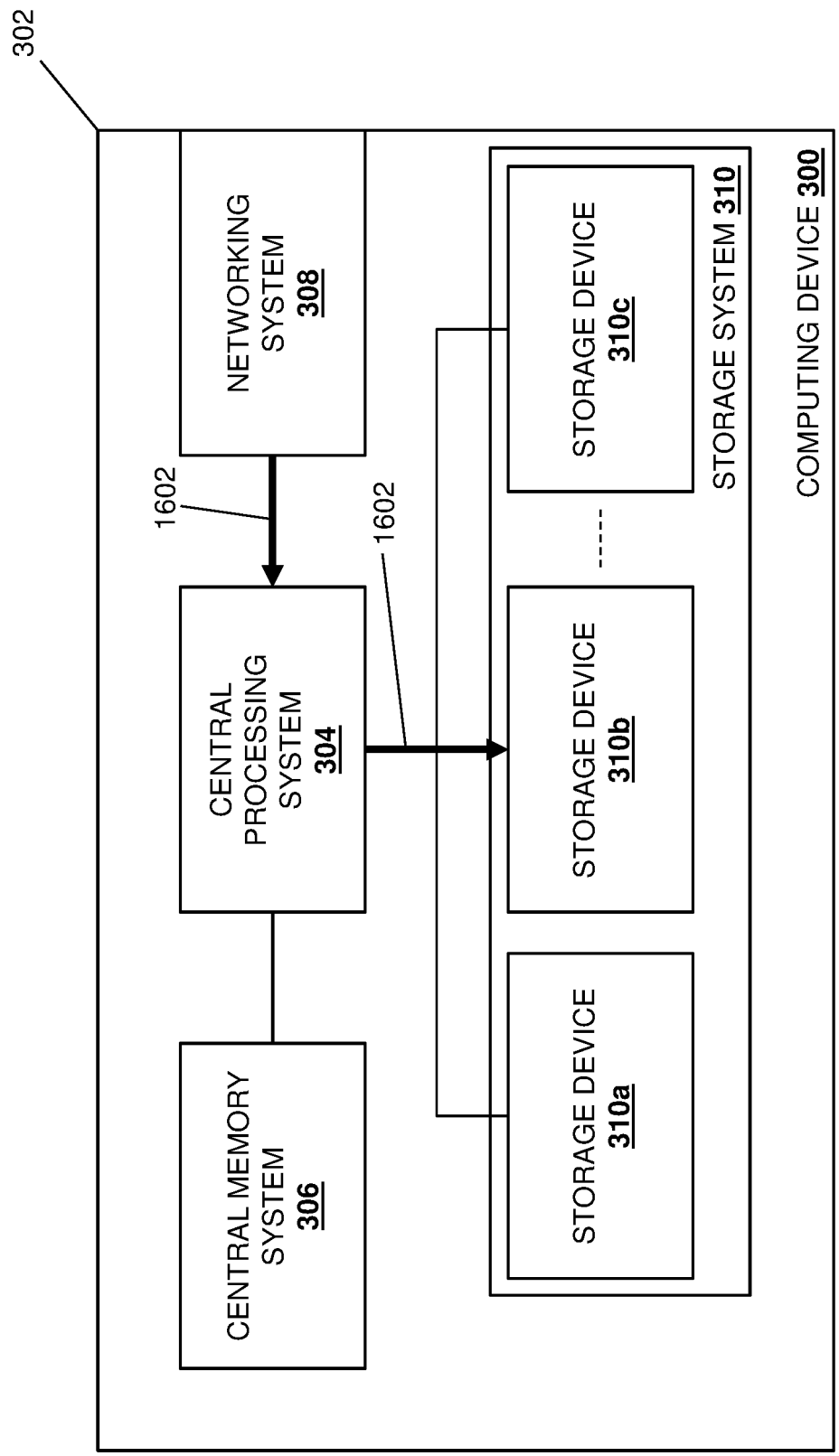
FIG. 16B is a schematic view illustrating an embodiment of the computing device of FIG. 3 operating during the method of FIG. 15.

The method 1500 then proceeds to block 1504 where the networking system instructs a storage device in a storage system to provide data for retrieval. With reference to FIG. 16B, in an embodiment of block 1502, the networking system 308 may perform data retrieval provisioning command operations 1602 that include transmitting a data retrieval provisioning command to the storage device 310b that is configured to cause the storage device 310b to provide the data identified in the read request received at block 1002 for retrieval by the networking system 308/400. For example, at block 1504 the data handling engine 404 in the networking system 308/400 may write the data retrieval provisioning command to a submission queue in the storage device 310b, with that data retrieval provisioning command identifying data and instructing the storage device 310b/500 to read that data from the persistent memory device 506b in the memory subsystem 506 in the storage device 310b/500 and write that data to the volatile memory device 506a in the memory subsystem 506a (e.g., an addressable memory subsystem in the example below) in the storage device 310b/500. However, while a specific data retrieval provisioning command (and specific technique for transmitting that data retrieval provisioning command) have been described, one of skill in the art in possession of the present disclosure will appreciate that storage devices may be instructed to provide data stored in its memory subsystem 506 for retrieval by the networking system 308/400 in a variety of manners that will fall within the scope of the present disclosure as well.

Figure 16C:
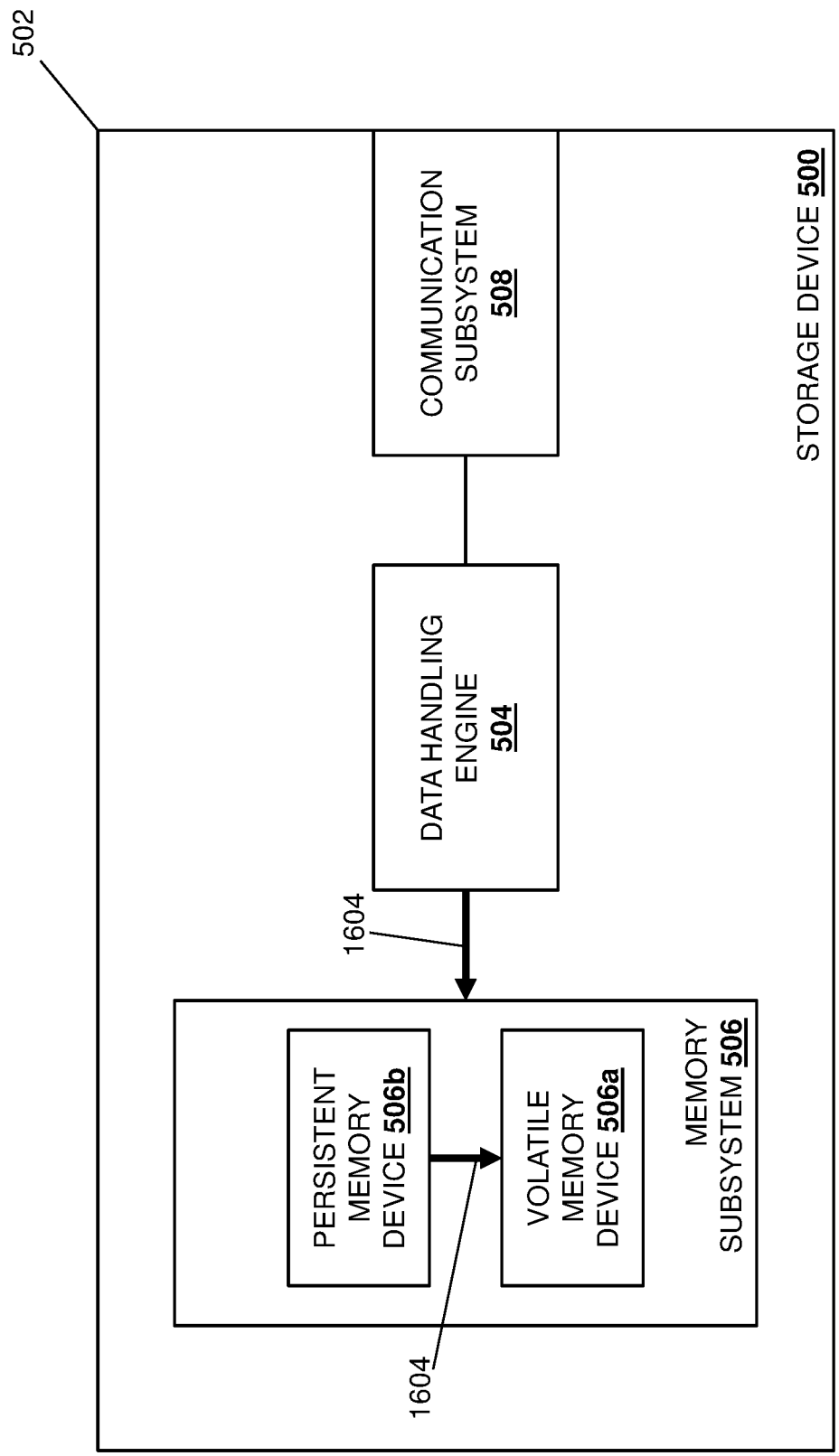
FIG. 16C is a schematic view illustrating an embodiment of the storage device of FIG. 5 operating during the method of FIG. 15.
Figure 16D:
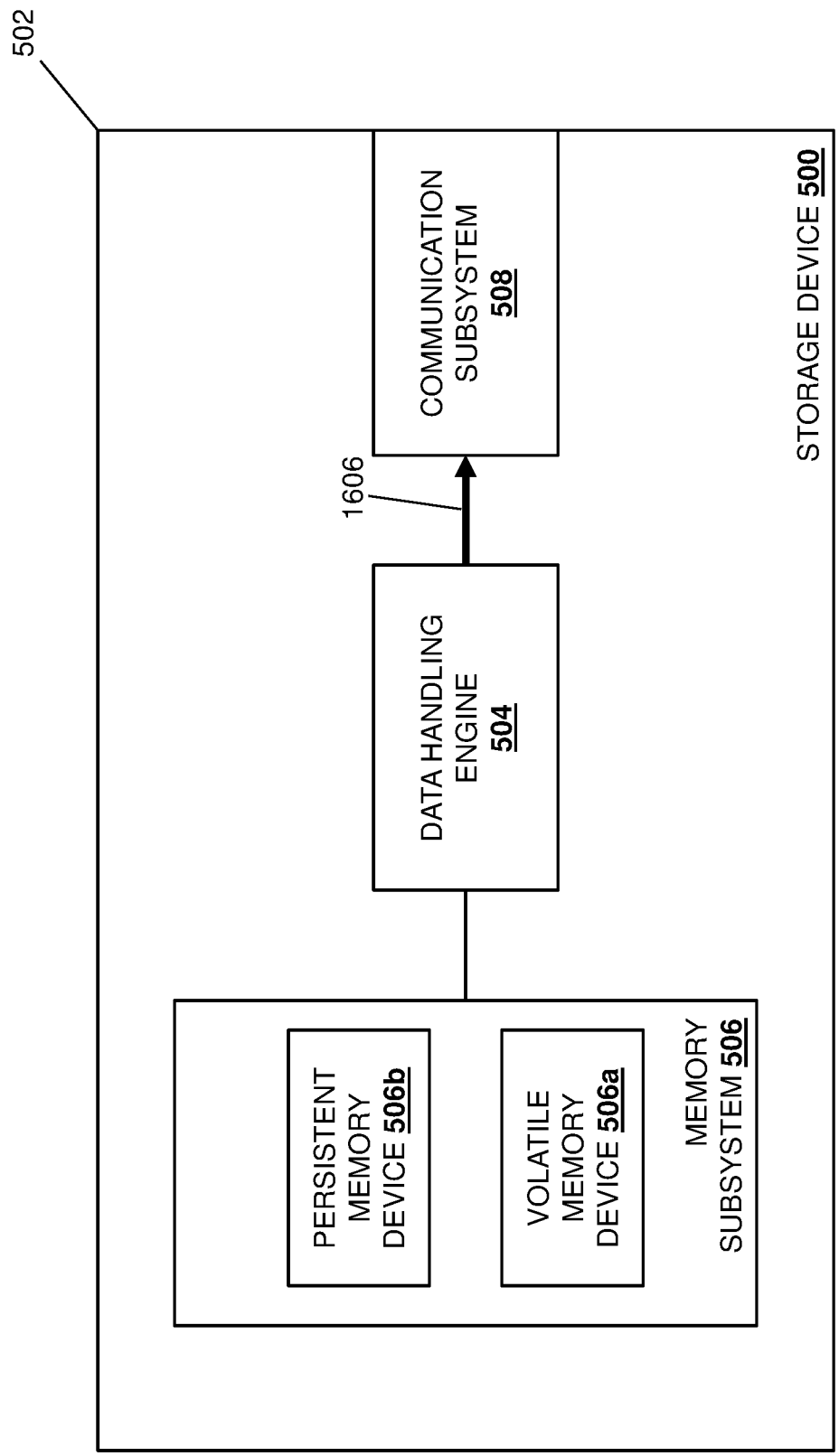
FIG. 16D is a schematic view illustrating an embodiment of the storage device of FIG. 5 operating during the method of FIG. 15.

The method 1500 then proceeds to block 1506 where the SSD storage device provides the data for retrieval. With reference to FIG. 16C, in an embodiment of block 1506 and in response to receiving the data retrieval provisioning command from the networking system 308 (e.g., via the submission queue in its communication subsystem 508), the data handling engine 504 in the storage device 310b/500 may then perform data retrieval preparation operations 1104 to transfer the data stored in the persistent memory device 506b that is included in its memory subsystem 506 to the volatile memory device 506a that is included in its memory subsystem 506. For example, at block 1506, the data handling engine 504 in the storage device 310b/500 may transfer the data from the flash memory array subsystem that is provided by the persistent memory device 506b in the memory subsystem 506 to the non-addressable buffer memory subsystem that is provided by the volatile memory device 506a in the memory subsystem 506. With reference to FIG. 16D, in an embodiment of block 1506, the data handling engine 504 in the storage device 310b/500 may then perform completion message provisioning operations 1602 that include transmitting a completion message for the networking system 308/400. For example, at block 1506 the data handling engine 404 in the networking system 308/400 may write the completion message to a completion queue in the communication subsystem 508 in the storage device 310b/500.

Figure 16E:
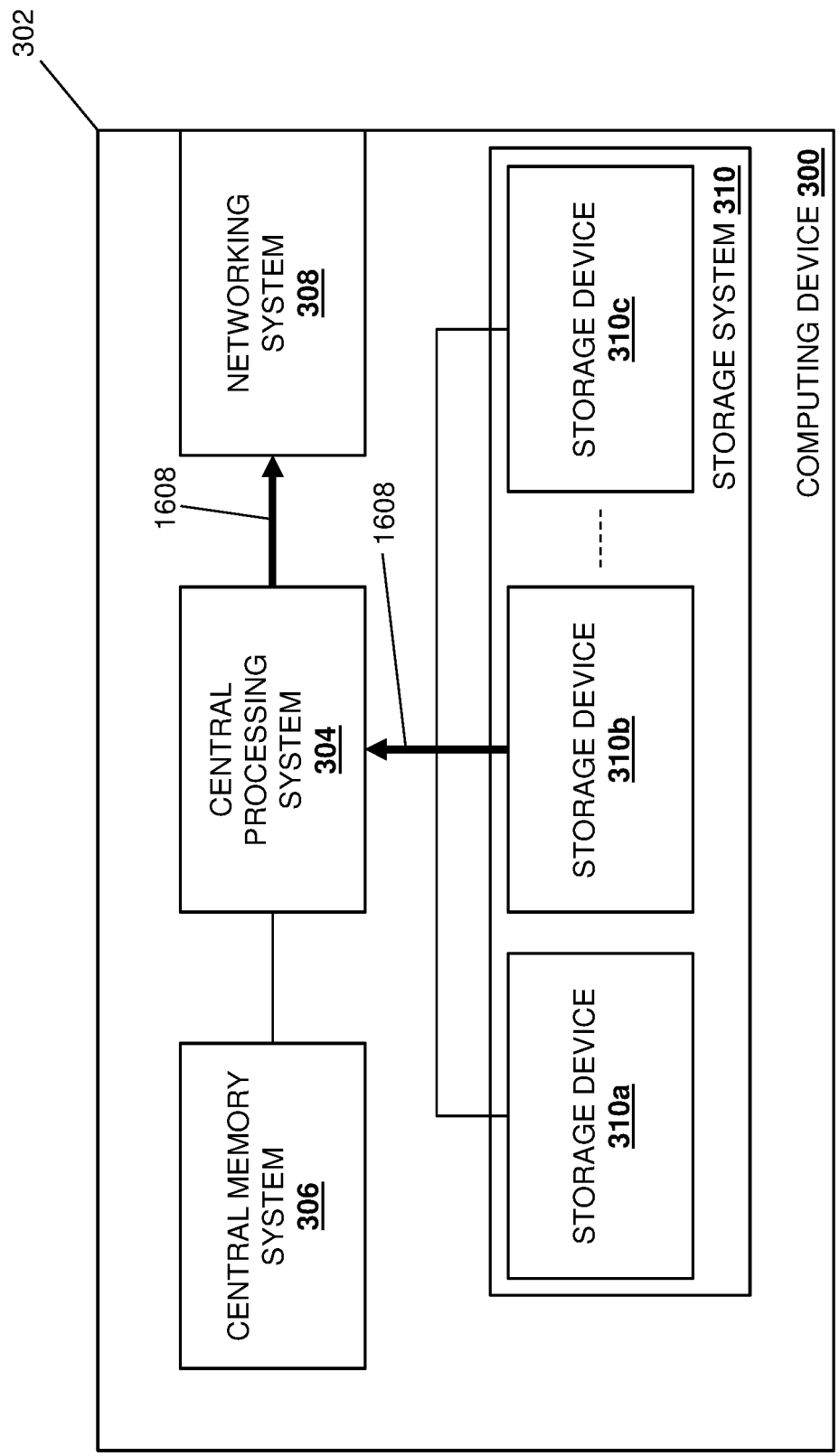
FIG. 16E is a schematic view illustrating an embodiment of the computing device of FIG. 3 operating during the method of FIG. 15.
Figure 16F:
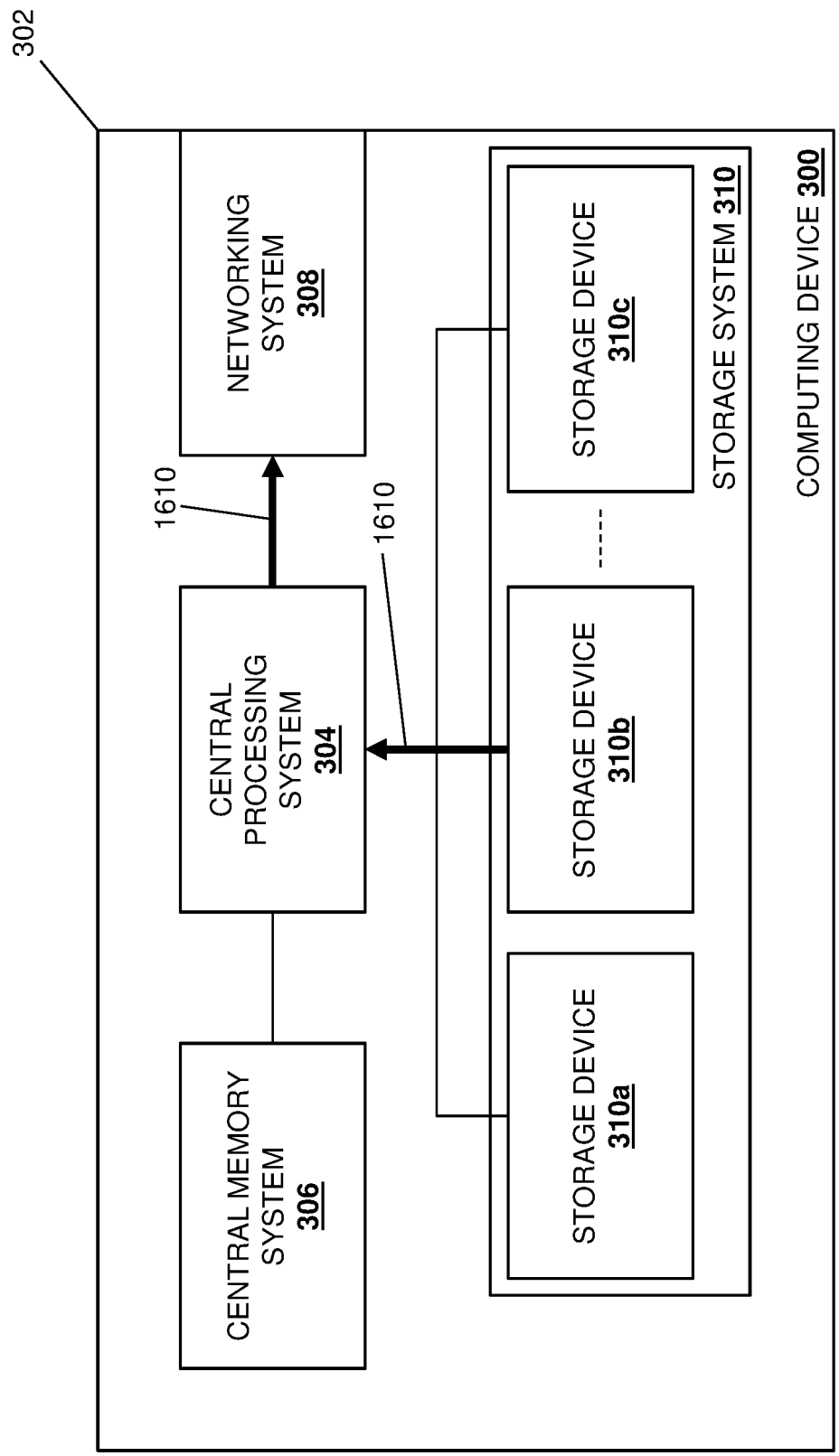
FIG. 16F is a schematic view illustrating an embodiment of the computing device of FIG. 3 operating during the method of FIG. 15.
Figure 16H:
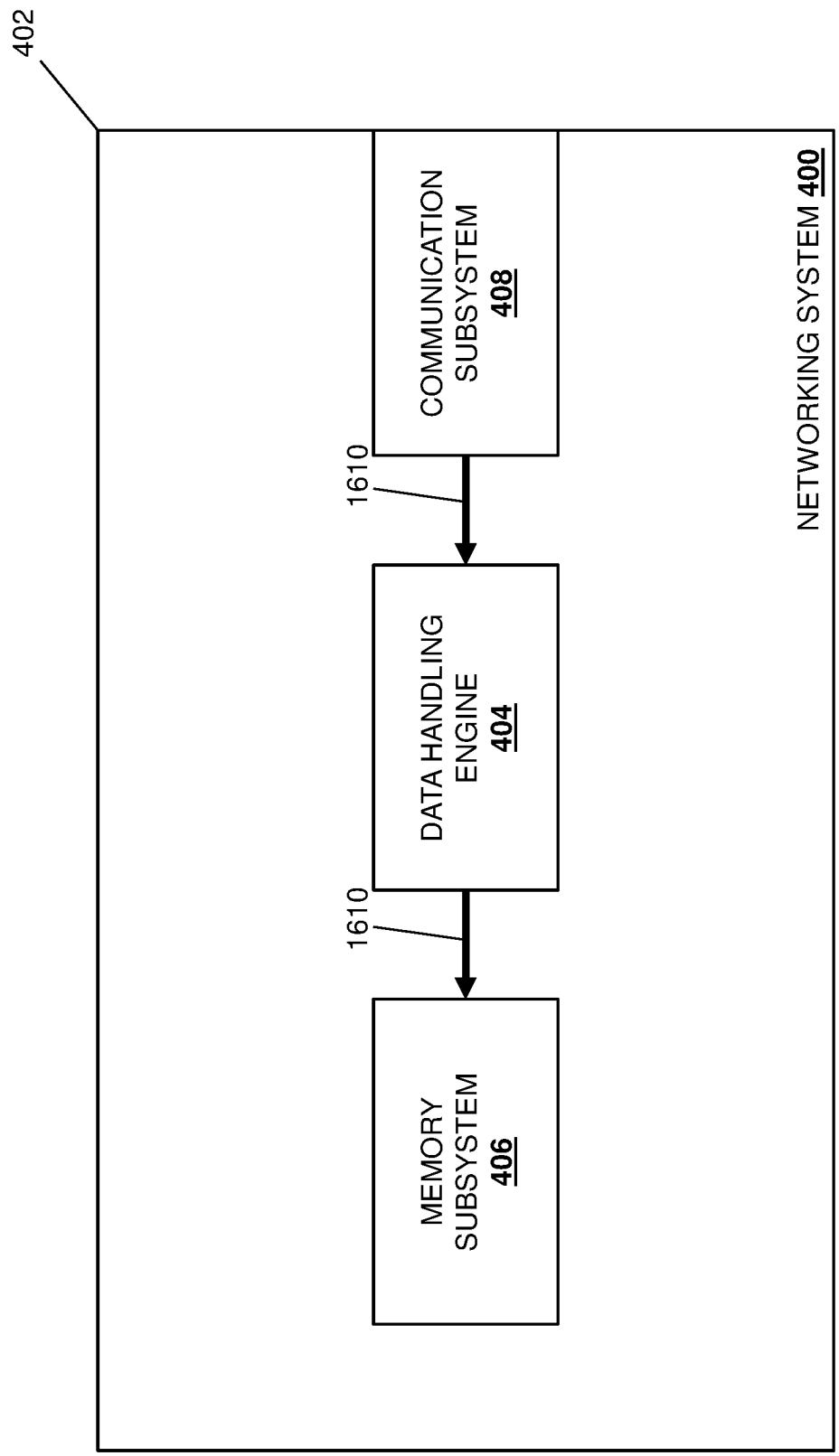
FIG. 16H is a schematic view illustrating an embodiment of the networking system of FIG. 4 operating during the method of FIG. 15.

The method 1500 then proceeds to block 1508 where the networking system retrieves the data from the storage device. With reference to FIG. 16E, in an embodiment of block 1508, the data handling engine 504 in the storage device 310b/500 may perform completion message retrieval operations 1608 that include retrieving a completion message from the storage device 310b/500. For example, at block 1508 the data handling engine 504 in the storage device 310b/500 may retrieve the completion message from the completion queue in the communication subsystem 508 in the storage device 310b/500. With reference to FIGS. 16F, 16G, and 16H, in an embodiment of block 1506 and in response to retrieving the completion message, the networking system 308/400 may perform DMA read operations 1610 that include the data handling engine 404 performing a DMA read by reading the data in the volatile memory device 506a in the memory subsystem 506 of the storage device 310b/500 via its communication system 408, and writing that data to its memory subsystem 406. For example, at block 1508, the DMA read operations 1610 may include the data handling engine 404 in the networking system 308/400 reading the data from an addressable memory subsystem (e.g., addressable within a PCIe memory map) that is provided by the volatile memory device 506a in the memory subsystem 506 of the storage device 310b/500 and writing that data to a non-addressable buffer memory subsystem that is provided by the memory subsystem 406 in the networking system 308/400. As will be appreciated by one of skill in the art in possession of the present disclosure, the DMA read performed during the DMA read operation 1508 allows the data handling engine 404 to directly access from the volatile memory device 506a in its memory subsystem 506 to read data, and then write that data to its memory subsystem 406. However, while a particular data retrieval operation is illustrated and described, one of skill in the art in possession of the present disclosure will appreciate that the networking system 308 may retrieve data from the storage devices in a variety of manners that will fall within the scope of the present disclosure as well.

Figure 16I:
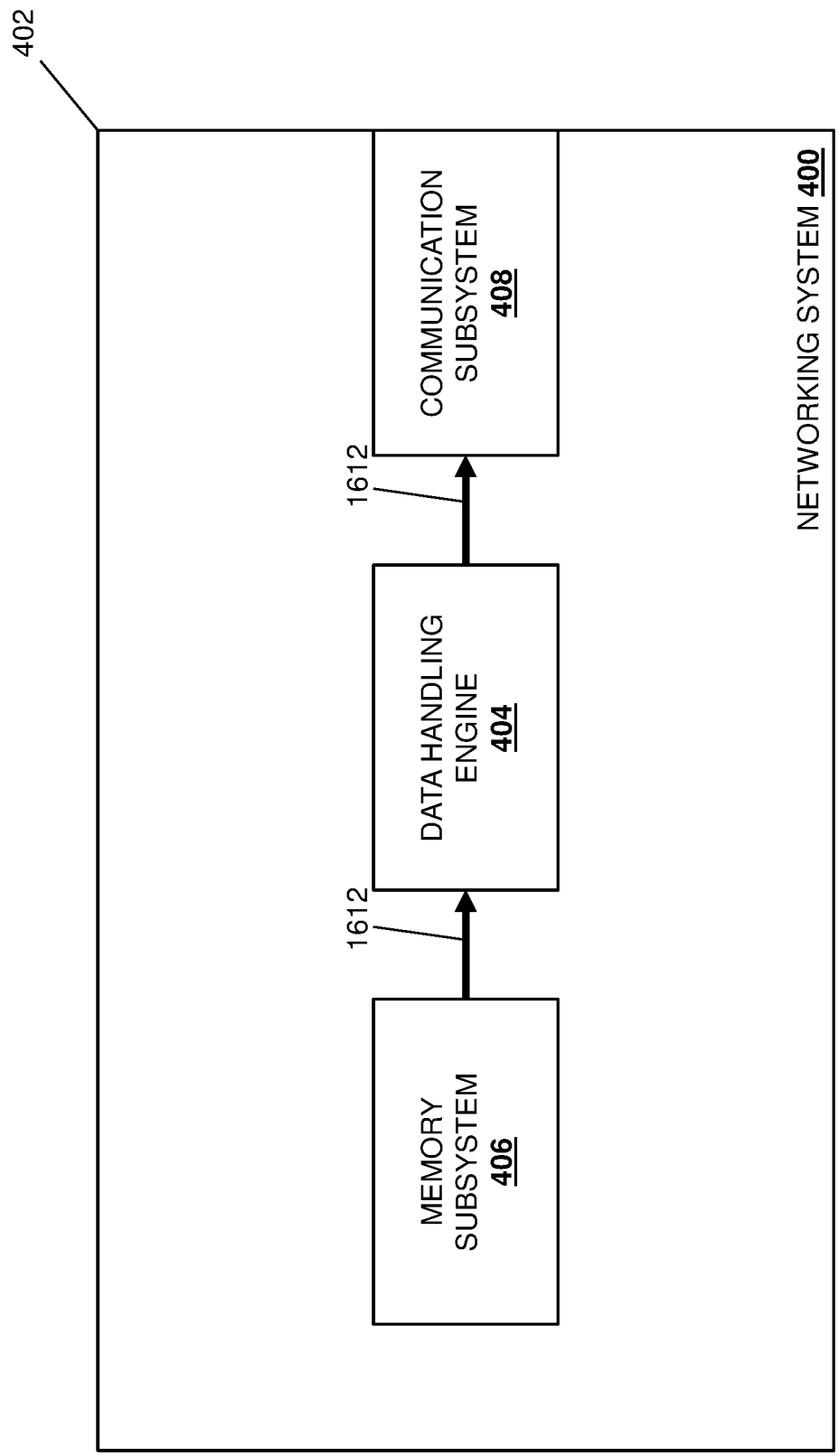
FIG. 16I is a schematic view illustrating an embodiment of the networking system of FIG. 4 operating during the method of FIG. 15.
Figure 16J:
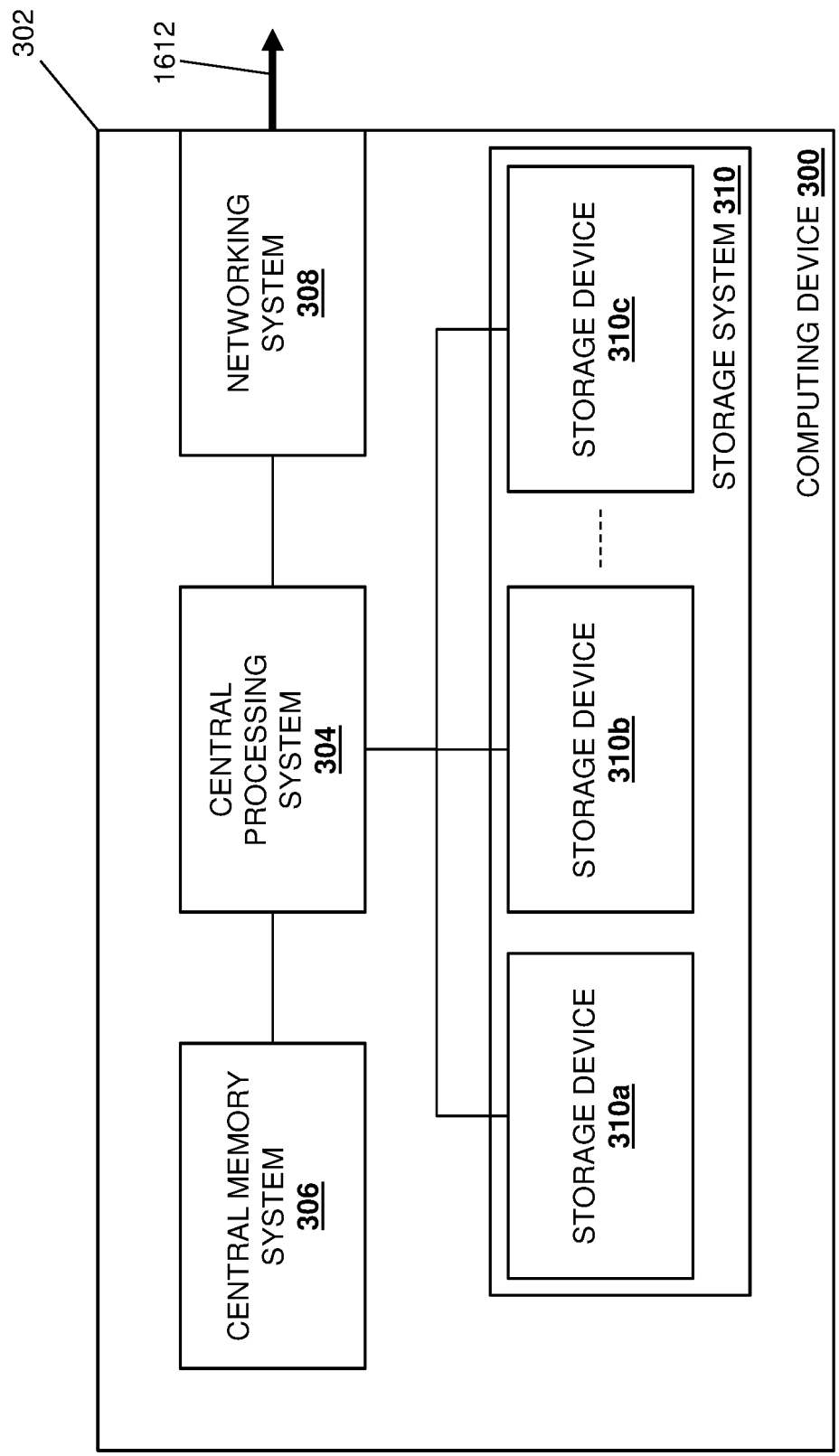
FIG. 16J is a schematic view illustrating an embodiment of the computing device of FIG. 3 operating during the method of FIG. 15.

The method 1500 then proceeds to block 1510 where the networking device transmits the data via the network. With reference to FIGS. 16I and 16J, in an embodiment of block 1510, the networking system 308/400 may then perform data transmission operations 1612 that include the data handling engine 404 retrieving the data stored in its memory subsystem 406 and transmitting it via its communication subsystem 408 and through the network 204 (e.g., to the one of the other computing devices 202b-202d that sent the read request), which one of skill in the art in possession of the present disclosure will appreciate completes the data retrieval operations performed according the method 1500.

Thus, systems and methods have been described that address the issues present with conventional data retrieval operations discussed above, as well as issues present in the method 1000 discussed above. For example, the systems and methods of the present disclosure provide a networking device/storage device direct read system that includes a chassis that houses a Solid State Drive (SSD) storage device coupled to a Smart Network Interface Controller (SmartNIC) networking device. The SmartNIC networking device receives a read request via a network, and then transmits a data provisioning command to an SSD storage device that causes the SDD storage device to transfer the data from a persistent memory device to an addressable memory subsystem in its SSD memory subsystem, and then acknowledge that data transfer to the SmartNIC networking device. The SmartNIC networking device them performs a Direct Memory Access (DMA) read operation to read that data from the addressable memory subsystem in the SSD memory subsystem and write that data to an SmartNIC non-addressable memory subsystem in the SmartNIC networking device, with the SmartNIC networking device then transmitting that data via the network. As such, the direct networking device/storage device read operations of the present disclosure require only a single DMA write operation, eliminate the use of the central memory subsystem as a "bounce" memory, and eliminate the use of the central processing system as a data storage "middleman", while also eliminating data retrieval delays that result in conventional data retrieval systems that require the storage device to complete a DMA write operation to a central memory system before the networking device may perform a DMA read operation from that central memory system, and also reducing the size of the memory subsystem required for the SmartNIC networking device relative to the method 1000 discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device/storage device direct write system, comprising:
   a computing device chassis;
   a Solid State Drive (SSD) storage device that is housed in the computing device chassis; and
   a Smart Network Interface Controller (SmartNIC) networking device that includes a SmartNIC chassis that is housed in the computing device chassis, wherein the SmartNIC networking device is coupled to the SSD storage device, includes a SmartNIC buffer memory system that is housed in the SmartNIC chassis, and is configured to:
   receive data via a network;
   store the data that was received via the network directly in the SmartNIC buffer memory subsystem that is housed in the SmartNIC chassis of the SmartNIC networking device and without storing that data in another storage subsystem subsequent to receiving that data and prior to storing that data in the SmartNIC buffer memory subsystem; and
   perform a Direct Memory Access (DMA) operation to transfer the data stored in the SmartNIC buffer memory subsystem directly to an addressable memory subsystem that is included in the SSD storage device and without storing that data in another storage subsystem between the SmartNIC buffer memory subsystem and the addressable memory subsystem that is included in the SSD storage device.

2. The system of claim 1, wherein the SmartNIC buffer memory subsystem is a non-addressable buffer memory subsystem.

3. The system of claim 1, wherein the addressable memory subsystem in the SSD storage device is a Controller Memory Buffer (CMB).

4. The system of claim 1, wherein the addressable memory subsystem in the SSD storage device is a volatile memory subsystem, and wherein the SmartNIC networking device is configured to:
   transmit, to the SSD storage device in response to performing the DMA operation, a persistent storage instruction that is configured to cause the SSD storage device to transfer the data stored in the addressable memory subsystem to a persistent memory subsystem in the SSD storage device.

5. The system of claim 4, wherein the persistent storage instruction is configured to cause the SSD storage device to provide a completion message to the SmartNIC networking device in response to transferring the data stored in the addressable memory subsystem to the persistent memory subsystem.

6. The system of claim 1, wherein the addressable memory subsystem in the SSD storage device is a persistent memory subsystem and the SSD storage device provides a completion message to the SmartNIC networking device immediately following completion of the DMA operation.

7. An Information Handling System (IHS), comprising:
a Smart Network Interface Controller (SmartNIC) chassis;
a SmartNIC processing system that is housed in the SmartNIC chassis;
a SmartNIC buffer memory system that is housed in the SmartNIC chassis and coupled to the SmartNIC processing system; and
a SmartNIC primary memory system that is housed in the SmartNIC chassis, coupled to the SmartNIC processing system, and that includes instructions that, when executed by the SmartNIC processing system, cause the SmartNIC processing system to provide a SmartNIC data handling engine that is configured to:
receive data via a network;
store the data that was received via the network directly in the SmartNIC buffer memory subsystem that is housed in the SmartNIC chassis and coupled to the SmartNIC processing system and without storing that data in another storage subsystem subsequent to receiving that data and prior to storing that data in the SmartNIC buffer memory subsystem; and
perform a Direct Memory Access (DMA) operation to transfer the data stored in the SmartNIC buffer memory subsystem directly to an addressable memory subsystem that is included in an SSD storage device that is housed in a computing device chassis with the SmartNIC chassis and coupled to the SmartNIC processing system and without storing that data in another storage subsystem between the SmartNIC buffer memory subsystem and the addressable memory subsystem that is included in the SSD storage device.

8. The IHS of claim 7, wherein the SmartNIC buffer memory subsystem is a non-addressable buffer memory subsystem.

9. The IHS of claim 7, wherein the addressable memory subsystem in the SSD storage device is a Controller Memory Buffer (CMB).

10. The IHS of claim 7, wherein the addressable memory subsystem in the SSD storage device is a volatile memory subsystem, and wherein the SmartNIC data handling engine is configured to:
transmit, to the SSD storage device in response to performing the DMA operation, a persistent storage instruction that is configured to cause the SSD storage device to transfer the data stored in the addressable memory subsystem to a persistent memory subsystem in the SSD storage device.

11. The IHS of claim 10, wherein the persistent storage instruction is configured to cause the SSD storage device to provide a completion message to the SmartNIC data handling engine in response to transferring the data stored in the addressable memory subsystem to the persistent memory subsystem.

12. The IHS of claim 7, wherein the addressable memory subsystem in the SSD storage device is a persistent memory subsystem and the SSD storage device provides a completion message to the SmartNIC data handling engine immediately following completion of the DMA operation.

13. The IHS of claim 12, wherein the addressable memory subsystem in the SSD storage device is a persistent memory subsystem due to the addressable memory subsystem being included in a Persistent Memory Region in the SSD storage device that is configured to be powered by a power storage subsystem.

14. A method for direct networking device/storage device write operations, comprising:
receiving, by a Smart Network Interface Controller (SmartNIC) networking device including a SmartNIC chassis, data via a network;
storing, by the SmartNIC networking device, the data that was received via the network directly in a SmartNIC buffer memory subsystem that is included in the SmartNIC chassis of the SmartNIC networking device and without storing that data in another storage subsystem subsequent to receiving that data and prior to storing that data in the SmartNIC buffer memory subsystem; and
performing, by the SmartNIC networking device, a Direct Memory Access (DMA) operation to transfer the data stored in the SmartNIC buffer memory subsystem directly to an addressable memory subsystem that is included in an SSD storage device that is housed in a computing device chassis with the SmartNIC chassis and coupled to the SmartNIC networking device and without storing that data in another storage subsystem between the SmartNIC buffer memory subsystem and the addressable memory subsystem that is included in the SSD storage device.

15. The method of claim 14, wherein the SmartNIC buffer memory subsystem is a non-addressable buffer memory subsystem.

16. The method of claim 14, wherein the addressable memory subsystem in the SSD storage device is a Controller Memory Buffer (CMB).

17. The method of claim 14, wherein the addressable memory subsystem in the SSD storage device is a volatile memory subsystem, and wherein the SmartNIC data handling engine is configured to:
transmit, to the SSD storage device in response to performing the DMA operation, a persistent storage instruction that is configured to cause the SSD storage device to transfer the data stored in the addressable memory subsystem to a persistent memory subsystem in the SSD storage device.

18. The method of claim 17, wherein the persistent storage instruction is configured to cause the SSD storage device to provide a completion message to the SmartNIC networking device in response to transferring the data stored in the addressable memory subsystem to the persistent memory subsystem.

19. The method of claim 14, wherein the addressable memory subsystem in the SSD storage device is a persistent memory subsystem and the SSD storage device provides a completion message to the SmartNIC networking device immediately following completion of the DMA operation.

20. The method of claim 19, wherein the addressable memory subsystem in the SSD storage device is a persistent memory subsystem due to the addressable memory subsystem being included in a Persistent Memory Region in the SSD storage device that is configured to be powered by a power storage subsystem.

* * * * *